United States Patent
Van Auken et al.

[15] 3,677,637
[45] July 18, 1972

[54] MICROFILM ATTACHMENT FOR COPYING MACHINE

[72] Inventors: John Van Auken, Miami Beach; M. Gene Kaufman, South Miami, both of Fla.; William A. Pfaff, Centerport, N.Y.

[73] Assignee: Saxon Industries, Inc., New York, N.Y.

[22] Filed: April 22, 1970

[21] Appl. No.: 30,922

[52] U.S. Cl..................................355/45, 355/7, 355/14, 355/51, 355/60, 355/66
[51] Int. Cl.......................................................G03b 13/28
[58] Field of Search....................355/3, 5, 6, 8, 11, 13, 41, 355/45, 49, 50, 60; 83/205

[56] References Cited

UNITED STATES PATENTS

| | | | |
|---|---|---|---|
| 3,131,594 | 5/1964 | Benson | 355/8 |
| 3,424,525 | 1/1969 | Tower et al. | 355/3 |
| 3,452,627 | 7/1969 | Goodman et al. | 83/205 X |
| 3,575,503 | 4/1971 | Van Auken et al. | 355/8 |

*Primary Examiner*—Samuel S. Matthews
*Assistant Examiner*—Russell E. Adams, Jr.
*Attorney*—Amster & Rothstein

[57] ABSTRACT

A microfilm attachment for an electrostatic copying machine. The copying machine includes a scanning window and a roller exposed at the upper surface thereof. The microfilm attachment is placed on top of the machine and includes a roller which engages the machine roller. The attachment roller is coupled to a plate which carries a microfilm original to be copied. As the machine cycles, the machine and attachment rollers turn, and the microfilm original is moved. A projection lamp initially images the microfilm on a screen. At the start of the copying cycle, a mirror in the attachment is moved to direct light transmitted through the moving microfilm original to the scanning window for the purpose of exposing copy paper which is moved past an exposure window in the machine at the same time. Because when the microfilm original is initially imaged on the screen it is centrally disposed relative to the machine scanning window, at the start of the copying cycle the microfilm original is actually moved in the reverse direction until it clears the scanning window. Thereafter, it is moved in the forward direction past the scanning window. At the end of the scanning sequence, the microfilm original is returned in the reverse direction to the initial position. The copy paper feed begins while the microfilm original first moves in the reverse direction so that the copy paper reaches the exposure window just when forward movement of the microfilm original is to begin. The microfilm attachment includes several switches which are operated depending upon the position of the microfilm original during the sequence. These switches are extended through connectors on the attachment and the copying machine to the control circuit within the machine so that the machine is properly sequenced with respect to movement of the microfilm original.

36 Claims, 34 Drawing Figures

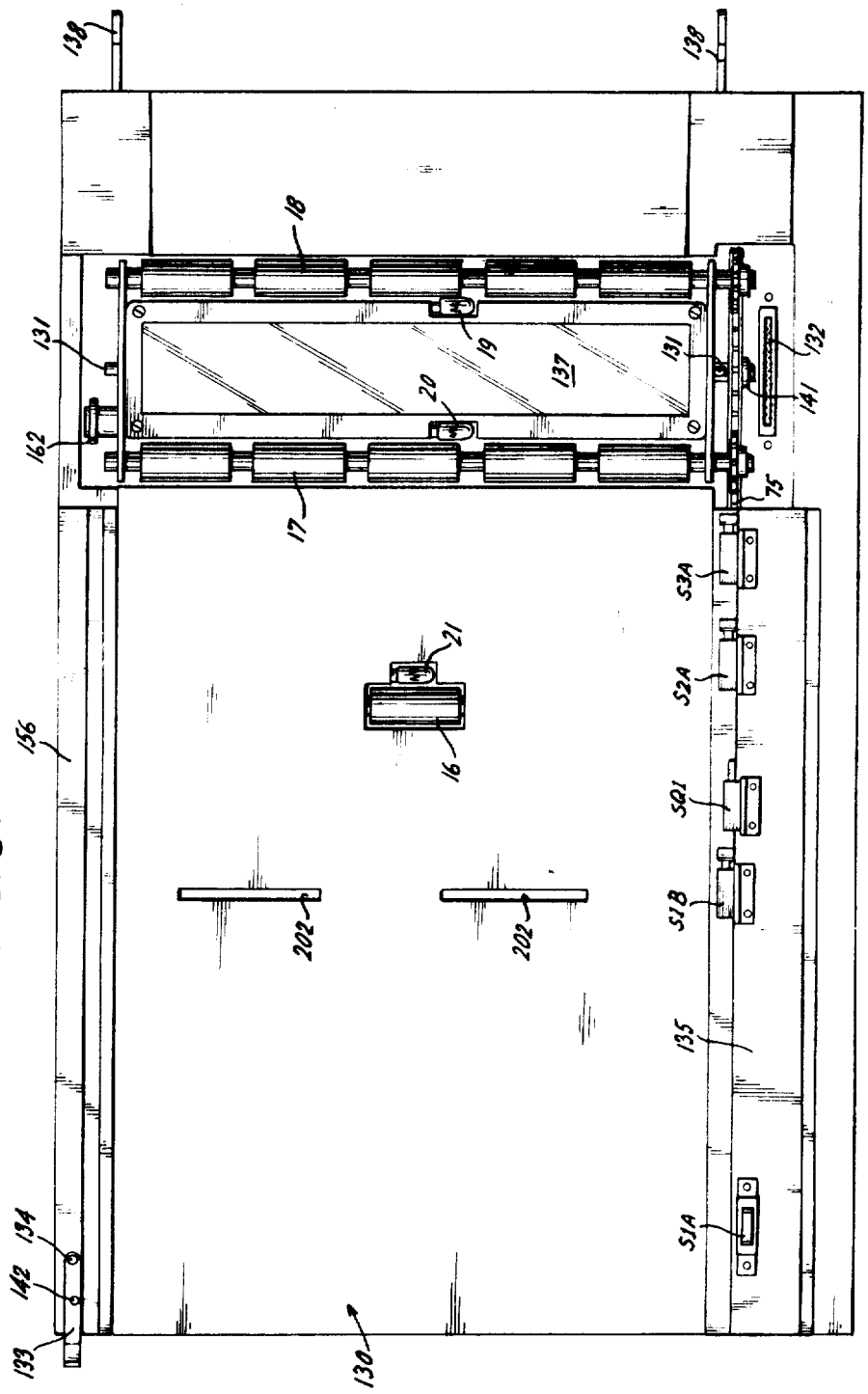

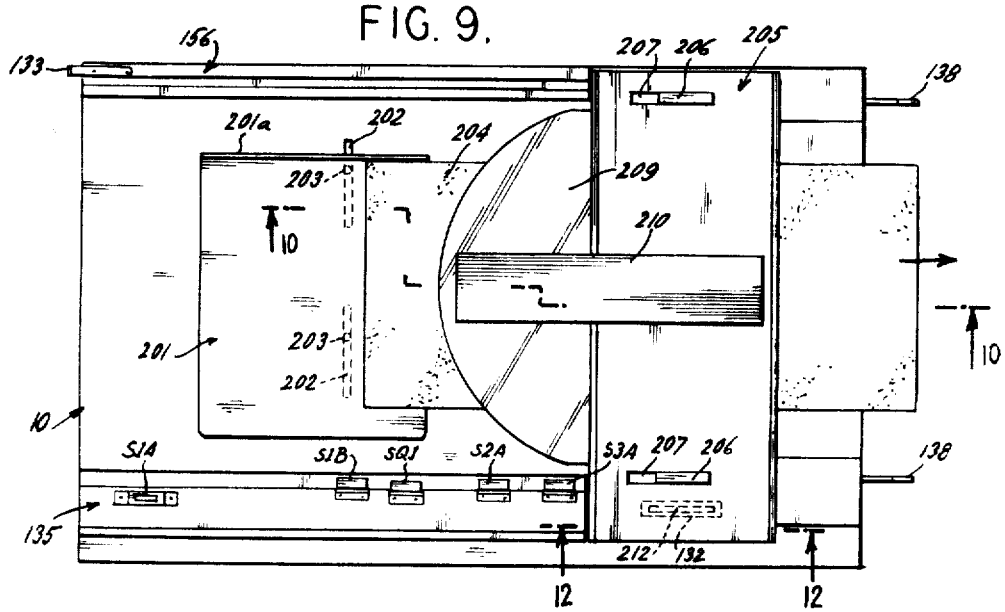
FIG. 9.
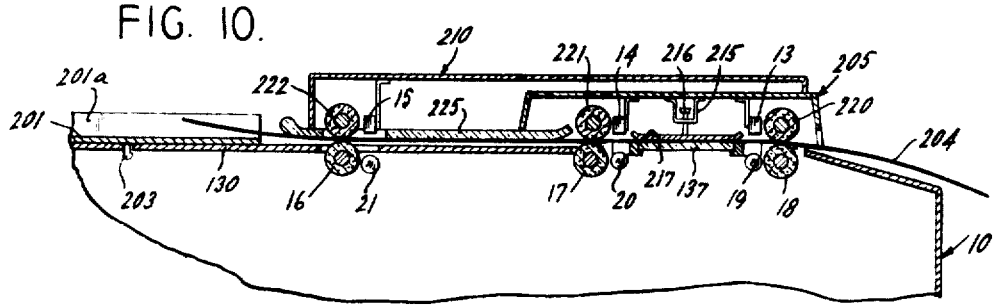
FIG. 10.
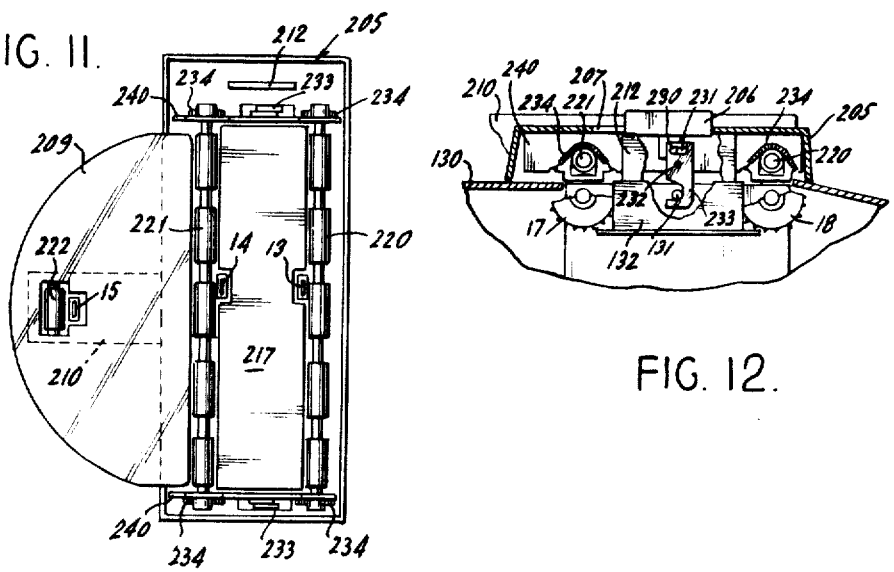
FIG. 11.
FIG. 12.

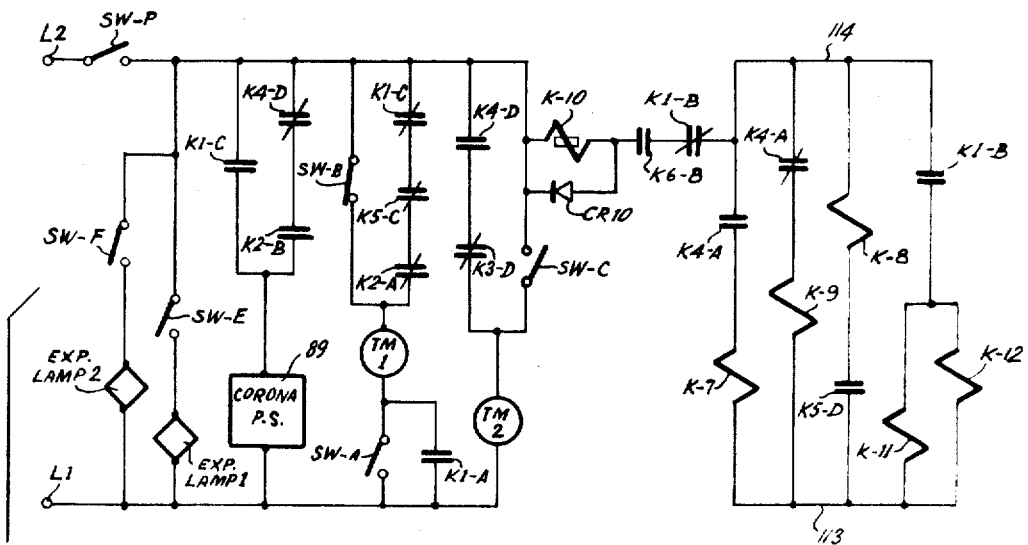
FIG. 14.
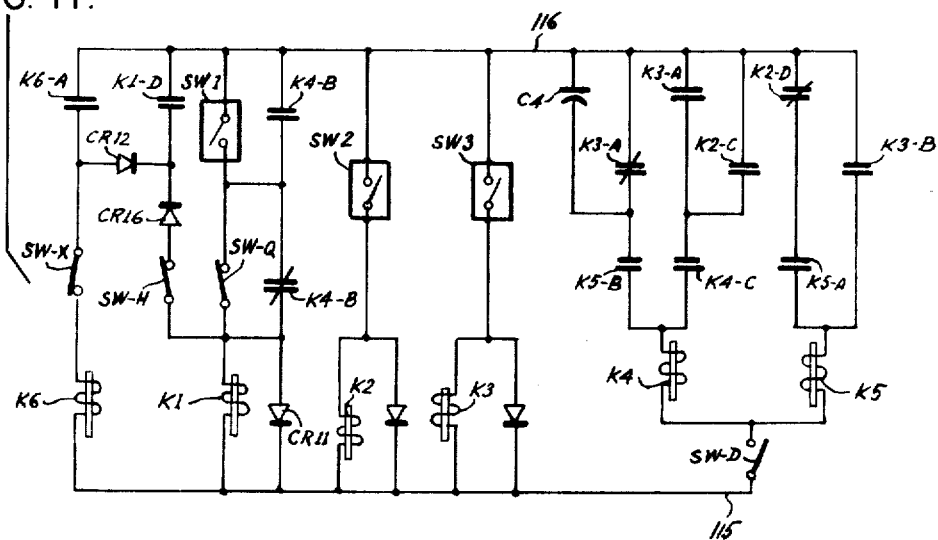
FIG. 13.
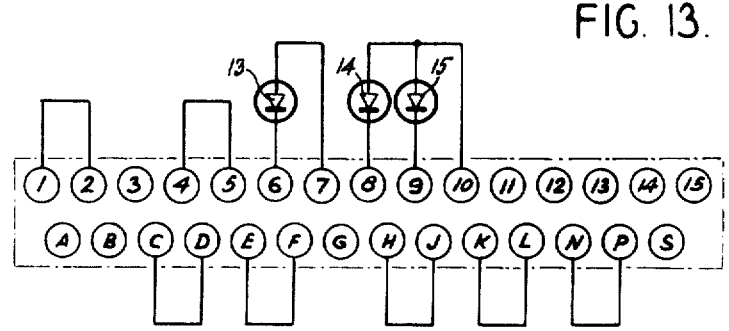

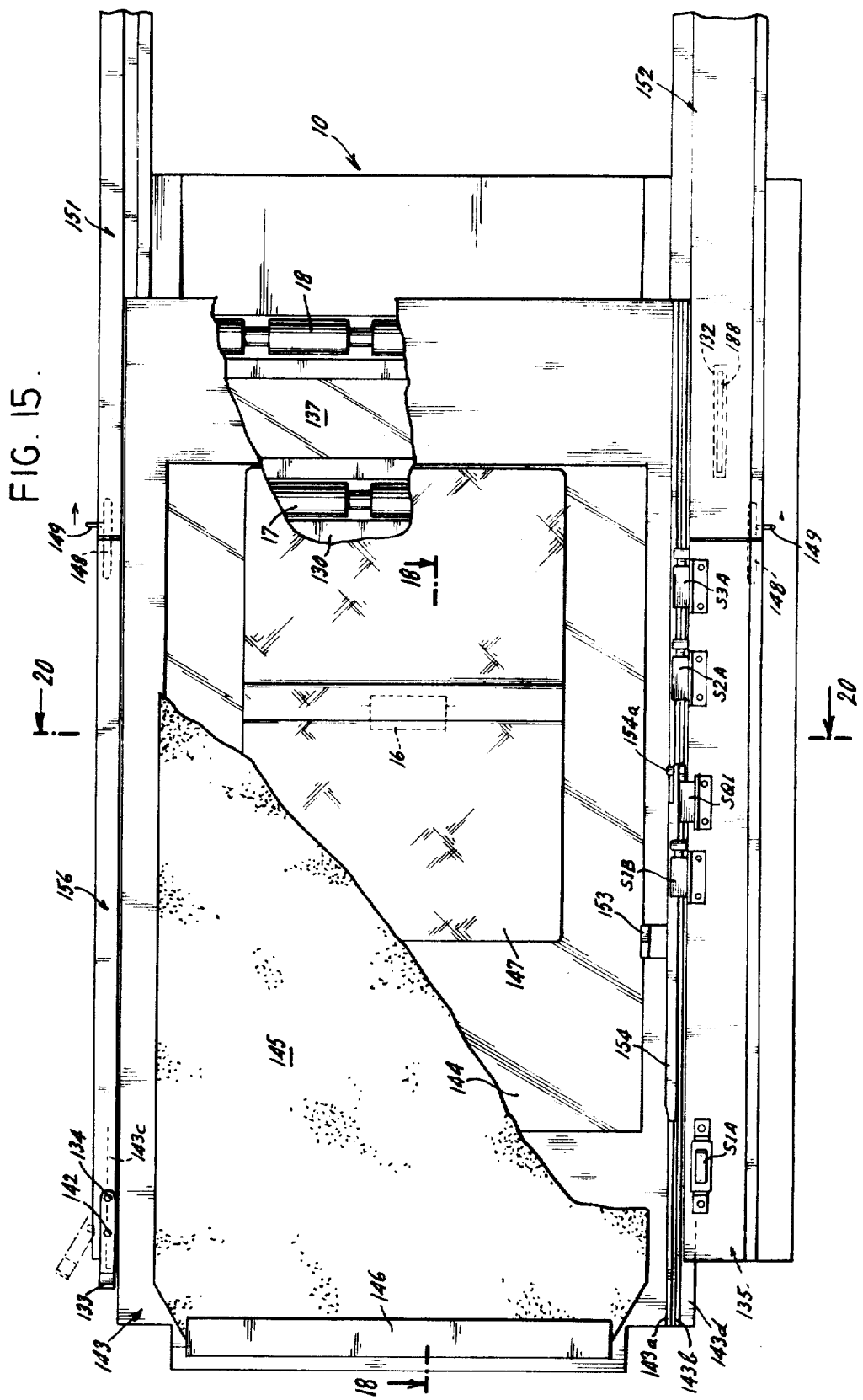

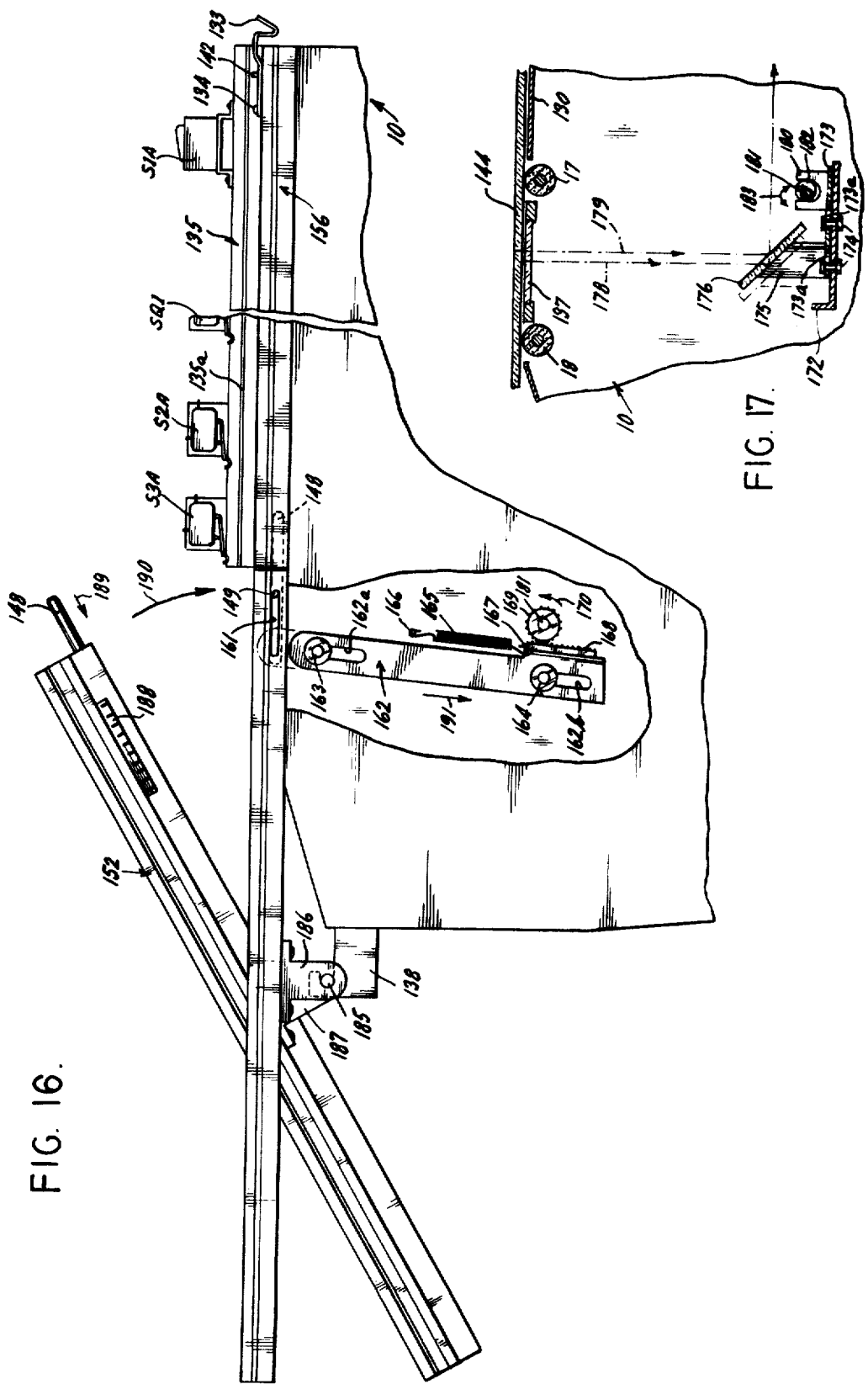

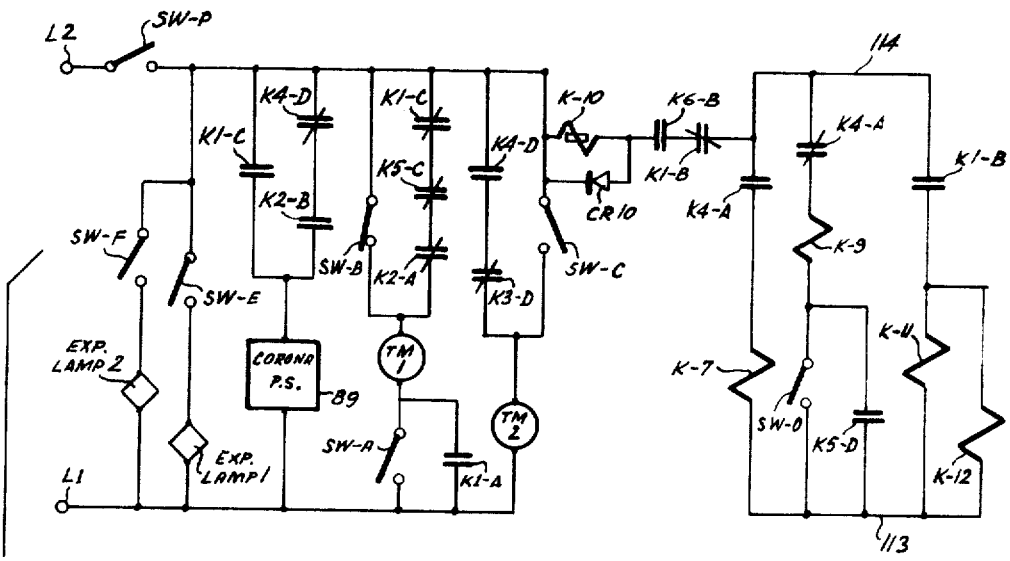
FIG. 22.
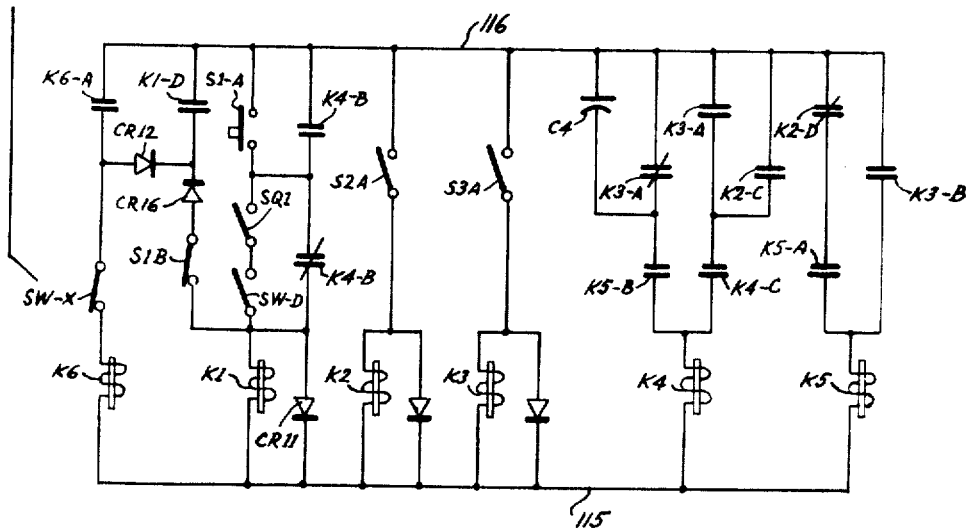
FIG. 21.
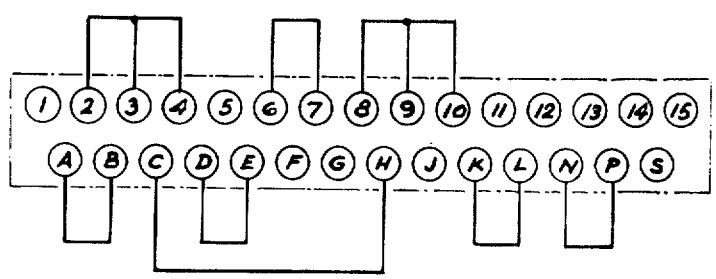

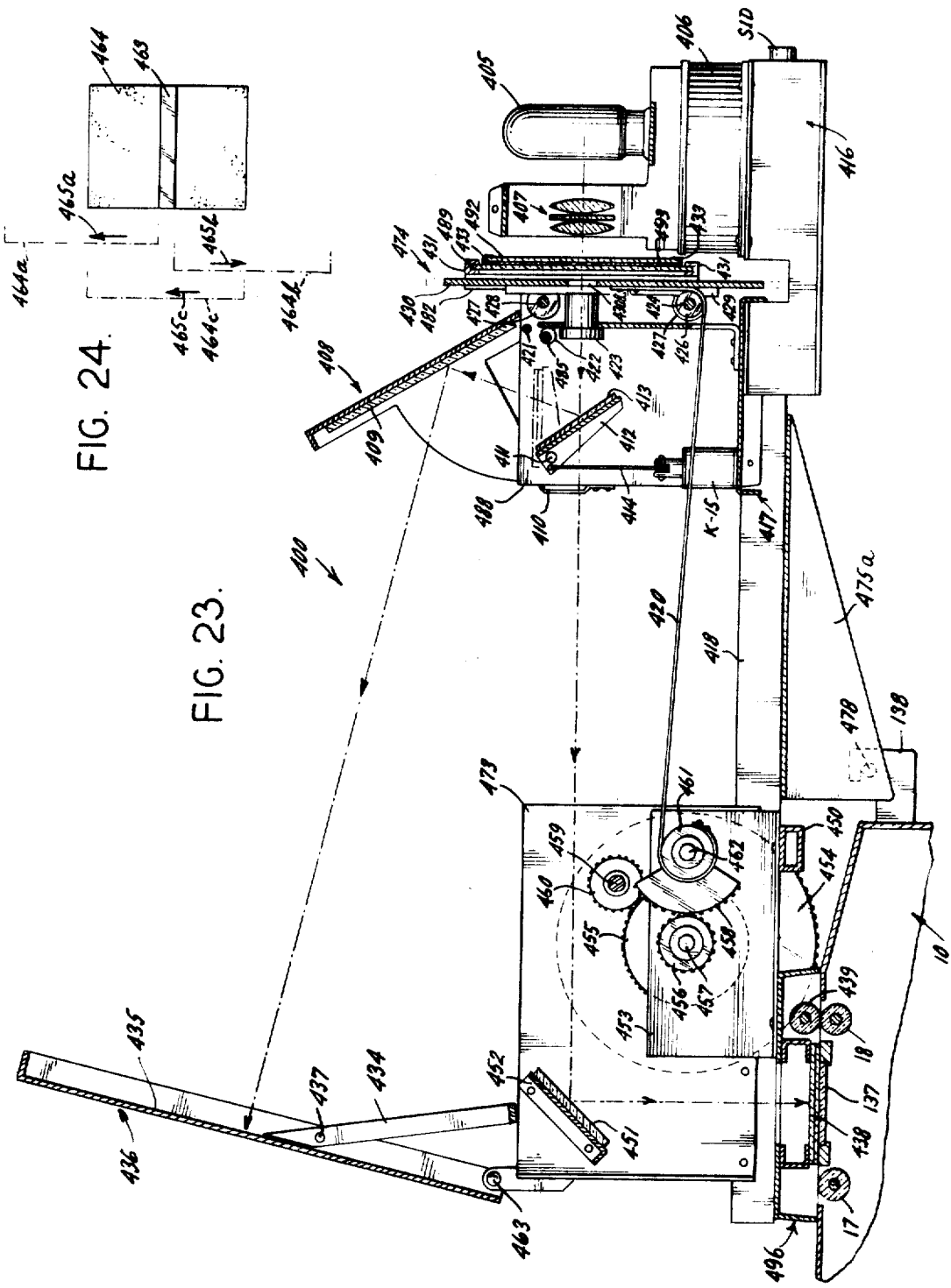

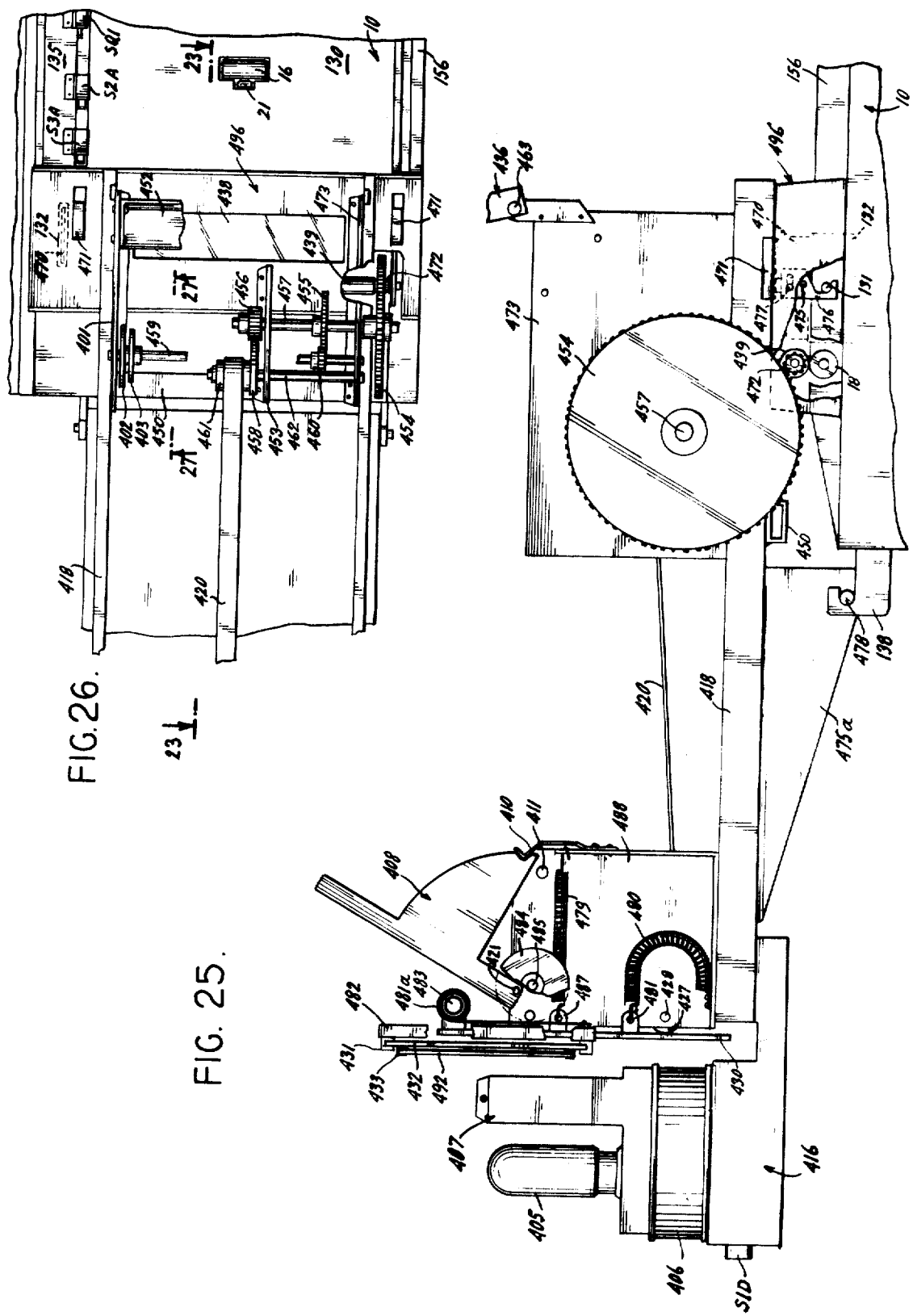

MICROFILM ATTACHMENT FOR COPYING MACHINE

This invention relates to a copying machine system in which a plurality of attachments can be placed on a single copying machine to enable the copying machine to operate in different modes, and more particularly to a microfilm attachment for use in such a system.

There are many different types of copying machines on the market at the present time. Each of these machines generally is capable of operating in only a single mode. For example, there are machines which are capable of making copies only of sheet documents (letters, etc.). Such machines cannot make copies of a page of a book, for example, because typically the document to be copied must be moved through the machine and the original transport system cannot accept a book or other bulky article for transport. Other machines are capable of copying a page of a book. A book can be placed on top of a stationary scanning window with the page to be copied being scanned by a moving optical system, or the book can be placed on top of a glass platen which is moved past a stationary optical system. Book copiers are also capable of copying sheet documents (a sheet document can be thought of as a very thin book). A third type of machine is one which makes paper copies of microfilm originals. A survey of the machines presently on the market reveals that each machine is generally capable of operating in only a single mode—for example, as a letter copier, as a book copier, or as a microfilm copier.

Most businesses, if they require a copying machine at all, generally have a need to make copies of sheet documents. Letter copiers are usually smaller and faster than copying machines of other types. An example of a small, fast letter copier is disclosed in Van Auken et al. application Ser. No. 725,390, filed on Apr. 30, 1968. In the Van Auken et al. machine, letters can be fed in succession, one immediately after the other, into the nip of input rollers, the successive original documents being collected in an original tray and the copies being collected in a copy tray. While a letter copier is the most commonly required type of copying machine, on occasions there is a need to make a copy of a page of a book. Thus, those businesses requiring book-copying capabilities generally purchase a book copier (which can make copies of letters as well). In order to acquire the relatively infrequently used book copying capability, a number of inconveniences must be put up with. First, the book copier generally requires more space. It is also much slower even when copying letters because it takes longer to remove a first letter from the platen after it is copied before another is put in place than it does to simply feed letters in succession into the nip of input rollers.

Finally, where it is necessary to copy microfilm originals, it has been the practice to purchase an additional machine for this purpose—at significantly increased total cost and at the expense of space.

In the copending application of Van Auken et al., Serial No. 30,923, filed on Apr. 22, 1970, there is disclosed a copying machine system which includes a copying machine and various attachments therefor, the copying machine being designed to cooperate differently with each attachment in order to operate in a different mode.

It is a general object of our invention to provide a microfilm attachment for a copying machine.

It is another object of our invention to provide an improved electrostatic microfilm copier.

The copying machine utilized in the system is similar to that disclosed in the Van Auken et al. application, Ser. No. 725,390. At the top of the machine there is provided a plurality of rollers which can be rotated in either direction by an original drive chain in the machine. The machine includes an electrical circuit for controlling energization of the exposure lamps, the operation of a knife to cut copy sheets from a roll of copy paper, switching of the direction movement of the rollers at the top of the machine, etc. The electrical circuit is not complete; various points in the circuit terminate at pins in an electrical connector placed on top of the machine.

The letter copying attachment used with the machine consists of a bridge which is placed on top of it. The bridge includes another set of mating rollers which are driven by the rollers in the copying machine. Together, the pairs of rollers transport an original document between the top of the machine and the bottom of the bridge. The document is shuttled back and forth when it is necessary to make multiple copies of the same original. The bridge includes a connector which mates with the machine connector. The bridge connector serves to complete the electrical circuit of the copying machine in order that the machine operate in the letter copying mode. The bridge also includes a plurality of photocells which are energized by exciter lamps at the top of the copying machine. The photocells determine the position of the original document underneath the bridge. The photocells are included in the bridge electrical circuit coupled to the machine circuit, and the photocell outputs control the machine to cut a roll of copy paper at the appropriate times, to reverse the direction of rotation of the machine rollers, etc. With the letter bridge on top of the machine, there results an overall configuration which offers all of the advantages of a letter copier, including fast operation and compact size.

The second attachment used with the machine, the "book copier" attachment, includes a glass platen which is placed on top of the machine. The glass platen is moved back and forth by the machine rollers, a book on top of the platen thus being moved back and forth past the scanning window on top of the machine. The book copier attachment includes a cam which can be set to correspond to the length of the original page to be copied. A series of microswitches are provided on top of the copying machine, and as the glass platen is moved back and forth by the machine rollers, the cam operates the microswitches to synchronize the machine operation to the position of the platen. The book copier attachment includes an electrical connector which mates with the machine connector to thereby change the electrical circuit of the machines so that it operates in the book copying mode. For example, unlike the letter copying mode, there is no need to utilize the photocell amplifiers in the machine when operating in the book copying mode. There are also some additional significant differences in the machine operation in the book copying mode which will become apparent below.

There is also a mechanical change made in the basic machine when the book copier attachment is placed on it. The glass platen has a certain thickness which would otherwise increase the optical path of light reflected from the original to be copied and transmitted to the exposure station where it strikes the copy sheet. If the optical path of the basic machine is designed to properly focus light reflected from from an original document (on top of the machine) on the copy sheet, the increased optical path length as a result of the thickness of the glass platen would result in imperfect focusing of the light reflected from a book (or original document) placed on the glass platen. For this reason, when the book copier attachment is placed on the machine, it causes a lever to move, which lever in turn repositions a mirror inside the copying machine. The repositioned mirror serves to shorten the optical path inside the machine. The total length of the optical path resulting from the increase caused by the glass platen and the decrease caused by the repositioned mirror provides perfect focusing.

The book copier attachment includes a pair of rails which extend outward from the machine; the rails are required to support and guide the glass platen as it is moved back and forth by the machine rollers. The rails necessarily increase the size of the overall machine. However, the rails and the glass platen can be attached to or removed from the copying machine in less than a minute. (Similar remarks apply to the letter copier bridge.) This means that in ordinary operation, the letter copier bridge can be left on the machine, thereby resulting in the most compact arrangement possible as well as maximum speed in the successive feeding in of original documents to be copied. Only when it is required to make a copy of a bulky article, such as a book, does the letter copier bridge have to be removed and the book copier attachment placed in its stead on top of the machine. After the necessary copies are made, the letter copier bridge can be placed back on the machine. This arrangement allows the advantages of both types of prior art machines to be obtained, without requiring two different machines for the purpose.

In accordance with the principles of our invention, the third attachment, the "microfilm scanner" or "microfilm reader" can be moved between two positions in accordance with the operation of a solenoid. In a first position, the mirror directs the microfilm image to the screen. In this manner, a microfiche card, for example, can be positioned until the desired frame is selected. In the second position, the mirror allows the light to be projected through the microfilm to the scanning window of the copying machine. This light is used to expose the copy paper.

It is necessary to move the microfilm image as the copy sheet is moved through the machine so that they are in optical synchronization with each other. (Movement of the microfilm in this manner corresponds to movement of a letter through the letter copying bridge or movement of the book copier glass platen.) The microfilm scanner includes a roller which engages one of the machine rollers and is driven thereby. The machine roller controls movement of the microfilm to be copied. But a completely different sequence of roller movements is required for the microfilm reader. (For example, the microfilm must first be transported in the reverse direction after selection of the frame to be copied inasmuch as when a frame is selected, it is centered with respect to the scanning window rather than being in front of it.) This will become apparent below. The microfilm reader includes a cam which is driven by the machine roller, as well as a group of microswitches operated by the cam. As the cam rotates, the microswitch operations indicate the position of the microfilm frame to be copied. The microswitches are extended to an electrical connector on the microfilm reader which engages the electrical connector on the machine. The resulting overall electrical circuit is different from the letter copier and book copier circuits and enables the overall machine to function in a third mode. The microfilm reader further includes additional mechanisms, such as a solenoid for moving the mirror to control either imaging of the microfilm frame on the screen or the transmission of the light projected through it to the machine scanning window. The solenoid is similarly coupled to the electrical circuit of the copying machine through the electrical connectors, and is thus operated at the appropriate times to control scanning.

On those occasions when it is necessary to make a paper copy of a microfilm original, all that is required is to remove the letter copier bridge from the machine and to replace it by the microfilm reader. The microfilm reader (as also the letter and book copiers) can be operated in a multiple copy mode so that multiple copies of a selected microfilm frame can be made. After the microfilm reader is thus used, it can be replaced by the letter copier bridge which prepares the machine for its usual mode of operation. Instead of requiring a separate machine for the purpose of making copies of a microfilm original, all that is required is a relatively simple microfilm reader attachment for the basic machine.

It is a feature of our invention to provide a microfilm attachment for a copying machine having an electrical circuit terminating at a number of points in an electrical connector, the machine operating in different modes depending on particular attachments placed thereon, the microfilm attachment including a mating electrical connector for completing the overall electrical circuit of the machine so that it sequences to make copies of a microfilm original.

It is another feature of our invention to provide a drive mechanism in the microfilm attachment for engaging a drive mechanism at an exposed surface of the machine to thereby control the movement of various elements in the microfilm attachment in synchronization with the operation of the copying machine.

Further objects, features and advantages of our invention will become apparent upon consideration of the following detailed description in conjunction with the drawing, in which:

FIG. 8 is a plan fiew showing the top of the machine of FIG. 2 with no attachment placed on it;

FIG. 9 is a top plan view of the first attachment, the letter bridge, when placed on top of the copying machine;

FIG. 10 is a sectional view of the letter bridge taken through the line 10—10 of FIG. 9;

FIG. 11 is a bottom plan view of the letter bridge of FIG. 9;

Figure 3:
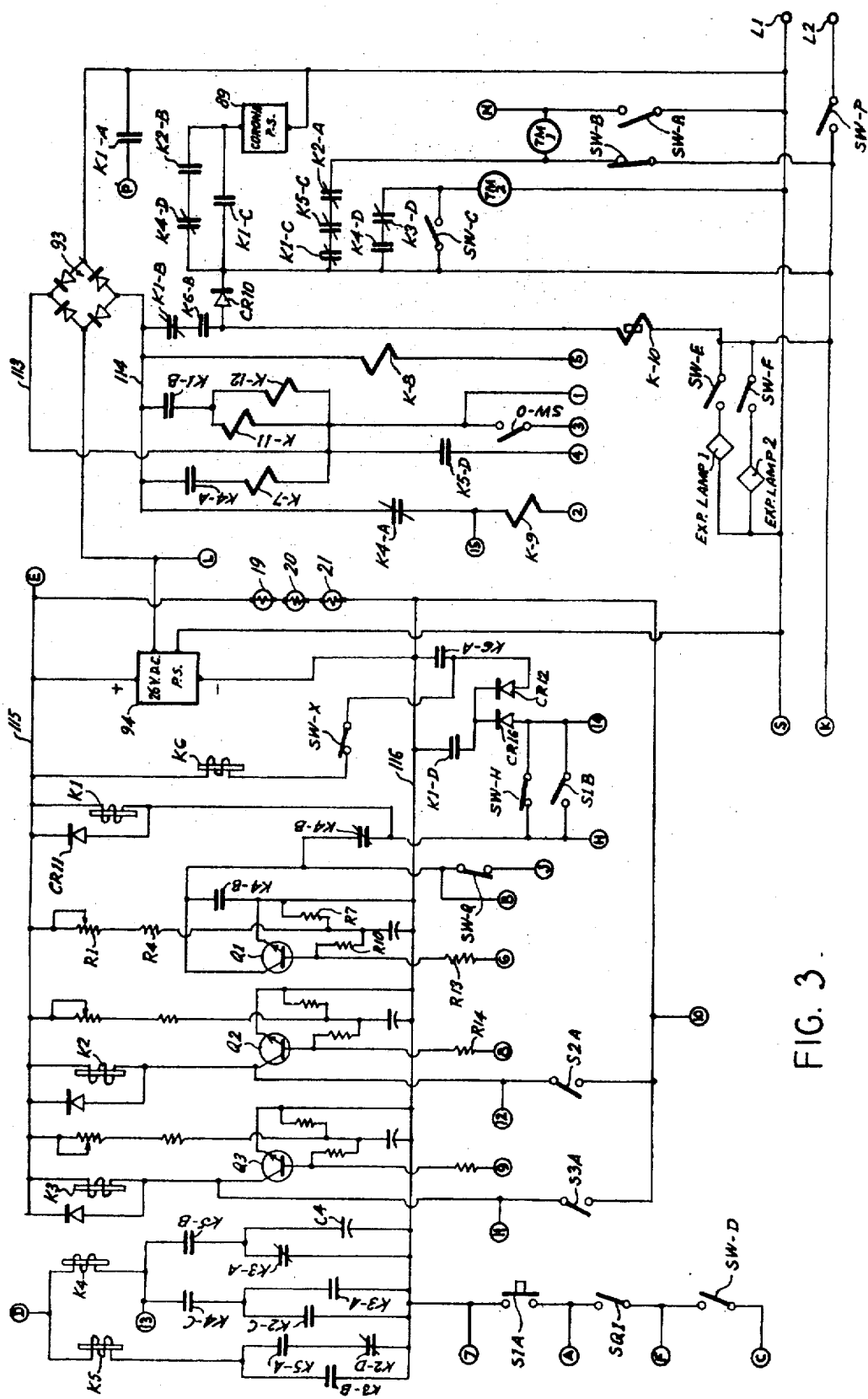
FIG. 3 depicts schematically the control circuit of the copying machine of FIG. 2 (which machine includes the various internal elements shown in FIG. 1), various points in the circuit being connected to respective pins in connector 132 on top of the machine.
Figure 18:
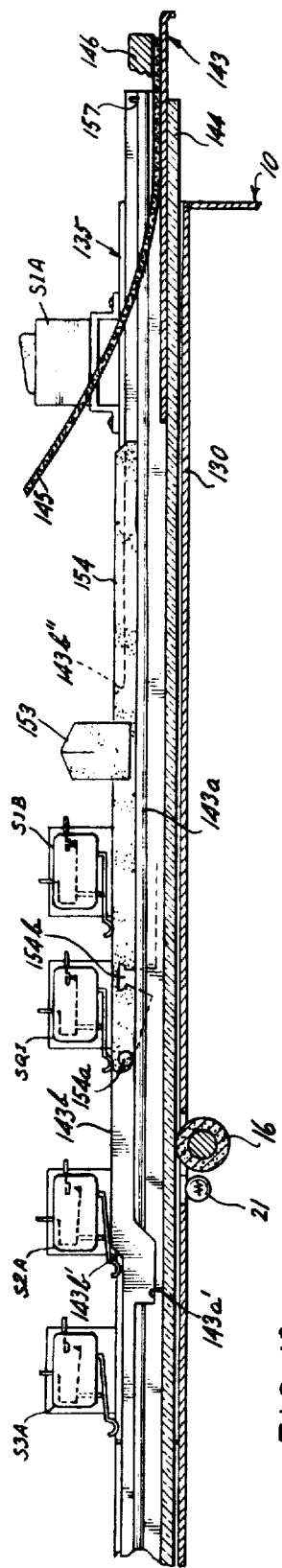
Figure 19:
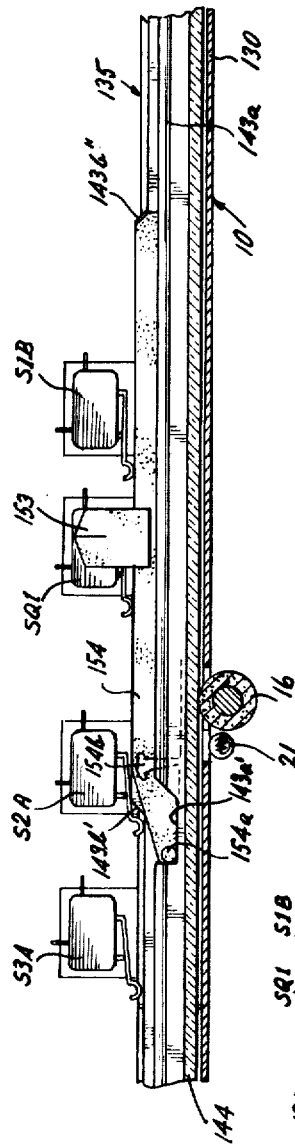
Figure 20:
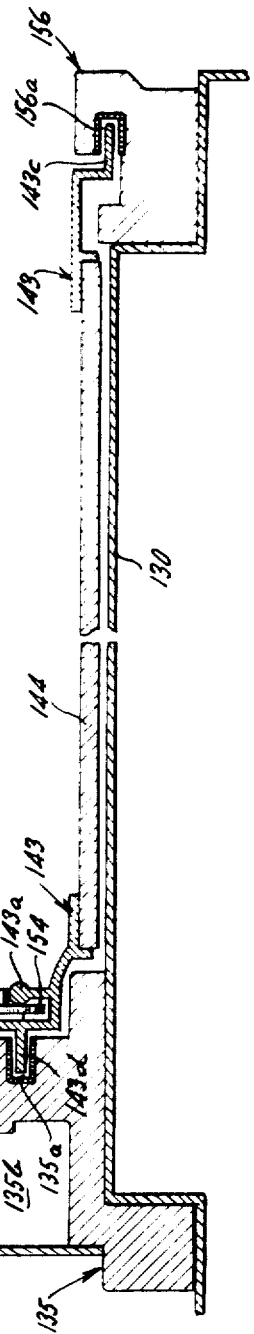
Figure 27:
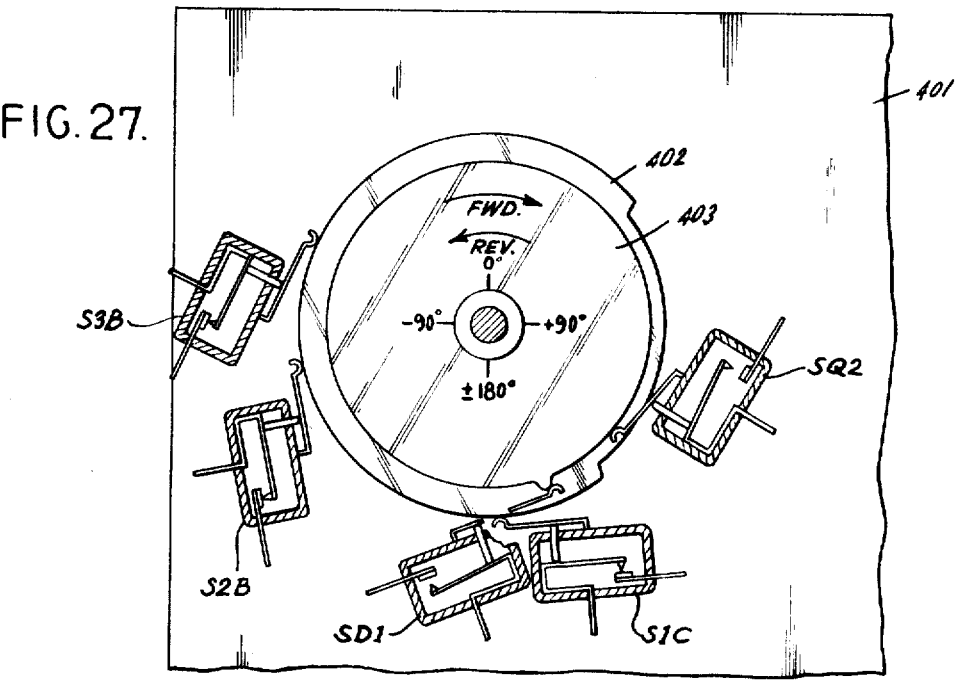
Figure 28:
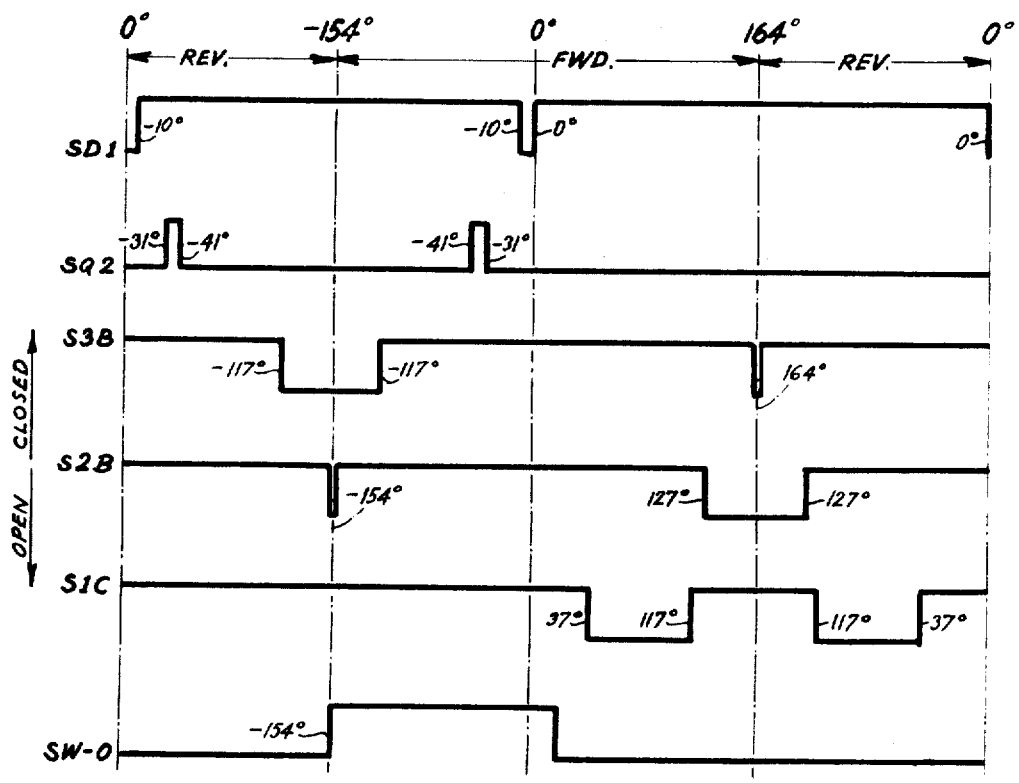
Figure 29:
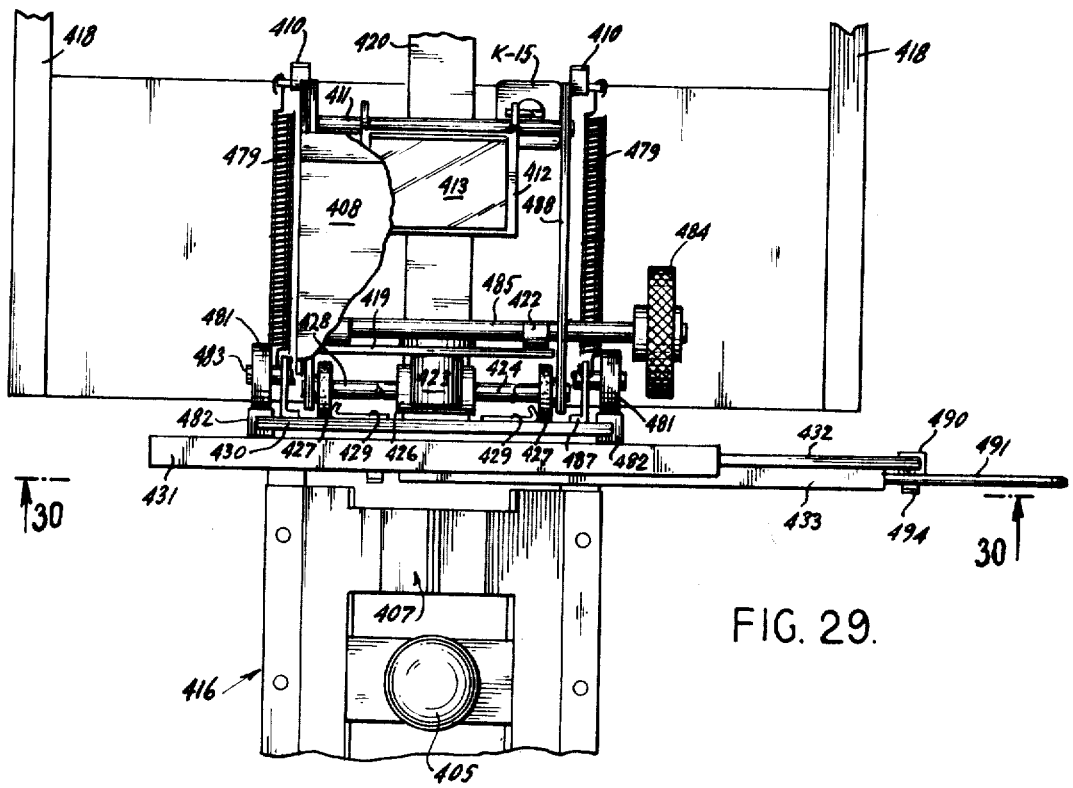
Figure 30:
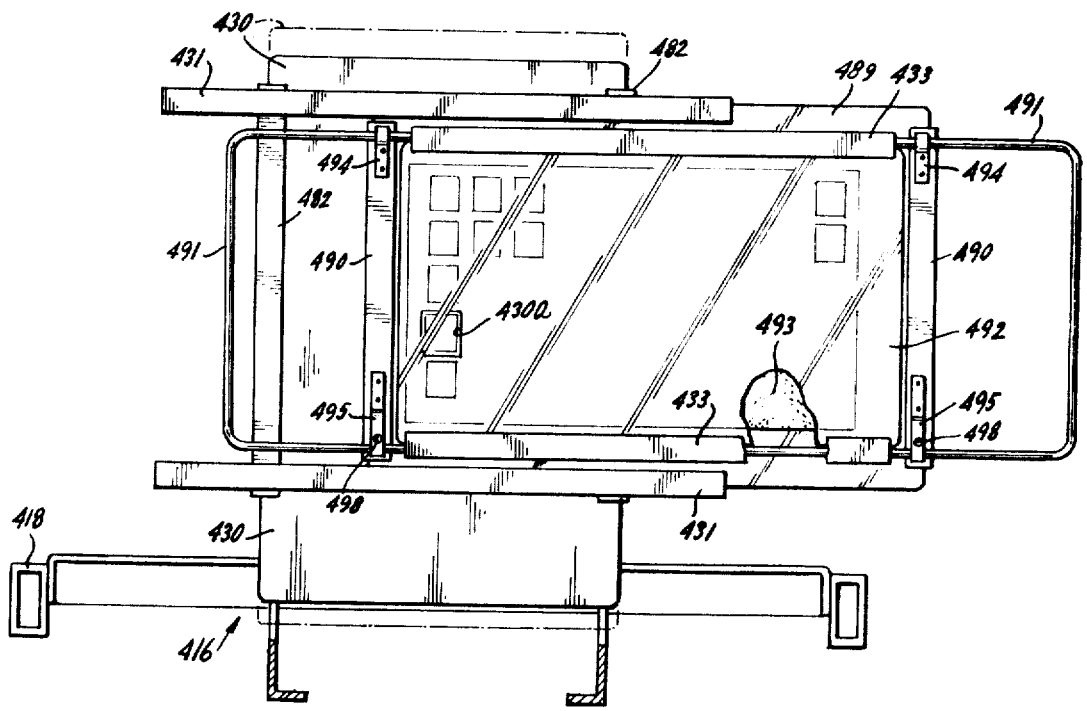
Figure 31:
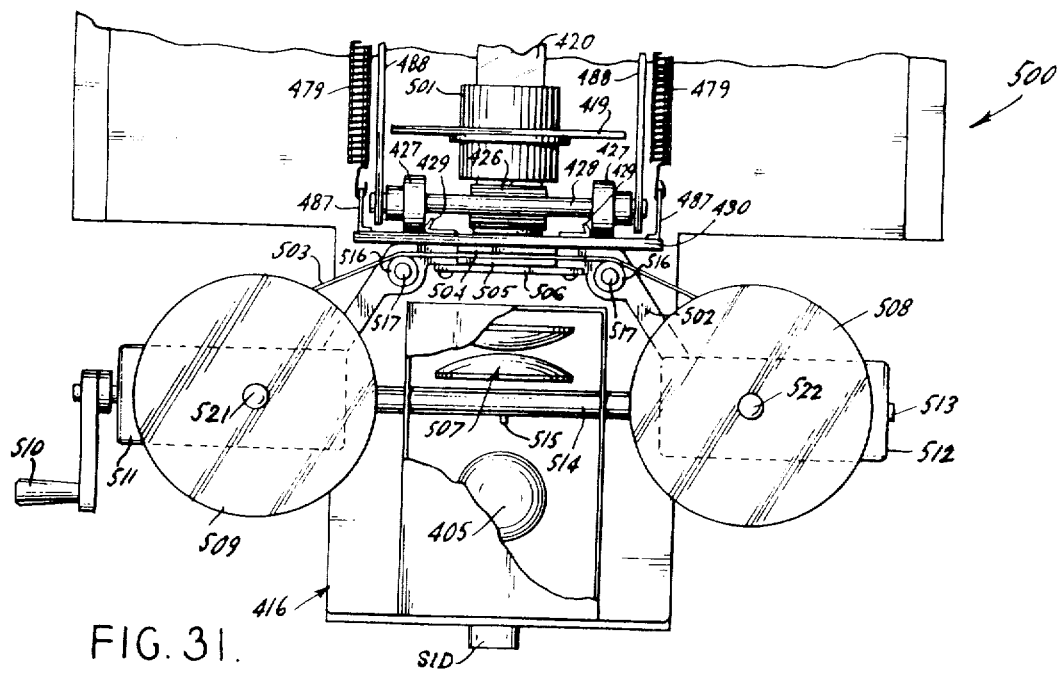
Figure 32:
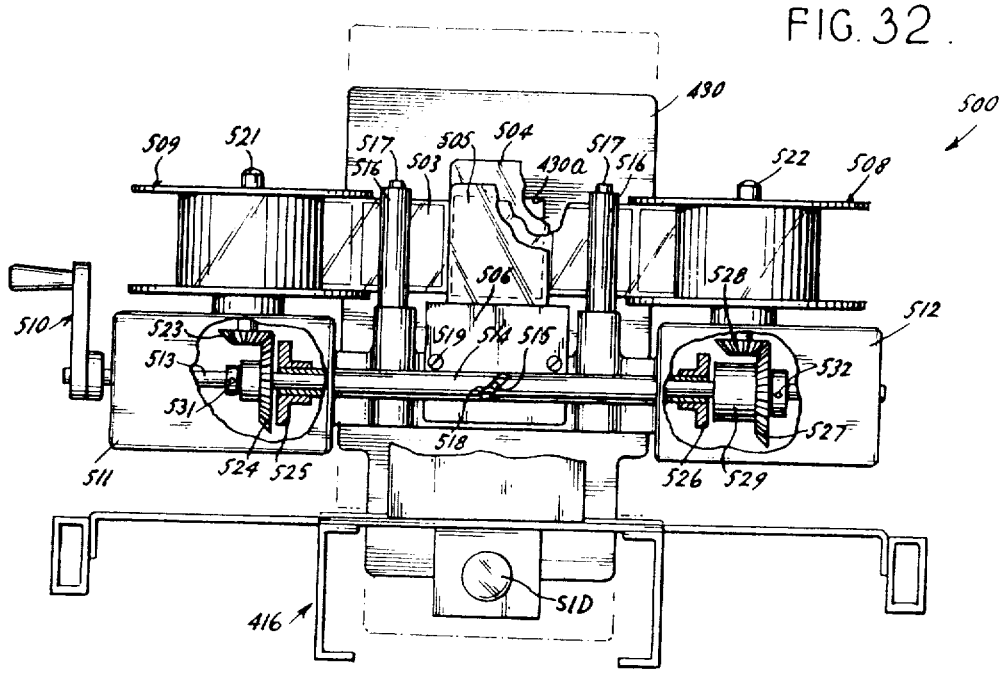
Figure 34:
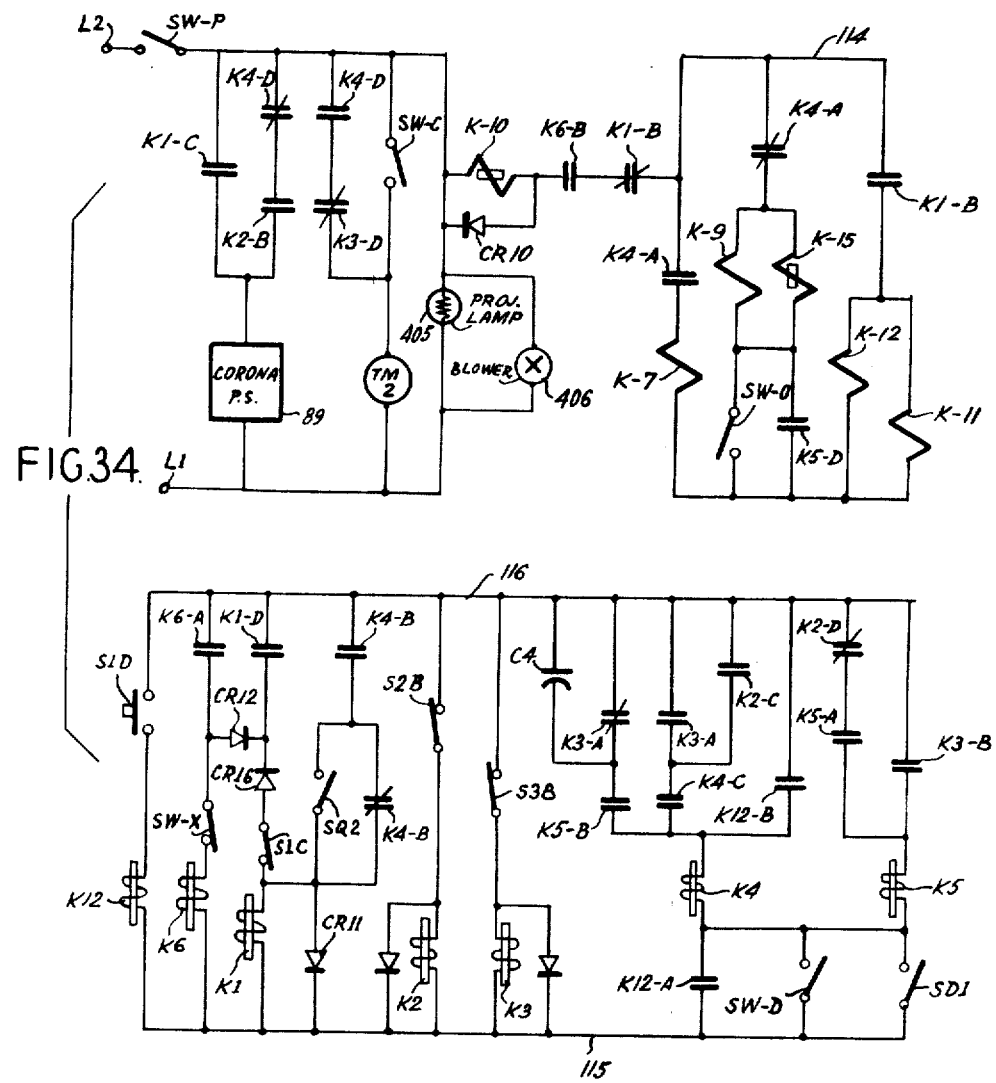
Figure 33:
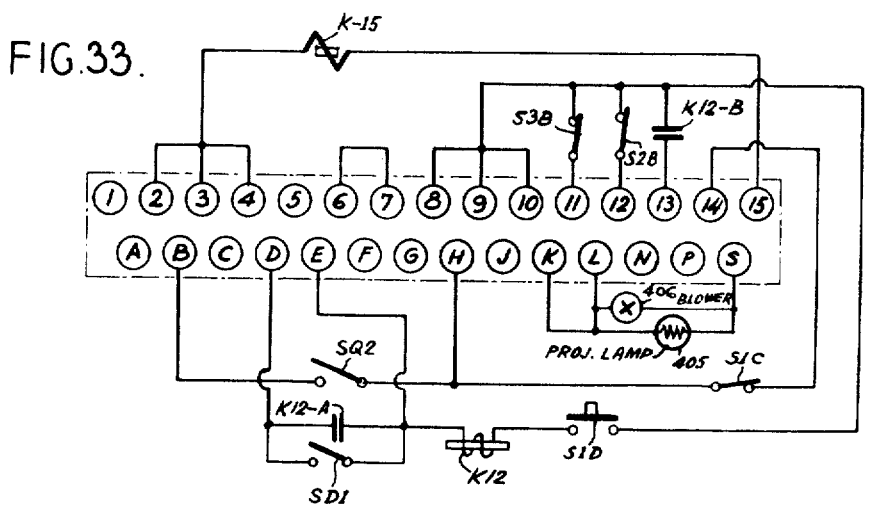

FIG. 12, a sectional view taken through line 12—12 of FIG. 9, depicts the locking mechanism for securing the letter bridge to the top of the copying machine;

FIG. 13 illustrates the pin connections in connector 201 of the letter bridge;

FIG. 14 depicts the circuit of FIG. 3 which results when connector 201 of the letter bridge is mated with connector 132 of the copying machine (which connector has various pins coupled to numerous points in the circuit of FIG. 3);

FIG. 15 is a top plan view of the copying machine with the second attachment, the book copier, secured in place;

FIG. 16 is a side view of the copying machine, shown partially broken away, and illustrates the manner in which rails 151 and 152 are attached to the machine, and the manner in which lever 162 is moved when rail 151 is put in place;

FIG. 17 depicts the manner in which mirror 176 is moved within the machine when rail 151 is put in place;

FIG. 18 is a sectional view taken through the line 18—18 of FIG. 15;

FIG. 19 is similar to FIG. 18 but shows movable cam 154 moved to the left relative to the position shown in FIG. 18;

FIG. 20 is a sectional view taken through the line 20—20 of FIG. 15;

FIG. 21 illustrates the connections made in electrical connector 188 of the book copier;

FIG. 22 shows the copying machine control circuit which results when connector 188 of the book copier is mated with connector 132 on the copying machine;

FIG. 23 is a sectional view of the third attachment, the microfilm reader, when placed on the copying machine, the figure being a sectional view taken through line 23—23 of FIG. 26;

FIG. 24 illustrates the sequence in which the microfilm frame 464 is moved during a copying cycle;

FIG. 25 is a side view of the microfilm reader attached to the copying machine;

FIG. 26 is a top plan view of that part of the microfilm reader attached to the copying machine;

FIG. 27 is a sectional view taken through line 27—27 of FIG. 26 and shows the positions of five switches relative to cams 402 and 403 in the microfilm reader (the switches are not shown in FIG. 26, it being understood that they are situated around the two cams as shown in FIG. 27);

FIG. 28 illustrates the manner in which the various switches shown on FIG. 27 open and close during a copying cycle;

FIG. 29 is a top plan view of the projection end of the microfilm reader;

FIG. 30 is a sectional view of the microfilm reader taken through line 30—30 of FIG. 29;

FIG. 31 depicts an alternative arrangement for the microfilm reader in which the frame to be copied is contained on a microfilm reel rather than a microfiche card;

FIG. 32 is a rear view, partially broken away, of the arrangement shown in FIG. 31;

FIG. 33 depicts the electrical circuit included in the microfilm reader and terminating at various pins in connector 470; and FIG. 34 depicts the circuit which results when connector 470 is attached to connector 132 on the copying machine.

GENERAL DESCRIPTION OF VAN AUKEN ET AL. MACHINE OPERATION

The arrangement of the various components in the copying machine of our invention is similar to that in the machine disclosed in the above-identified Van Auken et al. application (although the electrical circuits are different and there exist various mechanical differences as well, to be described below). For this reason an understanding of the Van Auken et al. machine will facilitate an understanding of the present invention.

The copy paper used in the machine is electrophotographic in nature. It has the ability to retain an electric charge placed on its photoconductive coating by an electrostatic field. The coating can be discharged by the application of light. Typically, copy paper roll 33 of FIG. 1 consists of a base paper with photoconductive zinc oxide particles dispersed in a resin coating. An electrical charge is placed on the front and back surfaces of the zinc oxide coating. When light strikes the zinc oxide particles they become conductive and the charged surfaces are neutralized.

As the leading edge of the copy paper roll 33 passes through rollers 35, 36, 39, 40 and 41, 42, the paper passes through the corona shields 43, 44 which house two sets of very fine wire elements (not shown) across which is placed a high DC voltage supply. The negative wire elements are contained within shield 44 while the positive wire elements are contained within shield 43. The shields aid in establishing the corona field.

As the copy paper passes through the two sets of oppositely charged wire elements, a uniform negative charge is applied to the photoconductive coating on the surface facing shield 44. A uniform positive charge is placed on the surface of the coating facing shield 43. The charges placed on the surfaces of the copy paper will be retained for a reasonable length of time provided it is not exposed to any light. When light strikes the photoconductive coating, the zinc oxide particles which are exposed become conductive, neutralizing the negative and positive charges in the exposed areas.

As the copy paper passes the exposure window consisting of a glassless window strung with monofilament 64 and pressure member 23, the photoconductive coating is exposed in accordance with dark and light areas on the original to be copied. Rotary knife 38 cuts a copy sheet from the roll such that the cut sheet is the same length as the original to be copied. When knife 38 operates, the copy roll paper feed stops, although the cut copy sheet continues to move past the exposure window to trough 47 in the developing section of the machine.

Figure 1:
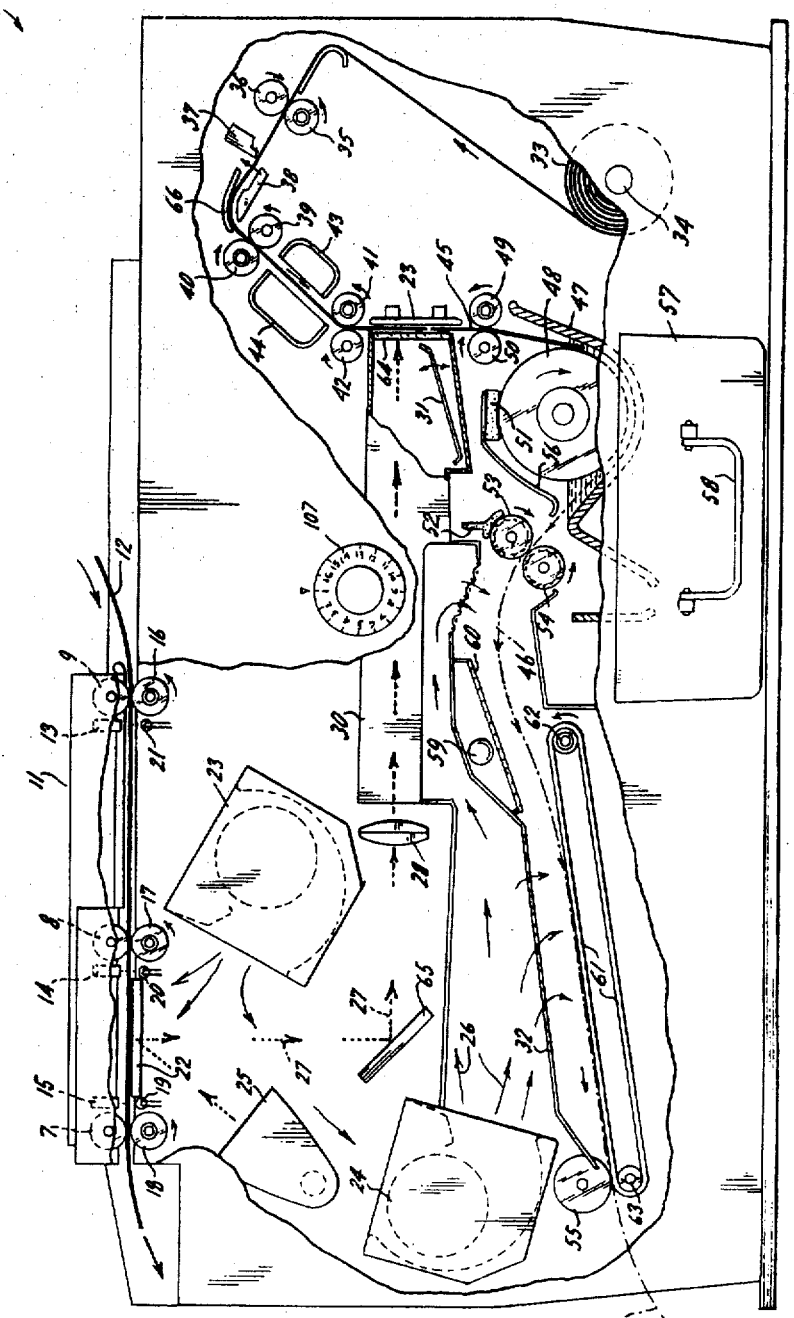
FIG. 1 is the same as FIG. 1 in the Van Auken et al. application Ser. No. 725,390 and depicts the general layout of the various elements included in the copying machine with which the microfilm attachment of our present invention is used.

The original document 12 is fed into the machine between rollers 9, 16 which turn to move the original in the direction shown (from the right end of the machine in FIG. 1 to the left end). As the original passes the scanning window, on top of glass plate 22, light from two exposure lamps (shown in phantom in FIG. 1) within reflector 25 is reflected from the light image areas on the original along the dotted arrows 27 as shown. The light passes through lens system 28, assembly 30 and window 64 to expose the copy paper. The copy paper feed is controlled such that the leading edge of the copy sheet within the exposure window is in optical synchronization with the leading edge of the original within the scanning window. The copy paper retains a negative charge in those areas corresponding to dark (image) areas on the original. The non-image areas on the original reflect a great deal of light to the surface of the copy paper causing the neutralization of the charged areas corresponding to the non-image areas on the original.

The copy sheet is then fed to trough 47. As shown in the drawing, the forward end of the copy paper has just entered the trough. The copy sheet continues to travel along path 46 until the copy sheet is ejected from the machine. In trough 47 there is a developer solution consisting of charged toner particles which are attracted to the negatively charged image areas on the copy paper. The attracted toner particles are impregnated and fixed to the copy paper coating by a system of squeegee rollers and forced hot air drying.

Figure 2:
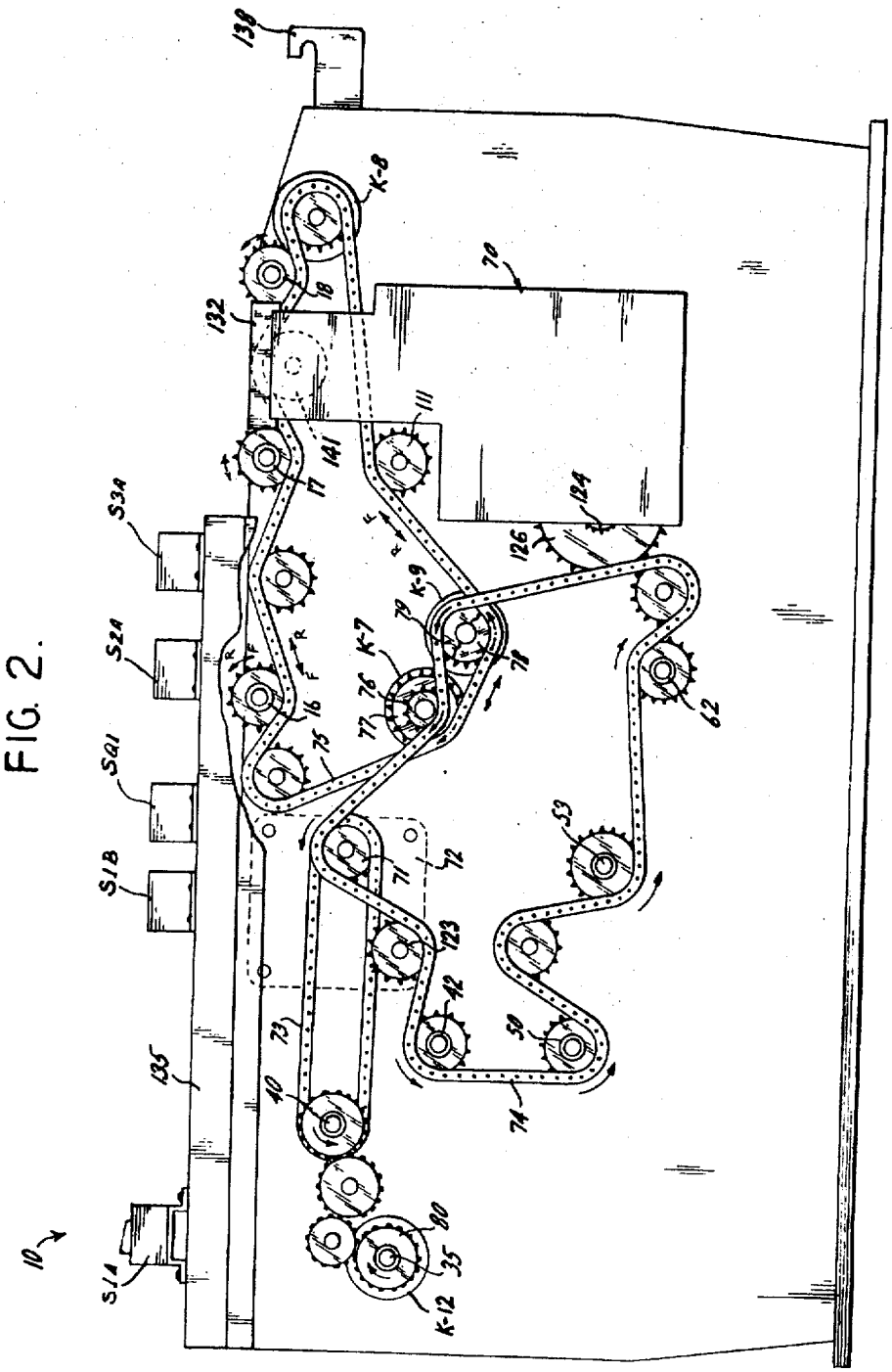
FIG. 2 is a side view of the copying machine (with the side cover removed) and depicts the chains for driving various elements in the machine, and the positions of four switches and a start button on top of the machine.

The machine includes two basic systems of feed rollers or paper transport rollers. One system is kept constantly rotating by a series of sprockets and drive chains, while the second system is clutch-controlled so that it operates only when one of two clutches is engaged. FIG. 2, to be described below, shows these systems in the machine of our invention. However, for the most part, except for differences in numeral designations and a few other differences, FIG. 2 is the same as FIG. 2 of the Van Auken et al. application. Accordingly, operation of the Van Auken et al. machine can be understood with reference to FIG. 2. (In the description below, the reference numerals correspond to those shown in FIG. 2, rather than the equivalent sheet in the Van Auken et al. application.)

When original document 12 is inserted between pick-up rollers 9, 16 the original is transported to the left in FIG. 1. As the leading edge of the original emerges from rollers 9, 16, it actuates photocell switch 13. Each of photocell switches 13, 14, 15 is provided with a respective light source 21, 20, 19. When the leading edge of the original passes between a light source and its respective photocell switch, the change in state is registered and used to control the machine operation. When switch 13 first operates, copy paper roller clutch K-12 (FIG. 2) is energized to cause copy paper insert rollers 35, 36 to rotate. These rollers pull the forward edge of the copy roll to direct the copy paper through the corona unit. The other rollers along the copy paper path continuously operate. Initially, the forward edge of the copy paper is adjacent to blade 37 and knife 38. Thus, although the rollers following the knife along the copy paper path rotate continuously there is no copy sheet to be transported through the machine. But once rollers 35, 36 start operating, copy paper is drawn from the roll into the copy paper transport system. The corona unit within shields 43, 44 charges the surfaces of the copy paper. The original and the copy paper are synchronized in their movements. The distance along the copy paper path from the knife to the intersection of the optical axis with the exposure window equals the distance from photocell switch 13 to the intersection of the optical axis with the scanning window. Since the rollers along the original and copy paths move the original and the copy paper at the same speed, and since the copy paper starts to move past the knife under control of rollers 35, 36 just when the forward edge of the original is adjacent photocell switch 13, it is seen that the original and copy paper are in optical synchronization with each other during the scanning process.

As the trailing edge of the original passes photocell switch 13, the copy paper roller clutch K-12 is disengaged. Rollers 35, 36 stop turning and copy roll 33 remains stationary. At the same time a knife solenoid (not shown on FIGS. 1 and 2) is energized to cause rotary knife 38 to cut the copy paper to the exact length of the original. The cut sheet continues to be transported by the copy paper transport system through developer trough 47. Intensifier drum 48 is constantly turned in the direction shown. (It is possible to turn it in the opposite direction, and at various speeds as well.) This insures that the copy paper is guided through the developing trough. The developer solution itself is contained in tank 57 which can be pulled out of the machine by handle 58. A pumping system (not shown) pumps the developer upward into trough 47.

The copy sheet then passes under deflector 56 toward the nip of squeegee rollers 53, 54. The squeegee rollers remove the excess liquid dispersant from the copy paper and to some slight degree also imbed the attracted toner particles into the zinc oxide coated surface of the copy paper. Wiper 52 wipes metal squeegee roller 53 to prevent "tracking back" or offsetting of a previous image, just as wiper 51 wipes intensifier drum 48. The copy sheet is then forced down by the circulating air under drier lamp 59 onto belt 61 which moves continuously around rollers 62, 63, roller 62 being turned by the constantly rotating chain drive. The copy sheet is finally passed between belt 61 and plastic idler rollers 55, several of which may be included on the same shaft. These rollers slightly crease the copy paper so that it ill stack properly in the copy receiving tray (not shown).

Blowers 23, 24 force air (shown by arrows 26) through the machine as is well known in the art, for example, to dissipate the heat generated by the exposure lamps. A series of guides 32 are provided for properly directing the air.

Figures 5, 6:
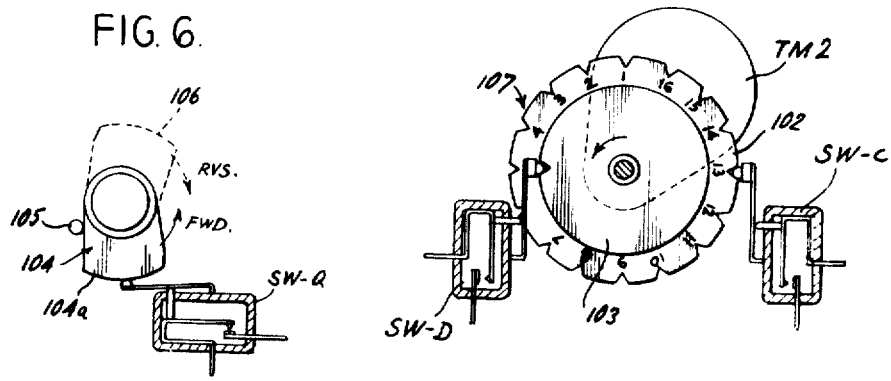
FIG. 5 depicts the two switches and cams which control multiple copying of an original and are included in the copying machine.
FIG. 6 depicts another switch and cam included in the copying machine.

Shutter 31 can be moved up and down from outside the machine (not shown); the lower the right end of the shutter, the larger the opening and the greater the exposure. The units shown symbolically on FIG. 1 are generally of types well known in the art and for the purposes of the present invention need not be gone into in any greater detail. A machine constructed in accordance with the principles of our invention includes many mechanisms, controls and indicators, not shown in the drawing. For example, various indicator lights may be provided to notify the operator when additional developer solution is required or when a new roll of copy paper must be placed in the machine. The only control shown in FIG. 1 is that required for an understanding of the present invention, namely, the multiple copy selector dial 107 (see also FIG. 5). (FIG. 5 is identical to FIG. 5 in the Van Auken et al. application.) This dial is marked in equal graduations numerically representing the number of copies desired. The selector dial can be reset at any time during machine operation providing for maximum flexibility. If the selector dial is allowed to remain in the normal position (single copy mode) shown in FIG. 5, the machine will produce only one copy for each original inserted into it. Any other position will provide the number of copies as indicated by the selector dial setting.

In the multiple copy mode, during the first cycle the original is scanned in the usual manner. Before it has travelled far enough to be released by the last set of rollers 7, 18, the trailing edge of the original actuates photocell switch 15. This causes the original transport roller system to reverse and return the original, at a speed greater than the forward speed, to the right toward the normal insertion point. When the leading edge of the original clears photocell 14, the original transport roller system is again normalized and transports the original to the left past the scanning window where it is scanned a second time. (All references herein to leading and trailing edges of the original are made respectively to the left edge of the original and the right edge of the original in FIG. 1. Thus, even when the original is being transported in the reverse direction, the leading edge is still considered to be the leftmost edge in FIG. 1.) This procedure is repeated until the multiple copy selector dial 107 is "counted down" to the normal single copy mode position. The dial is decremented one position for each copy made by the machine. When all copies have been made except the last, the selector dial is fully decremented to the single copy mode position, at which time the machine will produce one more copy and deposit the original in the original receiving tray.

To speed up the multiple copy operation, the original is returned only so far as to allow its leading edge to clear the forward end of the scanning window. Since the original immediately starts its forward movement, it is necessary for the leading edge of the copy sheet to be at the forward end of the exposure window by this time, i.e., the copy feed must start while the original is still being moved in the reverse direction. In the single copy mode, the copy feed starts when photocell 13 detects the leading edge of the original. But in the multiple copy mode, except during the first forward feed of the original, the leading edge of the original does not pass photocell 13. For this reason an alternate mechanism must be provided for initiating the copy feed during reverse movement of the original.

Cam 106 (FIG. 6—identical to FIG. 6 of the Van Auken et al. application) is clutched to the original forward feed system when the leading edge of the original passes photocell switch 15. The cam rotates counterclockwise as the original continues in the forward direction. When the original starts to move in the reverse direction, cam 106 starts restoring in the clockwise direction. The cam is fully restored when the leading edge of the original passes photocell 15 in the reverse direction. But during the clockwise movement of cam 106, some time prior to its full restoration, switch SW–Q is operated. The operation of the switch starts the copy paper feed. The leading edge of the original must yet travel back past photocell 15 (switch SW–Q operates while the leading edge of the original is still to the left of photocell 15 in FIG. 1) and the scanning window to photocell 14. The leading edge of the copy paper must travel from the knife to the forward end of the exposure window during the same time interval. The original reverse feed rate is greater than the copy feed rate. To assure proper registration of the original and copy within the scanning and exposure windows it is only necessary to have cam 106 operate switch SW–Q at a point during the reverse movement of the original where the ratio of the distance of the leading edge of the original from photocell 14 to the distance between the knife and that point in the copy sheet path of movement where the copy sheet becomes synchronized to movement of the original is equal to the ratio of the original reverse feed rate to the copy feed rate. In this way the leading edge of the original will reach photocell 14 just when the leading edge of the copy sheet reaches the exposure window.

As soon as photocell 14 detects the leading edge of the original, the original starts moving in the forward direction at the same speed as the copy paper is moving. It is still necessary to cut the copy sheet. This is easily accomplished. The positions of the original and copy paper are the same as though the machine were operating in the single copy mode. Consequently, when photocell 13 detects the trailing edge of the original, it actuates the cutting mechanism and inhibits further feed from the copy paper roll. The length of the cut copy sheet during each cycle in the multiple copy mode is thus the same as that of the original.

GENERAL DESCRIPTION OF VAN AUKEN ET AL. ORIGINAL AND COPY TRANSPORT SYSTEMS

Referring to FIG. 2, when the main drive motor 72 is energized by the system on-off switch (not shown) it rotates main drive sprockets 71 counterclockwise. Main drive chain 74 is driven in a counterclockwise direction by sprockets 71. This chain turns various sprockets, including tension adjustment idler sprocket 123 and the sprockets coupled to rollers 42, 50, 53 and 62. These four rollers turn continuously to move the copy paper. The fifth roller which is continuously turned in the path of the copy paper is roller 40, coupled to a sprocket driven by drive chain 73. Chain 73, like chain 74, is driven by sprockets 71 as long as the main power switch is energized. Chain 74 drives sprocket 79 in the counterclockwise direction and drives sprocket 76 in the clockwise direction. Sprocket 76 rotates at a greater speed than that of sprocket 79 because of its smaller diameter.

Chain 75 is the original transport drive chain. It is driven indirectly by main drive chain 74 through an electrical clutch system. When forward clutch K-9 is energized, sprockets 78 and 79 are clutched together and sprocket 78 moves with continuously rotating sprocket 79. Drive chain 75 moves in the forward (F) direction, and since the diameter of sprockets 78 and 79 are the same, chain 75 moves at the same speed as chain 74. Since the transport rollers have the same diameters, the original and copy sheets move through the machine at the same speed. Chain 75, in addition to moving over a tension adjustment idler sprocket 111, drives the three sprockets coupled to rollers 16, 17 and 18. Referring to FIG. 1, these are the three driven rollers in the original transport system.

During multiple copying the original is first transported in a forward direction to be scanned and is then returned in the reverse direction at high speed. This forward and reversing process continues as long as the machine remains in the multiple copy mode. When the original is being returned, forward clutch K-9 is de-energized and sprocket 78 is no longer coupled to sprocket 79. At the same time reverse clutch K-7 is energized, which engages reverse sprocket 77 with sprocket 76. Since sprocket 76 moves at a faster rate than sprocket 79, and sprocket 77 when clutched to sprocket 76 moves at its rate, chain 75 moves in the reverse (R) direction at a greater speed than it does in the forward direction. With chain 75 moving clockwise, rollers 16, 17 and 18 move in the reverse direction (opposite to that shown in FIG. 1) to return the leading edge of the original to the forward end of the scanning window. When this point is reached, the control circuits again change the driving direction of chain 75 by de-energizing reverse clutch K-8 and energizing forward clutch K-9.

Although chain 73 continuously drives the sprocket coupled to roller 40, as well as the three gears following it and terminating in gear 80, roller 35 does not rotate continuously. This is the roller which starts the copy paper feed. Only when clutch K-12 is operated is roller 35 coupled to gear 80. At this time copy paper feed begins.

The drive system is shown only schematically in FIG. 2, since the basic elements of such a drive system are well known. For example, it is understood that chain 74 can be used to drive any other elements which must be driven in the machine. The important thing to note in FIG. 2 is the use of three clutches in connection with sprocket pairs 78, 79 and 76, 77, and gear 80. The first clutch controls the forward movement of the original document. The second clutch controls the reverse movement of the original document at a faster speed. The third clutch controls copy paper feed.

In the original transport system, rollers 16, 9 serve as the original input rollers, rollers 17, 8 serve as the scanner input rollers, and rollers 18, 7 serve as the original exit rollers. As described above, rollers 16, 17 and 18 are driven by chain 75 in either direction. Rollers 7, 8 and 9 are contained in bridge assembly 11 and are in friction contact with their respective lower rollers when bridge 11 is placed on the machine. The bridge is removable so that in the event of an original jam, it can be corrected with little difficulty. Photocell switches 13, 14 and 15 contained in bridge 11 are connected to the rest of the machine by contacts on bridge 11. The bridge also includes a pressure plate (not shown) for bearing against the original on top of scanning glass 22. The spacing between the pressure plate and scanning glass 22 is several paper thicknesses.

An original collecting tray (not shown) is provided at the left end of the machine of FIG. 1 for collecting successive originals as they are fed through the machine. During multiple copying, the original is scanned in the forward direction in the usual manner, but before it is released by exit rollers 7, 18, all three pairs of transport rollers are automatically reversed and the original is returned at high speed in the reverse direction. The control circuit to be described below prevents a copy from being made while the original is being reversed. The original continues to be transported in the reverse direction until the leading edge is to the right of scanning window 22 at which time the control circuit again causes the original to be transported in the forward direction to be scanned again. Photocells 14 and 15 are disposed at each end of the scanning glass and serve various functions to be described below. Photocell 13 serves to control the length of the cut copy sheet as well as the copy paper feed.

Copy paper roll 33 is mounted on copy paper roll shaft 34. Although not shown, as is known in the art, provision is made for placing new copy paper rolls on the shaft as they are used up.

The operations of the original transport system during the single and multiple copy modes are considerably different. However, with respect to the copy transport system the operation is the same. Rollers 35, 36 and knife 38 control successive feedings of copy sheets into the copy transport system.

COPYING MACHINE CIRCUIT—FIGS. 3-7

FIG. 3 depicts schematically the control circuit of the copying machine which includes the various elements shown in FIG. 1, without bridge 11. As will be described below, any of several different attachments (three are described hereinafter) may be placed on top of the copying machine. As will be described in greater detail below, the top of the copying machine includes three rollers, 16, 17, 18 (FIG. 1) a scanning window 22, and three exciter lamps 19, 20, 21. Also, at the top of the copying machine, there is an electrical connector having a number of pins coupled to various points in the circuit of FIG. 3. The various circles shown in the circuit of FIG. 3 represent the pins, with the number or letter in each circle representing the pin number or letter. The pins are identified by the numbers 1–15 and the letters A–H, J–L, N, P and S. (No connection is made to pin G, an "extra pin".)

It is difficult to understand the operation of the overall circuit in any one of the three possible modes with reference to FIG. 3. Although the electrical circuit of each of the three attachments, as well as the pin connections in each of the attachments, are shown in separate figures, it is far easier to understand the operation of the machine in any particular mode by "redrawing" the circuit which results when each of the attachments is placed on the machine. The "redrawn" circuits will be considered below. Furthermore, to simplify matters, the redrawn circuits have omitted from them all of the elements which do not function in the particular mode. For example, switches S1A, S1B, S2A, S3A and SQ1 are included on top of the machine. However, these switches are closed only by the book copier platen, and accordingly do not enter into the system operation in the letter copier and microfilm reader modes. For this reason, the redrawn circuits for the two latter modes do not depict these switches.

As another example, consider pin E on FIG. 3. This pin is connected to positive potential bus 115. Referring to FIG. 13 which shows the electrical connections within the letter copier bridge (as will be described more fully below), the letter copier bridge includes a circuit board which interconnects pins E and F on the copying machine. Referring back to FIG. 3, it is seen that pin F is connected to both switch SQ1 and switch SW–D. Thus, in the letter copier mode, the positive potential bus 115 is connected between the two switches. Switch SQ1 is on top of the machine and is closed only by the book copier platen. Thus in the letter copier mode switch SQ1 does not close and there is no need to include it in the redrawn circuit of FIG. 14 for the letter copier mode inasmuch as the potential at pin F on the copying machine cannot be extended through switch SW1 to any other point in the circuit. However, switch SW–D in the copying machine (FIG. 4) closes when multiple copies of any original (letter, book or microfilm) are being made, as will be described below. Switch SW–D, when closed, connects pin F to pin C. Referring to FIG. 13, it is seen that in the letter copier mode, the circuit board in the bridge connects pin C to pin D. Referring back FIG. 3, it is seen that pin D is connected to the windings of relays K4 and K5—which operate when multiple copies of a letter are being made. Consequently, the redrawn circuit for the letter copier mode includes switch SW–D.

From this simple example, it becomes apparent that for an understanding of the system operation, it is necessary to focus not on FIG. 3 in conjunction with the circuit connections established by each of the three attachments, but instead on the complete, redrawn circuits which result when the three different attachments are put in place. The redrawn circuits are shown in FIGS. 14, 22, and 34. The pins themselves are not shown on these figures inasmuch as this would not help in understanding each circuit operation. FIGS. 14, 22 and 34 depict only those elements necessary for an understanding of the machine operation in the three different modes.

Figure 4:
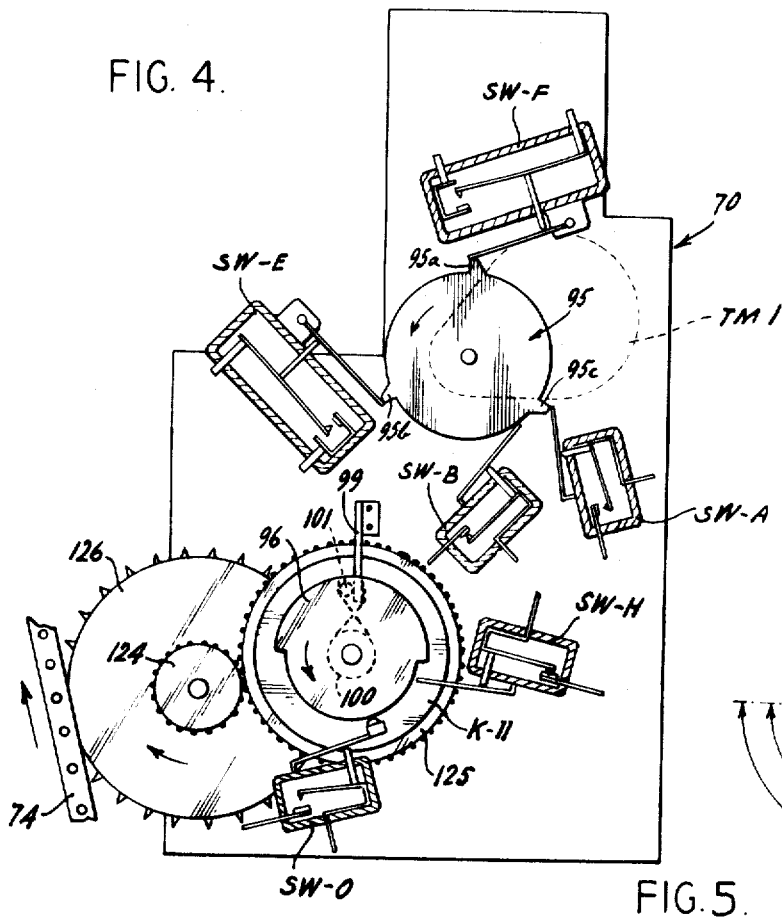
FIG. 4 depicts various cams and switches contained within two cover plates 70 (shown in FIG. 2)

Before proceeding with a description of the machine operation in the various modes, in which cases few references will be made to FIG. 3 but rather to the redrawn circuits depicting the operative elements in each of the three modes, certain of the elements on FIG. 3 should be understood. Lines L1, L2 are connected to a source of power, the circuit path being completed when the machine on-off switch SW-P is closed. Line L2 is extended through switches SW-E, SW-F and respective exposure lamps 1 and 2 back to line L1. The two switches are shown in FIG. 4 and are closed when cam 95 is rotated by timing motor TM1 as will be described below. The closing of the two switches controls energization of the exposure lamps within reflector 25 of FIG. 1.

The other switches which are shown on FIG. 3 and are included inside the machine are the switches shown on FIGS. 4, 5 and 6, namely, switches SW-A, SW-B, SW-H, SW-O, SW-Q, SW-C and SW-D. The operation of all of these switches will be described below. Switch SW-X is also included inside the machine, but is not shown in any of FIGS. 1, 2, 4–6. This switch is normally closed and opens only when knife 38 of FIG. 1 is actuated. At the end of the stroke of the knife, switch SW-X opens. When the knife releases, the switch closes once again. The switch can be any of many different types which are controlled to open at the end of the knife stroke.

The only other switches shown in FIG. 3 are switches S1A, S2A, S3A, S1B and SQ1. These five switches are not "inside" the machine, but are instead placed on top of the machine. Switch S1A is exposed to view on top of the machine and is the "start" button which is pushed down to initiate operation of the machine in the book copier mode. The other four switches are not exposed to view but are operated by the book copier platen as it shuttles back and forth on top of the machine. In the letter copier and microfilm reader modes, switch S1A is not operated and similarly the four platen-operated switches are not operated. All five switches remain open. It is for this reason that these five switches, although part of the copying machine circuit, are not shown in FIGS. 14 and 34, which depict the operative parts of the system for the letter copier and microfilm reader modes.

Full-wave rectifier 93 derives a 90-volt potential across conductors 113, 114, with conductor 113 being positive with respect to conductor 114. The potential across these two conductors controls the operations of various clutches and timing motors. There is no need to develop the potential in the event no attachment is placed on top of the machine. For this reason, an "interlock" is provided to prevent the extension of power to the full-wave rectifier in the event no attachment is placed on the machine. Line L1 is extended directly to one of the input terminals of the rectifier. The other input terminal of the rectifier is connected to pin L. With no attachment on the machine, pin L is "floating" and no potential is developed across conductors 113, 114. But in the event one of the attachments is placed on the machine, pin L is connected to pin K in the attachment. (This connection is made in all three attachments.) Pin K is in turn connected to on-off switch SW-P in line L2. Thus, only if one of the attachments is placed on the machine is the potential developed in the machine for operating the various timing motors and clutches.

Power supply 94 serves to derive a 26-volt potential across conductors 115, 116, with conductor 115 being positive with respect to conductor 116. This potential serves to operate the various relays included in the machine. The power supply has two inputs. One is connected directly to line L1. The other is connected to pin L, which can be connected to pin K (and line L2) only through one of the attachments. Consequently, power supply 94 also operates only when one of the attachments is on the machine. The power supply is connected directly across photocell exciter lamps 19, 20, 21. These lamps are required in the letter copier mode to detect the leading and trailing edges of an original document transported back and forth across the top of the machine. Although the lamps are not required in the book copying and microfilm copying modes, the lamps are energized at all times, even when they are not required, inasmuch as they draw very little current.

In the circuit of FIG. 14, which shows the operative parts of the circuit in the letter copier mode, the photocell detectors are shown simply by boxes SW1, SW2, SW3. For this reason, it is necessary to understand how each of the "box" switches actually operates. Referring to FIG. 13, one end of photocell 13 included in the letter copier bridge is connected by the circuit board in the letter copier bridge to pin 6 in the machine, while the other end of the photocell is connected to pin 7. Referring to FIG. 3, it is seen that one end of the photocell is connected through resistor R13 to the base of transistor Q1 while the other end of the photocell is connected directly to the emitter of transistor Q1. The photocell functions as a variable potential source. When it is illuminated there is a voltage drop across the photocell and transistor Q1 does not conduct. Relay K1, connected through normally closed contacts K4–B to the collector of transistor Q1, is thus held de-energized. On the other hand, if light does not strike the photocell, the base of transistor Q1 goes positive with respect to the emitter, current flows through the collector circuit of the transistor and relay K1 is operated.

The positive potential of bus 115 is extended through level adjustment potentiometer R1 and resistors R4, R10 to the base of transistor Q1. The emitter of transistor Q1 is extended directly to negative box 116. The resistors have values such that with no potential contribution from photocell 13 the potential drop across the base-emitter junction of transistor Q1 is sufficient to cause conduction in the transistor and the operation of relay K1. However, photocell 13 is connected across the base-emitter junction such that the potential developed across the photocell reverse biases the base-emitter junction, that is, the negative terminal of the photocell is connected to the base of transistor Q1. As long as light from lamp 21 is detected by the photocell, transistor Q1 remains off and relay K1 remains de-energized. It is only when an original document to be copied passes between the lamp and the photocell that no potential is developed by the photocell, and transistor Q1 conducts with relay K1 operating. This operation is depicted in FIG. 14, where the entire lamp and photocell circuit is simply shown as switch SW1 which is normally open. Only when an original document to be copied passes between lamp 21 and photocell 13 does switch SW1 close and current flow through the switch and contacts K4–B to the winding of relay K1. A similar circuit is provided for relays K2 and K3. Referring to FIG. 13, the negative terminal of photocell 14 is connected to pin 8 and the positive terminal is connected to pin 10. Pin 10 is connected on FIG. 3 to negative bus 116 and pin 8 is connected through resistor R14 to the base of transistor Q2. An identical circuit is provided for photocell 15 and transistor Q3.

TOP OF THE COPYING MACHINE

FIG. 8 is a top plan view of the copying machine, and must be understood before the three attachments are considered. At the front of the machine are two brackets 138 (see FIG. 2) which are required for supporting both the book copier attachment and the microfilm reader attachment. The three rollers 16, 17, 18 are disposed on top of the machine, and one of exciter lamps 19, 20, 21 is adjacent to each roller. The rollers are driven by drive chain 75, idler gear 141 also being shown in the drawing. Between rollers 17 and 18 is scanning window 137, typically, a glass plate. On either side of the scanning window there is a pin 131. The pair of pins is required for locking the letter bridge and the microfilm reader in place on top of the machine.

On one side of the scanning window there is an electrical connector 132. This connector has a number of pins which are connected to various parts of the control circuit of the copying machine. Each of the attachments includes a similar connector, and when connector 132 is mated with one of the attachment connectors the control circuit which results is unique for the particular attachment. As will be described below, the system operation is considerably different for all three attachments.

An upstanding rail 156 (see FIG. 20) is provided on one side of the machine. This rail includes a groove 156a to guide one side of the book copier platen which is placed on top of the machine. At the end of the rail there is clip 133 (see FIG. 8) pivoted at 134. A pin 142 extends upward from the rear of the rail. With the clip in place as shown, pin 142 extends through a hole in the clip and the clip blocks reverse movement of the platen, that is, it determines the maximum rearward position of the platen. When the platen is inserted on the machine, it is inserted from the rear (the right side of FIG. 8). To insert the platen on the machine, clip 133 is lifted slightly so that it clears pin 142 and is then rotated clockwise in FIG. 8. The platen is then guided into the two grooves in respective rails 135 and 136 on either side of the machine, and when it is pushed all the way toward the front of the machine, clip 133 is moved to the blocking position shown in FIg. 8.

The upper rail 135 in FIG. 8 is similar to the rail 156 in that it includes a groove to guide one side of the platen. However, rail 135 further includes four switches S3A, S2A, S1B and SQ1 as well as start button S1A. Although not shown in any of the drawings, it is to be understood that a cover can be provided for enclosing the four switches and the start button; preferably, the only exposed one of these elements would be the top of start button S1A, which must be exposed in order for the operator to press it down when it is desired to initiate a copying cycle in the book copier mode.

The function of the two slots 202 on top of the machine will be described in connection with the letter copier.

LETTER COPIER MODE

The letter copier attachment is shown in place on top of the machine in FIG. 9. The attachment includes a bridging section 205, a glass plate 209, and a cover section 210. When the copying machine is used in the letter mode, an additional metal plate 201 is placed on the machine as shown in FIGS. 9 and 10. The plate includes a short vertical section 201a and two depending pins 203. The pins are inserted into slots 202 on top of the machine. Plate 201 is moved from side to side depending on the width of the original to be copied. The original, such as original 204 shown in FIGS. 9 and 10, is placed on plate 201 with one edge adjacent to vertical section 201a. Plate 201 is positioned such that the original is centered within the letter bridge. The use of such a plate insures that the original is fed in a straight orientation into the nip of input rollers 16, 222.

On both sides of bridge 205 there is a slot 207 in which a slide lever 206 is positioned. Each slide lever 206 is provided with a pin 230, as shown in FIG. 12. A locking element 233 is pivoted on each side of the bridge as shown at 232, and pin 230 is inserted in a slot 231 in the locking element. When slide lever 206 is moved to the left in FIG. 12, it is apparent that element 233 rotates counterclockwise so that the element clears pin 131 on the machine. To lock the bridge in place, the two slide levers 206 are moved to the left in FIG. 12, the bridge is put in place, and the two slide levers are then moved to the right. This causes the two locking elements 233 to move in the clockwise direction and to thus grip pin 131.

The letter bridge includes three rollers 220, 221, 222 which engage rollers 16, 17, 18 on top of the machine. Adjacent to each roller in the letter bridge is a photocell 13, 14, 15, as seen most clearly in FIG. 11 which depicts the underside of the letter bridge. The photocells are connected by wires (not shown) to connector 212. In the center of bridging element 205 is a bracket 215 through which a plurality of pins 216 extend. The pins are attached to plate 217 which bears against scanning window 137 of the machine. The plate serves to force the original document to be copied flat against the scanning window for proper focusing.

An original fed into the letter bridge is fed into the nip of rollers 16, 222, as seen most clearly in FIG. 10. The original document is then transported under plate 225 at the underside of the letter copier attachment, and then between plate 217 and scanning window 137. The three rollers in the letter bridge bear against the rollers on top of the copying machine. This is achieved with the use of springs 234 at either side of the roller shafts, as seen most clearly in FIG. 12. The ends of the roller shafts are mounted in bushings in brackets 240 which permit a slight vertical movement. The forces of the springs bias the rollers in the letter bridge against respective ones of the rollers on top of the copying machine.

Depending from one side of bridging section 205 is a connector 212. This connector is inserted into connector 132 on the machine and completes the control circuit of FIG. 3 to that it sequences in the letter copier mode. The circuit of connector 212 is shown in FIG. 13. When the connector mates with connector 132 on top of the copying machine, the circuit of FIG. 3 within the copying machine is completed and results in the circuit shown in FIG. 14.

Two different sequences take place when the machine is operated in the letter copying mode. In the first, only a single copy of an original document is made. In the second, multiple copies of the original document are made. Each of the sequences will be considered individually below.

SINGLE COPY OPERATION

Referring to FIG. 14, three switches SW1, SW2 and SW3 are shown, the switches being symbolic of the three photocells 13, 14 and 15 and their associated amplifiers in the original transport system. SW1 corresponds to photocell 13, SW2 corresponds to photocell 14 and SW3 corresponds to photocell 15. Each switch is normally open but closes when the original passes under the respective photocell and blocks light from the respective one of light sources 19, 20 and 21.

Before proceeding with a description of the operation of the machine, it is necessary to set forth the meaning of the various notations used on the drawing. On FIG. 14 there are six relays K1 through K6. Each of these relays is normally de-energized. Each relay has a number of contact pairs A, B, etc. For example, contacts K2-D are the fourth movable contact pair on relay K2. All of the contacts are shown in their normal positions with all six relays de-energized. In the case of transfer contacts, both pairs are designated alike, e.g., K3-A, with the normally closed connection being shown in the usual manner by a short line drawn at an angle through the contacts symbol.

On FIG. 14, there are also five clutches K-7, K-8, K-9, K-11 and K-12. Clutch K-12 is the paper roller clutch which when energized causes copy paper rollers 35 and 36 to operate. Clutch K-12 is shown on FIG. 2 as controlling rotation of roller 35. Clutch K-9 controls forward feed of the original, and when energized causes rollers 16, 17 and 18 to rotate in the directions shown in FIG. 1. Clutch K-7 is the reverse clutch which when energized controls the reverse movement of the original. As seen in FIG. 14, transfer contacts K4-A control the energization of either clutch K-7 or clutch K-9. Clutch K-8 when energized controls movement of cam 104 of FIG. 6 in synchronism with original drive chain 75 (FIG. 2). This clutch is operated only during multiple copying. Timer clutch K-11, when operated, clutches chain-driven gear 126 (through a gear reduction system) to cam 96 (FIG. 4.).

K-10 is the solenoid which when energized operates rotary knife 38 to cut the copy paper. At the end of the knife stroke, switch SW-X is opened. Upon release of the knife, the switch closes once again.

On FIG. 14 there are also two timing motors TM1, TM2. When energized, these motors control movements of respective cams 95 (FIG. 4), and 102 and 103 (which comprise selector dial 107—FIG. 5). These cams, as well as cam 104 (FIG. 6), actuate various switches SW-A, SW-B, etc. Each switch has two terminals. With the cams in their normal positions as shown in FIGS. 4–6, some of the switches are open and some are closed. Switch SW-H, for example, is closed, and as shown in FIG. 14 a connection is made through the two terminals of this switch to the winding of relay K1. Others of the switches such as SW-E are open. As will be described below, rotations of the various cams control the opening of the normally closed switches, and the closing of the normally open switches.

The circuit of FIG. 14 is shown in three parts. The various clutches are connected across 90-volt DC buses 113, 114. The various relays are connected across 26-volt DC buses 115, 116. The corona and the two timing motors are connected across the AC line. The knife solenoid is connected across line L2 and negative bus 114.

With relay K4 de-energized, the normally closed contacts K4-A are closed, forward clutch K-( is energized, drive chain 75 (FIG. 2) moves in the forward direction, and an original document inserted in the machine is moved forward.

When the leading edge of the original actuates switch SW1, the energizing circuit for relay K1 is completed through normally closed switch SW-Q and switch SW1. Normally closed contacts K4-B bypass switch SW-Q and part of the energizing current for relay K1 flows though these contacts. With the energization of relay K1 the copy paper roller clutch K-12 is operated, current flowing through the winding of the clutch and the now closed, normally open K1-B contacts. The corona charging system including a high voltage power source (shown symbolically by numeral 89) is also energized through the now closed K1-C contacts, these contacts connecting the corona charging circuit to line terminal L2.

At the same time, timing motor TM1 starts operating with the closing of the K1-A contacts. The motor circuit is completed from terminal L1 through the K1-A contacts, and normally closed switch SW-B connected to line terminal L2. Although switch SW-B is bypassed by normally closed contacts K1-C, and contacts K5-C and K2-A, current does not flow through these contacts because contacts K1-C are open when relay K2 is energized. The operation of motor TM1 starts the turning of cam 95 on FIG. 4. The cam turns counterclockwise and as soon as lobes 95a, 95b move slightly, switches SW-E and SW-F close. Each of these switches is connected in the energizing circuit for one of the two exposure lamps (FIG. 14). In the illustrative embodiment of the invention two such lamps are included in reflector 25 (FIG. 1). Motor TM1 and cam 95 are provided to insure that the exposure lamps remain on for not less than 5 seconds. This is necessary since the lamps have a tendency to darken on shorter duty cycles. As will become apparent below, can 95 turns 120° during each copying cycle. If timing motor TM1 is not interrupted, the cam turns this amount within 5 seconds. In the case of long originals, however, the timing motor is interrupted so that the lamps remain energized even longer.

As soon as lobe 95c moves slightly, switch SW-A closes such that the energizing circuit for timing motor TM1 bypasses contacts K1-A. Thus, even after relay K1 releases, the timing motor can still operate. The motor continues to run until lobe 95b opens switch SW-B. Unless relays K1 and K2 are released at this time and contacts K1-C and K2-A are inclosed, the energizing circuit for TM1 is broken.

With the closing of contacts K1-B, timer clutch K-11 is energized. Cam 96 starts to turn counterclockwise (driven by chain 75) and insures a cut copy length of not less than 8 inches. Provided that the length of the original is equal to or greater than 8 inches, the actual length of the cut copy will be identical with that of the original. Otherwise, a minimum length of 8 inches is cut. The 8-inch minimum is to insure that the cut copy sheet has a sufficient length so as to at all times be driven by rollers in the copy transport section. Otherwise, if the cut copy is too short it may be trapped in the machine.

Although the original energizing current for relay K1 flows through switch SW1, relay K1 remains energized if switch SW1 opens before 8 inches of copy paper have been fed from the roll because contacts K1-D close when the relay operates and current flows through these contacts and normally closed switch SW-H. Even if switch SW-1 opens, current flows through contacts K1-D, diode CR16 and switch SW-H.

The purpose of this circuit is to insure the minimum copy length of 8 inches. By the time cam 96 turns sufficiently to open switch SW-H, at least 8 inches of copy paper have been fed into the copy transport system. (Angle d3 in FIG. 7 corresponds to 8 inches of copy paper feed.) Relay K1 cannot release before this minimum feed has occurred, and since knife solenoid K-10 cannot operate until relay K1 releases, the minimum length cut copy sheet is 8 inches. Only after switch SW-H opens can relay K1 release, and only then does the opening of switch SW1 control the knife operation.

With the closing of contacts K1-D, current flows through them, diode CR12, normally closed switch SW-X and the winding of relay K6. The relay energizes and contacts K6-B, in the knife solenoid circuit, close. However, the solenoid does not energize because normally closed contacts K1-B are open at this time. When relay K6 operates, contacts K6-A close to bypass contacts K1-D and to thus keep the relay energized even after relay K1 releases.

Relay K1 remains energized until the trailing edge of the original clears switch SW1 (assuming that switch SW-H has by this time opened). Normally open contacts K1-B restore to the condition shown in FIG. 14, clutch K-12 releases, rollers 35, 36 stop turning, and no more copy paper is fed from roll 33. Similarly, the closing of normally closed contacts K1-B completes the energizing circuit for knife solenoid K-10. (The energizing current is a half-wave rectified signal since the knife solenoid is connected across AC line L2 and DC bus 114.) Rotary knife 38 rotates in the counterclockwise direction (FIG. 1) and the copy sheet is cut from the copy paper roll. At the end of the knife stroke, switch SW-X opens and relay K6 releases. Contacts K6-B open, solenoid K-10 release and the knife restores. ALthough switch SW-X closes once again, relay K6 does not re-energize because by this time both contacts K1-D and K6-A are open. Diode CR10 is provided across the knife solenoid to suppress the large transient which could otherwise develop when contacts K6-B open.

The release of relay K1 thus controls both the stopping of the paper roll feed and the operation of the knife. This could present a problem if the feed stops before the knife operates (the copy paper transport system would continue to draw paper while no more could be fed past rollers 35, 36) were the following corrective measure not taken. The forward edge of the copy paper, when it is first fed over rotary knife 38, continues to move upward until it strikes the underside of deflector 66 (FIG. 1). The paper then moves under the deflector toward rollers 39, 40, but the paper bears against the underside of deflector 66, not the upper surface of knife 38. Deflector 66 thus serves as a "loop former," establishing some slack in the copy paper between rollers 35, 36 and 39, 40. When rollers 35, 36 stop turning, rollers 39, 40, which continue to rotate, take up the slack. The knife finishes its cut before most of the slack is taken up.

With the release of relay K1 and the opening of normally open contacts K1-B, timer clutch K-11 also de-energizes. Cam 96 is connected by spring 100 to stop 99. Pin 101 is included on the underside of the cam. As soon as the clutch de-energizes, the spring causes cam 96 to restore in the clockwise direction with the cam stopping when pin 101 hits stop 99. Switch SW-H closes once again when cam 96 returns to its initial position. If by this time relay K6 has not yet released (as a result of the knife opening switch SW-X), and were diode CR12 replaced by a simple wire connection, current through contacts K6–A, diode CR16 and switch SW–H would cause relay K1 to operate again. This is prevented by diode CR12. It is poled to prevent current through contacts K6–A from flowing to the winding of relay K1, while allowing current through contacts K1–D (when relay K1 first operates) to flow through the switch SW–X and the winding of relay K6. As for diode CR16, it is provided to prevent current through switch SW1 from flowing to the winding of relay K6 at the same time that it flows through the winding of relay K1. Transistor Q1 (in switch SW1) cannot supply sufficient current to operate both relays. Instead, diode CR16 insures that the closing of switch SW1 directly controls the energization of only relay K1. It is the subsequent closing of contacts K1–D which result in the energization of relay K6 (current flowing through diode CR12).

The function of diode CR11 is to short out the current in the winding of relay K1 when the relay releases. This prevents excessive transients from damaging transistor Q1 (part of switch SW1, see FIG. 3). A similar diode is provided for each of relays K2 and K3.

As the original continues to be transported toward the scanning window the leading edge actuates switch SW2 (actually, this occurs before the trailing edge passes switch SW1 and the knife operates). The closing of the switch energizes relay K2. Contacts K2–B closes to provide an alternate path for the corona charging system through these contacts and normally closed contacts K4–D. Originally, the corona charging current flowed through contacts K1–C. Even after relay K1 releases, however, the corona charging circuit remains energized as long as relay K2 is operated. This is necessary because were the corona charging system to de-energize with the release of relay K1, the trailing portion of the cut copy sheet would not be charged.

Although normally closed contacts K2–A open with the energization of relay K2, this has no effect on the running of timing motor TM1. The motor is held operated by the current flowing through normally closed switch SW–B, and now closed switch SW–A and contacts K1–A in parallel.

As the original passes the scanning window, the copy paper is exposed. As the original continues to be scanned the leading edge actuates switch SW3. Although relay K3 energizes, it has no effect during single copy mode operation. Similarly, its release at the end of the cycle has no effect.

As cam 95 continues to rotate eventually one of the camming lobes opens switch SW–B. (As shown in FIG. 4, it is lobe 95b which opens switch SW–B, although it is understood that a different lobe controls this operation during each cycle as the cam makes only one third of a revolution during each copying operation.) With the opening of switch SW–B timing motor TM1 stops operating. Cam 95 remains parked with switches SW–E and SW–F still closed, thus keeping the two exposure lamps on.

When the trailing edge of the original passes switch SW2, relay K2 de-energizes. With the opening of contacts K2–B the corona charging circuit de-energizes. (Contacts K1–C are by this time open since relay K1 releases before relay K2.) Since the trailing edge of the copy paper is now clear of the corona unit further charging is unnecessary. With the release of relay K2, contacts K2–A close. Since contacts K5–C are always closed during the single copy mode, and normally closed contacts K1–C restored to their closed position with the release of relay K1, timing motor TM1 resumes operating even though switch SW–B is still open. Cam 95 thus resumes its rotation in the counterclockwise direction. Switches SW–E and SW–F are still closed, however, because it is necessary to keep the exposure lamps energized until after the exposure process has been completed.

As soon as cam 95 rotates slightly further in the counterclockwise direction, switch SW–B closes once again to provide an alternate current circuit for timing motor TM1. After cam 95 has rotated one third of a revolution, with the lobes being in the positions shown in FIG. 4 (although each has moved 120°), switch SW–A opens. At this time the timing motor turns off because contacts K1–A are open. Although cam 95 starts turning from its parked position when the trailing edge of the original passes switch SW2 at the forward end of the scanning window, by the time cam 95 has rotated from the parked position through the end of its one-third revolution the original has been completely transported past the scanning window and the copy sheet has completely passed by the copy exposure window. With cam 95 in its initial position (although rotated 120°), switches SW–E and SW–F open and the two exposure lamps turn off.

It should be noted that timing motor TM1 stops operating and cam 95 is parked when switch SW–B is opened. The operation of the timing motor and the rotation of cam 95 resume when the trailing edge of the original passes switch SW2 and relay K2 releases. With a short original it is possible for relay K2 to release even before switch SW–B is opened. In such a case cam 95 is not parked. However, it requires five seconds for cam 95 to rotate 120° and the two exposure lamps thus remain on for at least 5 seconds during each copying cycle. (With an original shorter than the distance between rollers 9 and 8, the original becomes trapped between the rollers and it is necessary to lift the bridge in order to remove the document.)

The original and the copy are deposited in their respective trays as they are passed through the machine. At the end of the process all switches and relays are in the conditions shown in FIGS. 4 and 14, with the exception of cam 95 which has rotated 120°. However, since the cam has three symmetrically positioned lobes, as far as the machine operation is concerned the cam is in its initial position.

In the letter copier mode, original documents can be fed in succession one after the other. This is one of the primary advantages of moving the original document directly (as opposed to placing it on a glass platen, in which case each original must be removed before another can be placed on the platen). It is possible that originals may be fed in succession so fast after each other that the trailing edge of the first does not pass switch SW2 before the leading edge of the second passes switch SW1. In such a case, switch SW1 is operated (by the new original) before switch SW2 has been released (by the first original). With both relays operated, contacts K1–C and K2–A are open and no current can flow through them to timing motor TM1. However, the timing motor continues to run if lobe 95b has not yet opened switch SW–B, since at this time switch SW–A is also closed. The timing motor continues to run until switch SW–B opens. The motor is then parked and only after both of relays K1 and K2 release and contacts K1–C and K2–A close does the timing motor resume running.

If a third original is fed into the machine and reaches switch SW1 before the trailing edge of the second original passes switch SW2 to release it, timing motor TM1 remains parked—at all times either contacts K1–C or K2–A are open, along with switch SW–B. This is the desired operation—the purpose of timing motor TM1 is to insure that the exposure lamps remain energized for at least five seconds every time they are turned on, and if originals are fed into the machine rapidly in succession there is no reason to turn the exposure lamps off during the sequence.

On the other hand, suppose that the feed rate is slightly slower and that the trailing edge of the first original releases switch SW2 before the leading edge of the second original operates switch SW1. With relay K2 released, contacts K2–A are closed. When the second original causes relay K1 to operate, contacts K1–C open. However, timing motor TM1 continues to run if it has not yet reached its park position because both of switches SW–A and SW–B are closed. The timing motor stops only when it reaches its park position.

On the other hand, suppose the timing motor has already stopped at the park position when the trailing edge of the first original passes switch SW–2 and contacts K2–A close. If the leading edge of the second original has not yet reached switch SW1, contacts K1–C are also closed. (This will usually not happen when the second original is fed into the machine after a long period of non-use, because timing motor TM1 cannot reach its park position before a normal length original has passed switch SW2. However, it can happen somewhere in the sequence when several originals are fed into the machine in succession.) In such a case, with the release of relay K2 (as the trailing edge of the first original passes switch SW2) the timing motor starts to move from its park position. It would appear that the timing motor would complete its cycle and the exposure lamps would turn off while the second original is still moving through the machine. However, this does not happen. The timing motor completes its cycle of operation with lobe 95b opening switch SW-A. But if a second original has been fed into the machine before the timing motor has completed its cycle, contacts K1-A are closed to provide an alternative path for the motor current around switch SW-A by the time the switch opens. The timing motor simply continues to run and enters into a new cycle. Of course, when the timing motor completes its first cycle, switches SW-E and SW-F open and the two exposure lamps turn off. Were the original document to be within the scanning window at this time, there would be a portion of it which would not be fully imaged on the copy sheet during the brief interval that the two exposure lamps turn off as cam 95 finishes a first one-third revolution and starts another. However, the time required for one of the lobes on cam 95 to move from the position at which switch SW-B is open to the position at which switch SW-A opens is less than the time required for an original document to be transported from switch SW1 to the scanning window. Consequently, in the event the timing motor has moved past its park position when a new original is fed into the machine (in which case the timing motor finishes the cycle in progress and enters into a new cycle), the exposure lamps flicker off mementarily before the original document reaches the scanning window—there is no interruption in the scanning of the original.

It should be noted that in the single cycle sequence, switch SW-D is open. Consequently, relays K4 and K5 do not energize. Similarly, switch SW-C is open, and since contacts K4-D remain open as well, timing motor TM2 does not run. Relays K4 and K5 and timing motor TM2, operate only during the multiple copy sequence.

MULTIPLE COPY OPERATION

The number of copies made is selected by the operator. The outer edge of the multiple copy selector dial 107 (FIG. 5) is sequentially numbered in 16 equal graduations, starting with 1 and progressing in the counterclockwise direction up to 16. The normal or single copy mode position of the multiple copy selector dial is that in which the numerically designated position of 1 is as shown in FIG. 5. If the dial is in the normal position the machine operates in the single copy made. To select any other number of copies, the dial is turned until the desired number is in the "12 o'clock" position. The dial can be rotated or changed at any time during the copying cycle.

During each reverse travel of the original, the dial is rotated one position in the counterclockwise direction by timing motor TM2. This "counting down" or decrementing of the selector dial provides a visual indication of the number of copies which must yet be made. If the selector is not changed by the operator, the decrementing continues until the dial is in the single copy mode position of FIG. 5. At this time, the original is scanned for the last time after which it is deposited in the original receiving tray just as it is during the single copy mode.

In the multiple copy operation, the functional sequence is the same as that of the single copy operation except that when the leading edge of the original actuates switch SW3 during the first scan cycle, a series of control circuits are activated. These control circuits reverse the normal travel of the original transport system when the trailing edge of the original clears switch SW3. The original is reversed at high speed. The control circuits also prevent the machine from making a copy while the original is being reversed.

When the leading edge of the original clears switch SW2 during high speed reverse, the transport system is again normalized so that the original is transported in the forward direction to be scanned once again. This action is repeated until the multiple copy selector dial is decremented to the "1" position at which time the last scan begins with the machine operating in the single copy mode. The multiple copy selector dial has two camming surfaces 102 and 103. Camming surface 102 has sixteen detent positions equally spaced around the circumference of the cam. The actuating arm for switch SW-C rides on the camming surface. When the actuating arm is on a high portion of the camming surface (between detents) switch SW-C is closed. Each time camming surface 102 is rotated the switch actuating arm drops into a detent and switch SW-C opens. When the timing motor TM2 is first energized camming surface 102 starts to rotate in the counterclockwise direction. The actuating arm of switch SW-C moved to a high point on camming surface 102 to close the switch. The control circuit that initially starts the timing motor rotation is de-energized soon after the timing motor starts to operate, but if it is energized long enough the "lock circuit" established by the closing of switch SW-C insures the continued timing motor operation until the actuating arm drops into the next detent of camming surface 102. At this time, timing motor TM2 stops operating.

Camming surface 103 has only one detent. The detent is located at a position such that it will permit the actuating arm of switch SW-D which rides on the camming surface to be in the detent only when the multiple copy selector dial is in the single copy mode position. When the actuating arm is in the detent the switch is open. It is switch SW-D which controls the multiple copy mode sequencing circuits. When the selector dial is manually rotated to a position representing the number of copies desired, both surfaces of cams 102 and 103 are rotated. With switch SW-D closed the multiple copying operation ensues. But as the selector dial is decremented, switch SW-D opens when the numeral 1 on the dial is in the "12 o'clock" position. After the original is reverse transported for the last time, the last of the required number of copies is made in the same way that a single copy is made.

Up to the point when switch SW3 is first energized by the leading edge of the original the operation in the multiple copy mode is the same as that in the single copy mode. With the energization of switch SW3 and the operation of relay K3, contacts K3-B close to energize relay K5. Current flows through contacts K3-B, the relay coil, and switch SW-D, switch SW-D being closed by camming surface 103 when more than one copy is being made.

When contacts K5-D close, current flows through the energizing coil of multiple copy clutch K-8. The operation of this clutch couples cam 104 (FIG. 6) to drive chain 75 (FIG. 2). Cam 104 thus rotates in the forward (counterclockwise) direction as shown in FIG. 6. (Gearing, not shown, is provided to gear down the speed of cam 104 with respect to the drive chain speed. Cam 104 makes less than a single revolution even for a long original.) Switch SW-Q is normally closed. As cam 104 continues to rotate in the forward direction, switch SW-Q opens in the energizing circuit for relay K1. However, relay K1 remains energized. Although after 8 inches of copy paper have been fed into the machine switch SW-H is opened by cam 96, relay K1 remains energized by the current flowing through normally closed contacts K4-B and switch SW1 until the trailing edge of the original clears the switch.

When relay K5 first energizes, contacts K5-C open. It will be recalled that in the single copy mode timing motor TM1 first operates when relay K1 is energized and contacts K1-A close. The timing motor continues to operate until switch SW-B opens at which time the timing motor is parked. When relay K2 releases and contacts K2-A close (contacts K1-C having closed earlier), the timing motor continues to operate until cam 95 has turned through its one-third revolution. However, with relay K5 operated and contacts K5-C open in the multiple copy mode, the timing motor cannot resume operating when relay K2 releases and contacts K2-A close. Consequently, the timing motor remains parked throughout the multiple copy mode. Switches SW-E and SW-F remain closed and the two exposure lamps remain operated throughout the multiple copy cycle. It is only when the last copy is being made and relay K5 is released because switch SW-D is open that the last release of relay K2 allows timing motor TM1 to resume operation. Thus, even in the multiple copy mode cam 95 turns through only 120° during the entire cycle.

With the leading edge of the original at switch SW3, relays K1, K2, K3 and K5 are energized, the corona circuit is still energized through contacts K1-C, and through the alternate circuit including contacts K2-B and K4-D, and the copy paper roll clutch K-12 is still energized through normally open (now closed) contacts K1-B. The exposure lamp timing motor TM1 becomes parked as soon as cam 95 has rotated a sufficient amount to open switch SW-B. Timer clutch K-11 is still energized since normally open contacts K1-B are closed. Assuming that the length of the original is greater than 8 inches, switch SW-H is open. Cam 104 continues to rotate in the forward direction.

The scanning and exposure process continues until the trailing edge of the original clears switch SW1 and relay K1 deenergizes. When normally open contacts K1-B open, copy paper roller clutch K-12 de-energizes to stop the copy paper feed. At the same time knife solenoid K-10 operates to cut the copy paper to the length of the original. Since normally open contacts K1-B are now open, timer clutch K-11 de-energizes and spring 100 returns cam 96 to the initial position. Relay K6 releases with the opening of switch SW-X and this in turn causes the knife to restore.

With short originals, relay K1 releases before relay K5 operates since the trailing edge of the original passes switch SW1 before the leading edge reaches switch SW3. The operation is the same, however, except that relay K1 does not de-energize until switch SW-H opens after a minimum length of 8 inches has been fed from the copy paper roll.

Although relay K1 is de-energized and contacts K1-C are open, contacts K2-B and K4-D are still closed so that the corona charging system is still energized. Eventually the trailing edge of the original passes switch SW2 permitting relay K2 to de-energize. With the opening of contacts K2-C the corona system is de-energized. Originally, relay K5 was energized by the current flowing through contacts K3-B. As will be seen below, relay K3 soon releases. However, with relay K2 de-energized, contacts K2-D are in their normal closed condition and relay K5 is held energized by current flowing through contacts K2-D and contacts K5-A. Although contacts K2-A close with the release of relay K2 (which causes timing motor TM1 to resume operation in the single copy mode), because relay K5 is energized and contacts K5-C are open, timing motor TM1 remains de-energized in the multiple copy mode.

The trailing edge of the original then clears the scanning window. The scanning and exposure process is now complete and the copy sheet is being developed. The copy is then deposited in the copy receiving tray. When the trailing edge of the original clears switch SW3, relay K3 de-energizes. While relay K3 was energized, normally closed contacts K3-A were open and normally open contacts K3-A were closed. Since contacts K4-C were open relay K4 could not operate. However, when normally closed contacts K3-A close, relay K4 operates since at this time contacts K5-B are closed. With the energization of relay K4 a number of operations take place.

In the single copy mode, forward clutch K-9 is operated by current flowing through normally closed contacts K4-A to control the forward feed of the original. Similarly, in the multiple copy mode relay K4 is initially de-energized and the original is fed in the forward direction with the energization of clutch K-9. But as soon as relay K4 energizes, normally open contacts K4-A close, and normally closed contacts K4-A open. Forward clutch K-9 de-energizes and reverse clutch K-7 energizes. At this time the original is fed in the reverse direction through the machine. As described above in connection with FIG. 2, the reverse feed is faster than the forward feed.

Originally, contacts K4-D and K3-D, and switch SW-C were open so that timing motor TM2 could not operate. As soon as the trailing edge of the original passes switch SW3, relay K3 releases and contacts K3-D close. Since relay K4 operates at the same time and contacts K4-D close, current flows through these contacts and contacts K3-D to timing motor TM2. The timing motor thus starts to turn the multiple copy selector dial in the counterclockwise direction. But the original immediately starts its reverse feed through the machine, relay K3 is immediately reenergized and contacts K3-D open. By this time cam 107 has not rotated sufficiently such that the actuating arm of switch SW-C is on a high portion of camming surface 102. The detents on cam 102 are sufficiently wide to prevent closing of switch SW-C during the short interval that relay K3 is released. With switch SW-C still open when relay K3 re-energizes, timing motor TM2 stops operating. The dial is not decremented at this time.

The first switch to operate during the reverse feed is switch SW3 and relay K3 thus energizes. Relay K4 was first operated when relay K3 released and normally closed contacts K3-A closed. Although these contacts now open, relay K4 remains energized by the current flowing through normally open contacts K3-A (now closed) and contacts K4-C. In order that contacts K4-C not open during the switching of contacts K3-A, relay K4 is prevented from releasing by current flowing through capacitor C4, this current continuing to flow until the normally open contacts K3-A close. Relay K5 was originally operated with the energization of relay K3 and the closing of contacts K3-B. Subsequently, the relay was alternately energized with the release of relay K2 and the closing of contacts K2-D. At the end of the forward feed, contacts K3-B opened with the release of relay K3 but the alternate energizing path held relay K5 operated. With the closing of contacts K3-B at the start of the reverse feed, relay K5 is held on by currents through both paths.

The original continues to travel in its reverse direction. With relay K1 de-energized and normally open contacts K1-B open clutch K-12 is not operated so there is no copy paper feed, and clutch K-11 is not operated so cam 96 does not rotate. Relay K5 is still energized and contacts K5-D are still closed, multiple copy clutch K-8 is still operated and cam 104 is still coupled to drive chain 75. But since the drive chain is now moving in the reverse direction, cam 104 moves in its reverse direction (clockwise). The cam, which at the end of the forward feed is in a position such as that shown by the numeral 106 in FIG. 6 (the exact position depends on the length of the original), starts moving toward its original position adjacent stop 105.

The original continues to be reverse transported and cam 104 continues to be restored. The trailing edge of the original actuates switch SW2 which results in the energization of relay K2. Although contacts K2-D open, relay K5 is held operated through contacts K3-B. Relay K4 is now held operated through its own contacts K4-C, and both contacts K3-A and K2-C. The trailing edge of the original then actuates switch SW1. This has no effect on relay K1, however, since switch SW-Q is open, and since relay K4 is energized normally closed contacts K4-B are open as well. (It should be noted that switch SW1 is bypassed anyway by normally open contacts K4-B (now closed), which condition similarly cannot control the energization of relay K1). Eventually, cam 104 restores sufficiently to close switch SW-Q. Current flows through normally open contacts K4-B (now closed) and switch SW1 in parallel, switch SW-Q and the relay coil. With a short original the trailing edge may not control the closing of switch SW1 by the time switch SW-Q closes. Normally open bypassing contacts K4-B are provided for this purpose—relay K1 energizes with the closing of switch SW-Q even if switch SW1 has not yet closed. This is necessary because relay K1 must operate to start the forward feed when switch SW-Q closes for there to be proper registration at the start of the next forward feed.

The actual time that relay K1 energizes as a result of the closing of switch SW-Q is variable, dependent upon the length of the original. As described above, multiple copy clutch K-8 is energized with the closing of contacts K5–D. These contacts close only when relay K5 energizes as a result of the closing of contacts K3–B, which contacts close with the energization of relay K3 when the leading edge of the original actuates switch SW3. At this time drive chain 75 moving in the forward direction rotates cam 104 in the forward direction. When the trailing edge of the original clears switch SW3, the rollers in the original transport system are reversed. The multiple copy clutch K–8 is still energized and consequently cam 104 is driven in the reverse direction. Although the drive chain moves at a faster speed in the reverse direction, the important criterion is the distance it moves. This distance is represented by the distance previously moved through by cam 104.

Since cam 104 first started to move when the leading edge of the original passed switch SW3, it would appear that switch SW–Q closes and relay K1 energizes only when the leading edge of the original is reverse transported past switch SW3. However, this is not the case. The camming surface of cam 104 is curved as shown in FIG. 6. Section 104a of the camming surface actuates switch SW–Q during the reverse movement of cam 104 even before the cam is fully restored to its initial position. Consequently, relay K1 is energized and the copy feed begins even before the leading edge of the original is adjacent to switch SW3. The forward feed rate of the copy paper and the reverse speed rate of the original, as well as the shape of cam 104, are such that the leading edge of the original reaches switch SW2 at the same time that the copy paper has been fed into the machine an amount such that its forward edge reaches the copy exposure window. The fact that switch SW–Q closes even before cam 104 has completely restored allows the copy paper feed to begin even before the leading edge of the original has been completely drawn back into the machine. This allows for maximum copying speed since by the time the leading edge of the original has cleared the scanning window and is adjacent to switch SW2, the leading edge of the copy paper is adjacent to the exposure window and the forward feed of the original can start immediately. The original need be reverse transported the minimum distance, i.e., only until its leading edge just clears the scanning window.

With the closing of switch SW–Q and the energization of relay K1, the corona circuit is once again operated through contacts K1–C. Copy paper roller clutch K–12 is also energized through normally open contacts K1–B. Similarly, timer cluch K–11 is energized with the closing of normally open contacts K1–B. It is thus seen that with the closing of switch SW–Q, the copy feed cycle begins. While in the single copy mode the copy feed begins when the leading edge of the original actuates switch SW1, such is not the case in the multiple copy mode. In the multiple copy mode the copy feed starts when auxiliary feed switch SW–Q closes.

Eventually the trailing edge of the original actuates switch SW1 which provides an alternate current path around normally open contacts K4–B (now closed). Consequently, even after relay K4 de-energizes, relay K1 remains operated.

When the leading edge of the original clears switch SW3, relay K3 de-energizes. With the opening of contacts K3–B, relay K5 de-energizes. This in turn opens contacts K5–D to release multiple copy clutch K–8. By this time cam 104 is in its initial position since the leading edge of the original is adjacent to switch SW3. To insure that cam 104 always starts to move from the same initial position, i.e., to prevent any cumulative registration errors, cam 104 is provided with a spring (not shown) to return it to the initial position when clutch K–8 releases. Although normally open contacts K3–A open when relay K3 releases, relay K2 is still energized so that relay K4 remains energized by the current through contacts K2–C and K4–C.

With relay K3 released and relay K4 operated, timing motor TM2 starts operating once again. This time, however, relay K3 does not immediately re-energize and cam 102 moves sufficiently to close switch SW–C. Switch SW–C is closed before relay K2 releases as the leading edge of the original clears switch SW2. The closed switch keeps timing motor TM2 energized until the dial is decremented one position and the switch opens. The time required for timing motor TM2 to decrement the dial is longer than the time required for the leading edge of the original to be transported from switch SW3 to switch SW2 (at the end of which relay K4 releases). Thus by the time the dial is decremented and switch SW–C opens, contacts K4–D have opened. This prevents timing motor TM2 from starting a second cycle of operation.

The original continues to move in the reverse direction until the leading edge clears switch SW2. Relay K2 de-energizes and with the opening of contacts K2–C relay K4 de-energizes. When contacts K4–A restore, reverse clutch K–7 is de-energized and forward clutch K–9 energizes. Thus, the leading edge of the original, which has just cleared the original scanning window and is adjacent to switch SW2, starts moving in the forward direction. Since at this time the leading edge of the copy paper is adjacent to the forward end of the copy exposure window, perfect registration of the original and copy sheet is assured.

At this point in the operation relays K1 and K2 are energized, and relays K3, K4 and K5 are de-energized. As soon as relay K1 releases when the trailing edge of the original passes switch SW1, the copy paper roll feed stops and knife solenoid K–10 is actuated. The remainder of the cycle is the same as the first cycle. Similarly, subsequent cycles are identical to the second cycle. The multiple copy selector dial is decremented following each copy cycle. Eventually, the multiple copy selector dial is restored to the single copy position. Since switch SW–D is then open (following the completion of the next-to-last copy cycle) and relays K4 and K5 cannot operate, the last copy cycle is the same as that in the single copy mode, except for the fact that the copy paper feed has already started during the last reverse travel of the original.

It is thus seen that multiple copies can be made very fast. Not only is the original moved back through the machine at an increased speed, but the copy paper feed starts even before the original has completely cleared the scanning window. The leading edge of the original is not restored all the way to switch SW1. Instead, it is restored only to the front edge of the scanning window. By providing clutched cam 104, the leading edge of the copy paper reaches the copy exposure window just when the leading edge of the original reaches switch SW2 at which time forward feed of the original begins. The use of cam 104 allows the copy paper feed to begin even though the leading edge of the original is still out of the machine. The machine need not detect the leading edge of the original as it is withdrawn into the machine in order to start the copy paper feed because the position of cam 104 in effect represents the position of the leading edge of the original.

It will be recalled that cam 95 was left in its park position when one of its lobes opened switch SW–B since when relay K5 operated during the first forward feed of the original (the relay operates before switch SW–B opens), contacts K5–C opened. Although these contacts close when relay K5 releases (as the leading edge of the original clears switch SW3), by this time the trailing edge of the original has already caused relay K2 to energize, thereby opening contacts K2–A. And by the time relay K2 releases, relay K5 has operated once again. Thus at all times during the shuttling of the original back and forth, one of contacts K2–A or K5–C are open, cam 95 remains parked and the two exposure lamps remain on. It is only during the last forward pass of the original when relay K2 releases that relay K5 is unoperated. At this time, both of contacts K5–C and K2–A are closed and cam 95 finishes its 120° turn with one of the lobes going from switch SW–B to switch SW–A. (As mentioned above, it takes longer for cam 95 to move from its park position to its terminal position than it does for the trailing edge of the original to move from switch SW2 to the end of the scanning window; this insures that the exposure lamps remain on long enough to fully scan the original during the last forward feed.)

The arrangement of switch SW1, switch SWQ and the normally open and normally closed K4-B contacts should be noted. The two pairs of contacts allow the two switches to control the energization of relay K1 during different parts of the cycle. During the first forward feed of the original, when relay K4 is de-energized, switch SW1 controls energization of relay K1 and the start of the copy paper feed, just as it does during single copy operation. Thereafter, since relay K4 is energized throughout every reverse movement of the original, switch SWQ controls the start of the copy paper feed. The "early" start of the copy paper feed is necessary only during all cycles after the first.

With respect to the machine of FIG. 1, the original and copy sheets were described as reaching their respective windows at the same time. At the same time that the original is illuminated and light reflected from it is directed to the exposure window, the copy sheet enters the exposure window and is exposed by the reflected light. Our machine has been described thus far in much the same frame of reference. But a more critical analysis is required, especially if the operation of the microfilm and book copier attachments (to be described below) are to be understood.

During the scanning process (the process by which a latent image is formed on the copy sheet), any given point on the copy paper must remain "locked in" to a particular point on the original. Otherwise, each point on the copy sheet will be exposed by light reflected from more than one corresponding point on the original. The corresponding point of the image for each object point is determined by the intersection of the image focal plane with a line from the object point drawn through the nodal points of the lens. (The nodal points of the lens are points on the lens axis such that an incident ray passing through the first nodal point at a particular angle to the axis leaves the second nodal point at the same angle to the axis.)

If follows that the leading edge of the copy sheet and the leading edge of the original must be intersected by a straight line through the lens nodal points at all times during scanning. This in turn requires that the distance of the leading edge of the copy sheet from the optical axis in the image plane (the intersection of the optical axis of the copying machine with the exposure window) be equal to the distance of the leading edge of the original from the optical axis in the object plane (the intersection of the optical axis of the machine with the scanning window) at all times during scanning. This "optical synchronization" must be achieved by the time the scanning process begins. Once it is so achieved, it is maintained since the original and the copy sheet move at the same speed past their respective windows.

The optical synchronization described above must be distinguished from the lens angle over which scanning actually takes place. As long as optical synchronization exists, light *may* be reflected from the original and directed to the copy sheet; corresponding points on the original and copy sheet move in synchronism with each other. But is is not necessary that exposure take place at all times when there is optical synchronization. In fact, a mechanism is generally provided to adjust the time duration during which each point on the copy sheet is exposed so that the contrast of the finished copy can be varied.

The length of time that any particular point on the copy sheet is exposed can be varied in several ways. For example, consider a very long scanning window, a very long exposure window, and an optical system which is capable of gathering light over a large angle at the scanning window and directing it over the same large angle to the exposure window. If the scanning and exposure windows have the same length (and both are centered with respect to the optical axis of the machine) every point on the copy sheet will be exposed from the moment it enters the exposure window until the moment it leaves the exposure window. On the other hand, suppose that the scanning window is shortened while the exposure window remains the same length. This simply means that when each point of the copy sheet enters the exposure window, it is not exposed since the corresponding point on the original has no light reflected from it (it is not within the physical boundaries of the scanning window). There is still optical synchronization but because light from the corresponding point on the original is physically blocked by shortening the scanning window, the point on the copy sheet is not exposed. Similarly, as each point on the copy sheet moves through the last part of the exposure window, it is not exposed because the corresponding point on the original no longer reflects light since it is physically blocked by the shortened scanning window.

Similarly, the physical dimensions of the exposure window can be shortened to cut down the exposure time. It is not even necessary for the scanning and exposure windows to be symmetrical relative to the optical axis of the machine. All that is required is that the original and copy sheet be in optical synchronization for as long as the copy sheet is actually exposed.

The leading edge of the copy sheet is first exposed at some distance in front of the optical axis within the exposure window. This distance is fixed in the machine of FIG. 1 since the shutter affects only the rear edge of the window. In those machines provided with shutter blades at both ends of the window, the leading edge of the copy sheet is first exposed at a point in front of the optical axis determined by the exposure setting. Optical synchronization must be achieved in all cases, and thus it must be achieved before the leading edge of the copy sheet is exposed even with the greatest possible exposure window shutter opening. As a practical matter, the length of the scanning window is short enough such that the optical system is capable of exposing all points on the copy sheet corresponding to all points within the physical boundaries of the scanning window on top of the machine (provided the physical dimensions of the exposure window allow this extensive an exposure). This means that for optical synchronization in all cases, all that is required is that when the original just reaches the scanning window (exposure cannot possibly begin before this time) and is a certain distance away from the optical axis intersection with the scanning window, the leading edge of the copy sheet must be the same distance away from the optical axis intersection with the exposure window. The only reason the controlling criterion is when the original reaches the forward edge of the scanning window is that exposure of the copy sheet cannot possibly take place before the original reaches the scanning window. Although exposure of the copy sheet need not begin immediately, and in fact will not begin immediately in the case of a small double-blade shutter opening, if optical synchronization is achieved by the time the original reaches the forward edge of the scanning window, then there is no question that optical synchronization will be achieved in every possible case.

BOOK COPIER MODE

FIG. 15 shows the book copier attachment as it is placed on the top of the copying machine (FIG. 8). The book copier attachment includes a pair of rails 151 and 152. As shown in FIG. 16, rail 151 includes a bracket 186 out of which a pin 185 extends. Bracket 187 of rail 152 includes a pin 185 which is placed in the other one of brackets 138 in front of the machine. Each pin is placed in the notch of one of brackets 138 at the frOnt of the machine, and the rear end of each rail is then rotated downward to that point where it forms an extension of one of rails 156 and 135. As shown in FIG. 16, rail 151 is locked in place, but rail 152 is shown just before it is pushed down. Each of the rails includes a bolt 148 together with a button 149 which extends out of a slot 161 in the rail. If bolt 148 in rail 152 is moved in the direction of arrow 189 in FIG. 16, it will be apparent that the rail can be rotated in the direction of arrow 190 to that point where it is flush with the front of rail 135. Rail 135 includes a hole into which bolt 148 can be extended. A similar hole is provided in rail 156 for the bolt 148 in rail 151. In this manner, both rails can be rigidly secured to the top of copying machine 10.

As shown in FIG. 16, a pin connector 188 extends downward from rail 152. When rail 152 is in place, pin connector 188 engages pin connector 132 on top of the copying machine. This is shown most clearly in FIG. 15.

FIG. 15 shows the two rails in place, together with the platen, the platen being shown partially broken away. The platen consists of a metal frame 143 which surrounds a glass plate 144. A book 147 is shown on top of the glass plate, there being two pages which thus face down against the glass plate. At the start of the copying sequence, the forward edge of the object to be copied is just in front of the front edge of scanning window 137. During the copying cycle, the platen moves to the right; thereafter, it is returned in the reverse direction to the position shown in FIG. 15. A heavy rubber sheet 145 is attached to the rear of frame 143 by bracket 146, the rubber sheet serving to press the book down against the platen.

In the upper left corner of FIG. 15 there is shown a guide 143c which extends from plate 143 and is contained in groove 156a of rail 156 (see FIG. 20). A similar guide 143d is provided on the other side of the platen for riding in groove 135a of rail 135 (see FIG. 20). To insert the platen within the rails, clip 133 is raised slightly so that it clears pin 142, and is then rotated in the clockwise direction (FIG. 15) to the position shown in phantom. This allows the platen to be inserted into the two guide rails 135, 156 and to be pushed all the way toward the front of the machine. After the platen is pushed all the way in, clip 133 is moved back to the position shown in FIG. 15, in which case rearward movement of the platen is limited when the rear of guide 143c abuts against clip 133. Each of rails 151, 152 includes a groove which is a continuation of the groove in the respective one of rails 156, 135 to permit the platen to be moved in the forward direction.

Metal plate 143 has a cross-section as shown in FIG. 20. In addition to guides 143c and 143d for guiding the platen along the rails within their grooves, on that side of the platen which rides beneath the four switches on top of the copying machine there are two vertical guides 143a and 143b. A movable cam 154 is inserted between the two guides. A lever 153 connected to movable cam 154 serves to adjust the cycling of the machine in accordance with length of the original to be copied. Referring to FIG. 15, lever 153 is shown at the rear of book 147, in which case both pages of the book which face down against the platen are copied. Were the lever to be moved to the right, to the middle of the book, only the rightmost page would be copied.

Guide 143b not only serves as one of the two barriers to contain cam 154, it also functions as a cam to operate the four switches on top of the machine. The fingers of all four switches ride on cam 143b. At the start of the copying cycle, the forward edge of the cam, shown by the numeral 143b' in FIG. 18, is to the rear of the finger of switch S2A; switches S2A and S3A are open, while switches SQ1 and S1B whose fingers are initially on cam 143b are closed. When the copying sequence begins, the platen moves to the left in FIG. 18 and the forward edge of cam 143b closes switch S2A, and then switch S3A. The trailing edge of the cam, shown by the numeral 143b", eventually clears switch S1B, at which time the switch opens (neglecting for the moment cam 154). The trailing edge of the cam then clears switch SQ1, at which time this switch also opens. Similarly, switches S2A and S3A follow in sequence.

The function of cam extension 154 is to effectively increase the length of the cam which operates the various switches. As shown in FIG. 18, with lever 153 in the position shown, the rear end of cam 154 extends far past the rear end 143b" of cam 143b. In such a case, it requires a more extensive forward movement before the various switches open. There is no need to increase the effective length of the cam which operates the switches in the forward direction. At the start of any copying cycle, the forward edge of the combined cams should be as shown in FIG. 18, just in front of the finger of switch S2A. In the event lever 153 is moved all the way to the left in FIG. 18, it will be noted that the lever is positioned at some point in front of switch SQ1. The forward end of cam 154 is provided with a cut-out 154b as well as a projecting pin 154a. As the cam is moved to the left in FIG. 18, the forward end of the cam is disposed above a notch 143a' in guide 143a. Ordinarily, pin 154a rides on guide 143a as shown in FIGS. 18 and 20. But when the cam is pushed all the way to the left, its front end falls down due to the provision of the cut-out 154b in the cam which serves as a "weak point." Pin 154a strikes against a corner of notch 143a— as shown in FIG. 19 to prevent further leftward movement of the cam. In such a position, it will be seen that the forward end 143b' of fixed cam 143 is still the operative forward end of the cam combination. As for the trailing end of the cam combination, the trailing edge of cam 154 is slightly to the left of end 143b" of cam 143b and thus cam 143b exclusively controls the operation of the four switches. Stop 157 is provided to limit rearward movement of cam 154, thereby establishing a maximum copy sheet length.

As will be described in further detail below, the fingers of switches S2A, S3A, and S1B ride on both cams. Thus movable cam extension 154 serves to prolong the opening of these three switches as the platen is moved to the left in FIG. 18. This is seen most clearly in FIG. 8. Although this figure does not show the platen on top of the machine, it is clear that the finger of switch SQ1 does not extend as far outward of rail 135 as the fingers of the other three switches; when the platen is put on the machine the finger of switch SQ1 rides only on fixed cam 143b. This is also shown in FIG. 15. As will be described below, switch SQ1 controls the early start of copy paper feed in the machine while the platen is being returned in the reverse direction. The controlling dimension is the position of switch SQ1 relative to the forward edge of the platen. There is no need to control the operation of switch SQ1 by the trailing edge of the combined cams, and for this reason the finger of the switch need not ride on the cam extension.

Rail 135 includes a hollow passage 135b through which conductors (not shown) connected to the four switches and start button S1A can be extended to the control circuit within the machine.

FIG. 17 shows a detail in the machine which is of considerable interest. Although the Van Auken et al. machine of FIG. 1 includes a fixed mirror 65, such fixed mirror is not desirable in the case of a machine used with both a letter bridge and a book copier. In the case of the letter copier, the face of the document to be copied is moved past scanning window 137. The optical system of the machine is such that the sum of the distances between the top of the scanning window and the mirror (represented by arrow 178 in FIG. 17) and between the point of reflection on the mirror and the exposure window (represented by arrow 177 on FIG. 17) provides for prefect focusing at the exposure window. But when the glass platen is in place, the total distance of the optical path is increased by the thickness of the platen, plus whatever space there is between the scanning window and the platen. The increased distance is shown by arrow 179 in FIG. 17, and were the increased optical path length left uncompensated, imperfect focusing at the exposure window might result when the system is operated in the book copier mode.

For this reason, when the book copier attachment is placed on the machine, mirror 176 is moved to the right in FIG. 17— toward the exposure window. While the optical path from the mirror to the document to be copied is increased due to the thickness of the platen, the optical path from the mirror to the exposure window is decreased as a result of the mirror movement.

On the side of the copying machine on which rail 151 is placed, there is a lever 162 having two cut-outs 162a, 162b. Each of these cut-outs has extended through it a pin 163, 164 which limits movement of lever 162 to the direction shown by arrow 191. A spring 165 is attached at its lower end to the lever, as shown at 167, and at its upper end to a pin 166 on the machine. Spring 165 tends to bias lever 162 in the upward direction, and the lever is normally in the position shown in phantom in FIG. 16. However, when rail 151 is placed on the machine, its rear end bears against lever 163 and moves the lever downward to the position shown in the drawing.

On the side of the lever is a rack 167 which engages a pinion 169. When the lever is moved downward, pinion 169 rotates in the counter-clockwise direction as shown by arrow 170. Mirror 176 is mounted on a post 175 which is attached to a platform 173. The platform includes two cut-outs 173a through which two pins 174 are extended. The pins are attached to stationary platform 172. It is apparent that this permits movement of platform 173 to the left and right in FIG. 17—toward and away from the exposure window. Shaft 181, attached to pinion 169, carries an eccentric cam 182 as shown in FIG. 17, the cam being situated between the two fingers on bracket 180, bracket 180 being attached to movable platform 173. When pinion 169 is rotated in the counterclockwise direction with the placing of rail 151 on the machine, eccentric cam 182 is rotated (see arrow 183) to the position shown in FIG. 17, in which position bracket 180 (and therefore platform 173, post 175 and mirror 176) are forced to the right. This shortens the effective optical path from the mirror to the exposure window to compensate for the increased optical path from the mirror to the document to be copied. On the other hand, in the other two modes of operation, lever 162 is not depressed, and spring 165 forces the lever to its normal position shown in phantom in FIG. 16. In such a case, pinion 169 is rotated to its maximum clockwise position, as is eccentric cam 182. In this case, movable platform 173 is moved to the left in FIG. 17 with mirror 176 taking the position shown in phantom.

FIG. 21 shows the pin connections within connector 188 on rail 152. When the rail is put in place on the machine, the control circuit of FIG. 3 is modified through connectors 132 and 188. The resulting control circuit is shown in FIG. 22, in which the pins themselves are not identified and the non-functioning circuit elements are omitted. All switches are shown in their initial positions (switches S2A and S3A are open, while switches SQ1 and S1B are closed). The book copier mode will now be described for both single copy and multiple copy operations.

SINGLE COPY OPERATION

After the page of a book to be copied is placed on the glass platen, and cam extension 154 is moved to correspond to the length of the original page to be copied (the length of the desired copy sheet), switch S1A on top of rail 135 is manually operated. Current flows through switch S1A, the normally closed K4–B contacts and the winding of relay K1 (See FIG. 22). Relay K1 operates, contacts K1–D close, and current flows through the contacts, diode CR16 and switch S1B (on the rail) to hold relay K1 energized even after the operator releases start switch S1A. Current also flows through contacts K1–D, diode CR12, switch SW–X and the winding of relay K6. Relay K6 operates and contacts K6–A close to keep it operated. The energization of relay K6 prepares the knife solenoid circuit—contacts K6–B are now closed and normally closed contacts K1–B are open so that with the release of relay K1, knife solenoid K–10 can operate.

As in the letter copying mode, the energization of relay K1 results in the closing of normally open contacts K1–B and the energization of both timer clutch K–11 and paper clutch K–12. The latter clutch causes the copy paper feed to begin. The former clutch controls the counter-clockwise rotation of cam 96 (FIG. 4) as in the letter copying mode. Although cam 96 is used in the letter copying mode to open switch SW–H after 8 inches of copy paper have been fed from the roll, switch SW–H is not included in the book copying circuit. Instead, switch S1B on rail 135 serves to control the length of the cut copy sheet to correspond to the length set by the operator—with a minimum length of 8 inches. In the book copying mode, cam 96 is used to control the closing of switch SW–O. (Switch SW–O is not shown in FIG. 14 since in the letter copying mode pin 3 (see FIG. 3) to which switch SW–O is connected is left floating (see FIG. 13).)

The initial operation of relay K1 also results in the energization of timing motor TM1 (through contacts K1–A and switch SW–B) as in the case of the letter copying mode. Cam 95 starts to turn and switch SW-A closes to keep the timing motor energized even after relay K1 releases (until the cam eventually opens switch SW-B). As the cam starts to turn, switches SW–E and SW–F close to energize the two exposure lamps. The closing of normally open contacts K1–C also results in the energization of the corona power supply 89 as in the letter copying mode.

The book platen is relatively long in order to support even long originals. If the book platen starts to move from a position where its forward edge is in front of roller 16 (FIG. 1), the platen will extend far beyond the rear of the machine. In order to limit the amount by which the platen extends past the rear of the machine, the platen is initially positioned such that its forward edge is adjacent to roller 17 at the top of the machine. (Actually, as will be described below, the forward edge of the platen is a fraction of an inch behind that point on top of the machine which when passed by a document in the letter copying mode results in the operation of switch SW–2.) It is apparent that the original is thus far ahead of the copy sheet at the start of the cycle—the original is adjacent to the scanning window on top of the machine. For this reason, when relay K1 operates, even though paper clutch K–12 operates to start the copy paper feed, forward clutch K–9 in not operared; the platen remains stationary until the copy sheet reaches the exposure window. Referring to FIG. 13, it will be recalled that in the letter copying mode, forward clutch K–9 is normally engaged so that an original document inserted into the nip of the input rollers is immediately transported through the machine. But in the book copying mode, as seen on FIG. 22, the winding of forward clutch K–9, in addition to being in series with contacts K4–A, is in series with the parallel paths including switch SW–O and contacts K5–D. Both the contacts and the switch are normally open, and forward clutch K–9 is de-energized.

Figure 7:
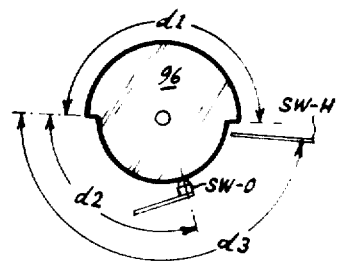
FIG. 7 depicts the shape of cam 96 of FIG. 4, together with three dimensions thereof.

It is only after cam 96 has rotated through an angle represented by arrow d2 on FIG. 7 that switch SW–O closes. Angle d2 corresponds to the distance that the copy sheet must move before it reaches the exposure window. Since cam 96 starts to turn at the same time that the copy sheet starts to move (since both time clutch K–11 and paper clutch K–12 are initially energized by the closing of contacts K1-B), it is apparent that switch SW–O closes to energize forward clutch K–9 just when the copy sheet reaches the exposure window. At this time, the platen is moved forward as rollers 16, 17, 18 rotate in the forward direction.

Initially, the front edge of cam 143b is in front of the finger of switch S2A on top of the machine. After the platen starts to move in the forward direction, the forward edge of cam 143b closes switch S2A. Referring to FIG. 22, relay K2 operates when the switch closes. It will be recalled that in the letter copying mode relay K2 is operated when the forward edge of the original reaches the front edge of the scanning window. Relay K2 is not operated when the forward edge of the platen "reaches" the front edge of the scanning window because it is there from the start. Although the platen is initially in front of the edge of the scanning window, relay K2 is not operated until after the copy sheet has reached the exposure window and the platen starts to move from its initial position.

With the operation of relay K2, contacts K2–C close to prepare a holding path for relay K4 when it eventually operates. Contacts K2–B close to provide a holding path for corona 89 even after relay K1 releases and contacts K1-C open.

As the platen continues to move forward, eventually the forward edge of cam 143b closes switch S3A (see FIG. 18). This switch corresponds to switch SW3 in the letter copying mode. With the closing of the switch, relay K3 energizes, contacts K3–B close and relay K5 energizes. Although relays K4 and K5 do not operate in the letter copying mode unless multiple copies are being made, the two relays do operate even when a single copy is being made in the book copying mode. This is because even when a single copy is being made the platen must be transported in the reverse direction after the copying cycle in order to prepare the system for another cycle of operation.

With the operation of relay K3, only relay K5 energizes. Although contacts K5-B close, the normally closed K3-A contacts open first (relay K3 operates before relay K5) so no current flows through the winding of relay K4. It would appear that current can flow through contacts K5-B and capacitor C4. However, capacitor C4, which is initially discharged, is of large magnitude and thus allows a large current to flow through it when contacts K5-B close to connect capacitor C4 through the contacts and the winding of relay K4 to bus 115. The large current which flows through the capacitor rapidly charges it. There results a large but very short current pulse through the winding of relay K4. The pulse has a duration insufficient to control the energization of relay K4. Capacitor C4 functions in the book copying mode just as it functions in the letter copying mode—to keep relay K4 energized after it is first operated later on in the sequence and the K3–A contacts transfer. The capacitor can keep the relay energized for a brief interval since less energy is required for this purpose than is required to initially energize the relay.

As the platen continues to move forward, the trailing edge of cam 143b or cam extension 154 passes switch S1B. It will be recalled that the trailing edge of the cam extension corresponds to the length of the original document set by the operator (if it is greater than 8 inches). The trailing edge of the cam extension passing switch S1B is equivalent to the trailing edge of the original document passing switch SW1 in the letter copying mode. Relay K1 is held operated through contacts K1–D, diode CR16 and switch S1B. With the opening of the switch, relay K1 releases. It should be noted that switch S1B is released only when the trailing edge of cam extension 154 passes it. In the event the cam extension does not extend past the rear edge of fixed cam 143b, switch S1B is opened by the rear edge of the fixed cam. By the time the rear edge of the fixed cam passes switch S1B, at least eight inches of copy paper have been fed from the roll. It is for this reason that switch SW–H is not required in the book copying mode—the minimum length of the cut copy sheet is controlled by the rear edge of fixed cam 143b, while a larger length is controlled by cam extension 154.

With the release of relay K1, normally open contacts K1–B open, and paper clutch K-12 and timer clutch K-11 release. The paper roll feed stops and cam 96 returns to its initial position under control of spring 100. With respect to this cam, it should be noted that after the cam rotates through angle d2 and switch SW–O closes, forward clutch K–9 energizes as described above. The forward clutch is energized only after the copy sheet has reached the exposure window. When relay K5 operates, however, current through the forward clutch K–9 also flows through contacts K5–D. At this time there is no need for switch SW–O to remain closed. Relay K5 energizes when relay K3 energizes, and relay K3 energizes when the forward edge of fixed cam 143b reaches switch S3A. Thus switch SW–O must remain closed only until cam 143b reaches switch S3A; this corresponds to an original document movement in the letter copying mode from switch SW2 to switch SW3. This is a very short distance. The lobe of cam 96 (represented by angle d1) corresponds to a much greater distance than this one, the larger angle being required when the system is operating in the microfilm mode as will be described below. In any event, the lobe on cam 96 keeps switch SW–O closed until after relay K5 operates to maintain forward clutch K–9 energized. With the release of timer clutch K-11, cam 96 returns to its initial position but forward clutch K–9 remains energized through contacts K5–D.

With the release of relay K1 it is an indication that the copy sheet fed from the roll should be cut. Normally closed contacts K1–B close and knife solenoid K-10 is actuated through these contacts and closed contacts K6–B. The knife operates and at the end of its stroke switch SW–X opens. Relay K6 releases and contacts K6–A open. With the release of relay K6, contacts K6–B also open so that knife solenoid K-10 returns to its initial position. Although switch SW–X closes once again, by this time contacts K6–A are open so that relay K6 does not re-energize.

Although contacts K1–C open, it will be recalled that contacts K2–B are now closed so that corona power supply 89 remains energized. The scanning and exposure sequence continues as in the case of the letter copying mode.

As the platen continues to move forward, eventually the trailing edge of cam 143b or 154 passes switch SQ1. Although the switch closes, it serves no function in the single copy operation, since it is in series with switch SW–D and the latter switch is open.

Eventually, the rear edge of cam extension 154 (or the rear edge of cam 143b with a short original, in which case there is no cam "extension") passes switch S2A. The switch opens and relay K2 releases. Contacts K2–B open and the corona power supply is turned off. By this time, the copy sheet has passed the corona (since the trailing edge of the original has reached the front end of the scanning window) so there is no need for the corona. Relay K5 is still energized through closed contacts K3–B. Relay K5 is also energized through closed contacts K5–A and now closed contacts K2–D. It is this alternate path which keeps relay K5 energized even after relay K3 releases and contacts K3–B open.

The platen continues to move to the position where the original to be copied completely clears the scanning window. At this time, the rear edge of cam extension 154, or the rear end of fixed cam 143b if the original is shorter than eight inches, releases switch S3A. Relay K3 releases and contacts K3–B open, but as described above relay K5 is held operated through contacts K5–A and K2–D. It is at this time that relay K4 operates through contacts K5–B and the normally closed K3–A contacts which now close. As soon as the relay energizes, contacts K4–C close, but since the normally open K3–A contacts and contacts K2–C are open, relay K4 is not held energized through the K4–C contacts.

But with the operation of relay K4, the normally closed K4–A contacts open and forward clutch K–9 releases. The normally open K4–A contacts close to energize reverse clutch K–7. As mentioned above, even when the book copier is operated in the single copy mode, it is necessary to return the platen to the starting position in preparation for another copying cycle. As the platen starts to move in the reverse direction with the reverse rotation of rollers 16, 17, 18 at the top of the machine, the rear edge of cam extension 154 closes switch S3A. Relay K3 re-energizes. It is at this time that normally open contacts K3–A close to provide a holding path for relay K4 through contacts K4–C. Although the normally closed K3–A contacts initially hold relay K4 energized and these contacts are now opened, capacitor C4 keeps relay K4 energized until the K3–A contacts transfer—just as it does in the letter copying mode.

With the closing of contacts K3–B, relay K5 is held operated through one path including these contacts, and another path including contacts K5–A and K2–D. The new path including contacts K3–B is necessary since as the platen continues to be returned in the reverse direction relay K2 is operated at which time contacts K2–D open.

As the platen continues in its reverse movement, eventually the rear edge of cam extension 154 closes switch S2A and relay K2 energizes. This corresponds to the trailing edge of an original document in the letter copying mode reaching switch SW2 during its return movement. Although contacts K2-D open, relay K5 is held operated through contacts K3–B. Contacts K2–C close, thus providing a holding path for relay K4 even after relay K3 releases and the normally open K3–A contacts open.

As the platen moves on in the reverse direction, eventually switch SQ1 closes. This has no effect on the system operation since switch SW–D is open. Thereafter, switch S1B is closed. The closing of this switch also has no effect on the system operation. At this time, contacts K1–D are open and thus no current can flow through switch S1B to energize relay K1. Switch S1B serves only to control the release of relay K1; the relay is initially operated by the closing of manual switch S1A.

As the platen continues to return in the reverse direction, eventually switch S3A opens. Relay K3 releases. With the opening of contacts K3–B, relay K5 releases. This is the same sequence which takes place in the letter copying mode. Relay K4 is still energized, however, even though normally open contacts K3–A open at this time, since contacts K2–C are closed. The relay must remain energized in order for the reverse movement of the platen to continue.

Eventually, the platen is returned to its initial position when the forward edge of fixed cam 143b releases switch S2A. With the opening of the switch, relay K2 releases. The opening of contacts K2–C results in the release of relay K4. Although the normally closed K4–A contacts close once again, forward clutch K–9 is not energized because at this time switch SW–O is open and contacts K5–D are open. The opening of the normal open K4–A contacts causes the release of clutch K–7, rollers 16, 17, 18 stop rotating and the platen comes to a halt. Actually, the forward edge of fixed cam 143b is positioned on the platen such that switch S2A opens when the platen has yet another one-eighth inch to go before it reaches the initial starting point. The inertia of the platen keeps it moving until it reaches the starting position. The coasting effect is desirable because it insures the same starting point for the platen during each operation. The platen has a considerable inertia and might coast a different extent in different machines. Even in the same machine, different weight originals (books) might vary the coasting. This would result in different starting positions in various machines, and even in the same machine. Since it is very difficult to bring the platen to an abrupt halt, no attempt is made to do so. Instead, the inertia of the platen is used to advantage. The reverse drive is stopped shortly before the platen has completely returned to the starting point, the inertia of the platen then causing the last increment of reverse movement to take place.

During the entire sequence, it should be noted that timing motor TM1 operates just as it does when a single copy is made in the letter copying mode. Depending on the length of the original to be copied, timing motor TM1 may become parked with the opening of switch SW–B. But as soon as all of relays K1, K2 and K5 release, an alternate path is provided around switch SW–B and the timing motor continues to move from its parked position until switch SW–A opens at the end of a 120° turn of cam 95. As for timing motor TM2, during the reverse movement of the platen (after relay K3 releases), contacts K3–D and K4–D are closed. Although timing motor TM2 is energized, it cannot move cam 107 in the counter-clockwise direction past the initial position. A slip clutch (not shown) is provided between timing motor TM2 and the cam, and a stop (not shown) is provided to prevent turning of cam 107 past the "single-copy" position in the counter-clockwise direction. Thus while timing motor TM2 does operate for a moment, it has no effect on the system operation. (In the letter copying mode when a single copy is made, motor TM2 does not operate at all since contacts K4–D do not close. These contacts close, however, in the single copy sequence in the book copier mode since relay K4 must operate to control return of the platen.)

As described above, when the book copier rails are put in place, mirror 65 in the copying machine is moved closer toward the exposure window. While this shortens the optical path inside the machine (to compensate for the increased optical path through the glass platen), it also moves the optical axis intersection with the scanning window closer to the forward edge of the scanning window. For proper registration, the leading edge of the original must start moving from a position whose distance from the optical axis intersection with the scanning window is the same as the distance between the leading edge of the copy sheet and the optical axis intersection with the exposure window when the forward movement of the original begins. With movement of the mirror toward the exposure window, the optical axis intersection with the scanning window is moved closer toward the platen in its rest position. Were the forward edge of the platen in its rest position at that point on top of the machine which is passed by the leading edge of an original document in the letter copying mode which results in the operation of switch SW2, it is apparent that the initial portion of the original document to be copied on the platen would be "ahead" of the leading edge of the copy sheet, and the initial portion of the original document would be "lost" on the copy. This is easily compensated for by having the leading edge of the platen in the rest position slightly behind that point on top of the copying machine which when passed by an original document in the letter copying mode results in the operation of switch SW2. Mirror 65 is moved toward the exposure station by approximately one-eighth inch when the book copier rails are put in place. Consequently, all that is required is for the leading edge of the platen in the rest position to be one-eighth inch behind that point on top of the copying machine which when passed by the leading edge of an original document in the letter copying mode results in the operation of switch SW2. With the platen returned all the way to the starting position, the leading edge of the platen is in fact in a position which allows perfect synchronization or registration between the original document on the platen and the copy sheet.

It is also of interest to consider the sequence which follows when the platen is first placed on top of the machine. As long as switch S1A is not manually operated, relay K1 remains de-energized. Paper clutch K–12 thus remains off and there is no copy sheet feed. However, it is necessary to properly position the platen before switch S1A is operated to make the first copy. This is accomplished automatically. When the platen is in the proper initial position, with the forward edge of fixed cam 143b being just before switch S2A in the rail, the platen extends past the rear of the machine by approximately three inches. When placing the platen on the machine, the operator moves the platen forward, bringing the rear edge of the platen closer to the rear of the machine. (In other words, he just pushes the platen "all the way in"). In such a case, the forward edge of fixed cam 143b is underneath the finger of switch S3A and this switch is closed. Relay K3 energizes and contacts K3–B close. This results in the energization of relay K5 and the closing of contacts K5–D. Forward clutch K–9 is thus energized through normally closed contacts K4–A and contacts K5–D. Rollers 16, 17, 18 are thus caused to turn in the direction of forward movement and the platen is moved until the rear edge of the fixed cam or the cam extension results in the opening of switch S3A. At this time, relay K4 operates in the usual manner and the platen is returned in the reverse direction. The return movement stops just before the platen is returned to the initial position, and the platen then coasts to the initial position (with the platen extending approximately three inches to the rear of the machine). Thus, simply by requiring the operator when he places the platen on the rails to push it "all the way in," the system automatically goes through a single cycle with the platen being returned to the true initial position. There is no waste of copy paper, however, because relay K1 is not operated to begin with and there is no copy sheet feed.

MULTIPLE COPY OPERATION

As in the letter copying mode, when multiple copies of an original are desired, dial 107 is turned until the appropriate numeral appears in the "12 o'clock" position. This causes switch SW–D to close. Referring to FIG. 22, it will be noted that switch SW–D is in series with switch SQ1. Although in the single copy sequence, the closing of switch SQ1 by movement of the platen had no effect, the same is not true in the multiple copy sequence since during this sequence switch SW–D is closed.

The multiple copy sequence is identical to the single copy sequence up to that point during the reverse movement of the platen when the trailing edge of the fixed cam closes switch SQ1. During forward movement of the platen, the fact that switch SQ1 closes does not change the system operation—switches SQ1 and SW-D are bridged by normally closed contacts K4-B which are closed during the forward movement. At the beginning of the reverse movement, normally closed contacts K4-B open, but at this time switch SQ1 is also open. Consequently, the sequence is the same as the single copy sequence until switch SQ1 closes during the reverse movement of the platen. (Actually, there is one slight difference. It will be recalled that in the multiple copy sequence, in the letter copying mode, when the original starts to move in the reverse direction, there is a brief interval during which contacts K3-D are closed at the same time that contacts K4-D are closed. Timing motor TM2 is energized until relay K3 energizes immediately after it releases. The brief interval of energization is not long enough for switch SW-C to close. It is only after relay K3 finally releases that cam 107 is decremented. In the single copy sequence of the book copier mode, a momentary energization of timing motor TM2 (which occurs during the brief interval when relay K3 is released at the start of the platen reverse movement) does not have any effect whatsoever since cam 107 cannot be rotated in the counterclockwise direction past the position shown in FIG. 5. But in the multiple copy operation it can be rotated in the counterclockwise direction; this is in fact how the count is decremented after each copy is made. Thus, in the multiple copy sequence the timing motor starts to decrement cam 107 when the platen reverses direction, but it does not operate long enough to close switch SW-C and thus continue to operate after contacts K3-D open. This is different from the single copy sequence in which cam 107 cannot move at all at the start of the reverse movement of the platen. Except for this minor difference in operation—and no difference in net effect—until switch SQ1 operates as the platen is moved in the reverse direction in the multiple copy sequence, the multiple copy sequence is the same as the single copy sequence.)

During reverse movement of the platen, the normally closed K4-B contacts are open. When switch SQ1 is closed by the fixed cam, current flows through the normally open K4-B contacts which are now closed, switches SQ1 and SW-D and the winding of relay K1. The operation of relay K1 thus results in the start of the copy paper feed.

It is important to note that switches S1B, S2A, and S3A are operated by both the fixed cam 143b and the cam extension 154. Switch SQ1, on the other hand, rides only on the fixed cam, and the closing of switch SQ1 is thus controlled only by the fixed cam. This is important because the "early" start of the copy paper feed during reverse movement of the platen in the multiple copy mode must begin during every cycle when the platen still has the same distance to travel back to the initial position. Only in this way can the copy sheet reach the exposure window when the platen reaches its initial position and starts moving once again in the forward direction. It is the rear end of the fixed cam which always closes switch SQ1 to start the copy paper feed.

With the closing of switch SQ1 and the energization of relay K1, relay K6 energizes, timer clutch K-11 energizes to control turning on of the exposure lamps, paper clutch K-12 energizes to control the copy paper feed, normally open contacts K1-C close to energize the corona power supply, etc., just as they all do when a single copy is made.

The platen is returned just as it is at the end of a single copy operation. Switch S1B is closed so that when it opens during the next forward movement of the platen, the copy paper can be cut by the release of relay K1. Switches S3A and S2A are released in succession just as they are in the single copy sequence. Switch S2A is released and the reverse feed of the platen stops while the platen still has one-eighth inch to coast before it is in the starting position. By the time the platen has coasted the last one-eighth inch, cam 96 has rotated through angle d2 (FIG. 7) to that point where switch SW-O is closed. At this time forward clutch K-9 energizes and the platen is moved in the forward direction. (As a margin of safety, cam 96 is designed to close switch SW-O one-quarter second after the platen comes to rest to insure that the platen will have stopped moving in the reverse direction when the forward movements begins.)

It will be recalled that in the single copy sequence the copy paper feed begins (with the operation of relay K1 after start button S1A is pressed down) at the same time that cam 96 starts to turn. Switch SW-O is not operated by the lobe on cam 96 to start the forward movement of the platen until the copy sheet has reached the exposure window. During the multiple copy sequence, relay K1 is operated through switch SQ1 and this starts the copy paper feed. At the same time, timer clutch K-11 is energized through normally open (now closed) contacts K1-B so that cam 96 starts to turn. Instead of keeping the platen stationary as in the single copy sequence when the copy sheet starts to move, the platen continues to move in the reverse direction during the multiple copy sequence. But at the end of the reverse movement, cam 96 closes switch SW-O so that the forward movement begins. Switch S2A opens as the platen is returned slightly before switch SW-O is closed by cam 96. This allows the platen to coast back to the starting position before the forward clutch is energized. Basically, in the multiple copy operation, the single copy cycle is repeated over and over again. The only difference is that because switch SW-D is closed, the closing of switch SQ1 during reverse movement of the platen has an effect on the circuit. The effect is to energize relay K1 so that the copy paper feed starts even before the platen is returned to the initial position. In this manner, as soon as the platen is returned to the initial position, it can be moved in the forward direction without waiting for the copy sheet to "catch up" to it.

It is during reverse movement of the platen that timing motor TM2 causes dial 102 to be decremented. When switch S3A is first released by the trailing edge of fixed cam 143b or cam extension 154, relay K3 releases and contacts K3-D close. At this time, with the closing of normally closed contacts K3-A, relay K4 is energized. Although contacts K4-D close, relay K3 releases immediately, contacts K3-D open, and timing motor TM2 does not have a sufficient time to rotate cam 107 such that switch SW-C closes. However, as the platen continues to move in the reverse direction, eventually switch S3A opens as the leading edge of fixed cam 143b passes underneath it. At this time, relay K3 releases, contacts K3-D close, and timing motor TM2 causes the decrementing of the count represented by dial 102, switch SW-C closing as in the multiple copying of an original in the letter copying mode to insure that timing motor TM2 completes its cycle even though relay K4 releases at the end of the platen reverse movement and contacts K4-D open before the decrementing of the dial is actually completed.

Eventually, the dial is decremented to a count of "one" (after the next to last copy has been made). The platen still moves in the forward direction one more time as soon as switch S2A opens since relay K2 energizes and the opening of contacts K2-C result in the release of relay K4 and the energization of forward clutch K-9 (through switch SW-O). However, at this time switch SW-D is open. Consequently, during the last return of the platen following the making of the last copy, the closing of switch SQ1 does not result in the energization of relay K1. The platen is simply returned as it is in the single copy sequence without relay K1 being energized and without the feed of a new copy sheet from the roll. Because relay K1 is not energized during the last return of the platen, normally open contacts K1-B are open. Thus not only is paper clutch K-12 left de-energized, but timer clutch K-11 is also left deenergized. With this latter clutch de-energized, cam 96 does not rotate. Consequently, after the platen has returned to its initial position, the lobe of cam 96 does not thereafter cause switch SW-O to close. The forward clutch remains deenergized—the desired effect since the last copy has been made.

MICROFILM COPIER MODE

An illustrative microfilm attachment is shown in FIGS. 23–30. The attachment includes a projector lamp which is supplied power through the machine and the attachment mating connectors. It also includes a roller which engages roller 18 on top of the copying machine to control movement of the microfilm during scanning.

One of the problems unique to the operation in the microfilm mode is that the operator must first select a particular frame on a microfiche card or a microfilm reel before the copying cycle is actually begun. The selection and subsequent scanning are both accomplished with the use of a single projection lamp. The microfilm attachment includes a solenoid which controls the position of a mirror. Before the copying cycle begins, the mirror is in a first position which allows light from the projection lamp transmitted through the microfilm to be imaged on a screen. As the microfiche card or microfilm reel is moved, the operator can select the proper frame for copying. Thereafter, the mirror is automatically moved (under control of the copying machine) such that the light transmitted through the selected frame is directed to the scanning window on top of the copying machine. This light is used to expose the copy sheet. There is thus no reason for energizing the exposure lamps in the copying machine when the system operates in the microfilm mode.

Since the scanning of the microfilm takes place in the attachment itself, the microfilm must be moved during the scanning process. Consider a projection "window" in front of the microfilm frame of interest which allows light from the projection lamp to be transmitted through only the frame of interest. Initially, the entire frame is imaged on the screen. Thereafter, the mirror is moved such that the image is directed toward the scanning window on top of the machine. For proper scanning of any original, it must be effectively moved past the machine scanning window (in synchronism with the moving copy sheet). This is accomplished in the microfilm mode by moving the microfilm past the projection lamp. Since only a portion of the projected light strikes the scanning window, the frame is effectively scanned as if a magnified original moved past the scanning window. The area directly in front of the lamp through which transmitted light strikes the scanning window is an "effective scanning window." It is equivalent to the scanning window itself on top of the machine from which reflected light is gathered when the system is operated in the letter copying and book copying modes. At the start of the copying cycle, the microfilm frame to be copied is centered (so that it can be viewed on the screen); it is positioned such that the middle of the frame is adjacent to the effective scanning window. Were the microfilm to move in the forward direction at the start of the copying cycle, the scanning would be started before the copy sheet reached the exposure window. Of course, movement of the microfilm could be delayed until the copy sheet reached the exposure window, just as movement of the book platen is delayed until the copy sheet reaches the exposure window when the system is operated in the book copier mode. However, were this done, only the trailing half of the microfilm frame would be imaged on the copy sheet because the leading half of the microfilm starts in a position which is past the microfilm effective scanning window.

For this reason, when the system operates in the microfilm mode, the first thing that is done is to move the microfilm in the reverse direction until the leading edge of the frame of interest is in front of the microfilm effective scanning window. At the same time that the copy sheet is fed from the copy paper roll in the machine, the original transport system of the machine is controlled to move in the reverse direction. Just when the copy sheet reaches the exposure window, the microfilm frame has cleared the effective scanning window in front of the projection lamp. The original transport system is then operated in the forward direction so that synchronized scanning and exposure can take place together. At the end of the scanning sequence, the original transport system is operated in the reverse direction in order to return the microfilm to the initial position with the center of the frame of interest being adjacent to the effective scanning window in front of the projection lamp.

If multiple copies are to be made, the original transport system continues to operate in the reverse direction to move the microfilm all the way back until it clears the effective scanning window (during which time the copy sheet feed begins), that is, another cycle of operation, almost identical to the first, starts immediately. Because in the microfilm mode the original is first reverse transported—even when a single copy is being made—there is almost no difference between single and multiple copy operations.

The overall arrangement of elements in the microfilm attachment can be best understood with reference to FIGS. 23, 25 and 26. It must be understood that the attachment can be provided with a housing (not shown) for enclosing the internal structure. FIG. 26 is a top view of that part of the attachment shown on the right side of FIG. 25. FIG. 25 itself is a side view of the attachment, while FIG. 23 is a sectional view taken through the line 23–23 of FIG. 26.

The frame of the attachment includes two support beams 418 which extend in a direction parallel to that of the machine when the attachment is put on it. Platforms 416 and 417, mounted on beams 418, support projection lamp 405, blower 406, condenser lens assembly 407, the plate 430 assembly (which includes a microfiche card and holder), plate 419 which contains objective lens assembly 423, two vertical brackets 488 and solenoid K–15.

At the end of the attachment which is mounted on the copying machine, there is a bridging section 496 which includes a slide lever 471 on each side of it. Also included in each side of the bridging section is a pivot 475 around which a pivoting element 476 can rotate. A pin 477 moves with each slide lever 471. When the slide lever is moved to the right in FIG. 25, pin 477 moves with it and causes pivoted bracket 476 to rotate around pivot 475 in the clockwise direction. A pin 131 is included on each side of copying machine 10 (see FIG. 8). When slide lever 471 is moved to the right in FIG. 25, bracket 476 is rotated such that it clears pin 131.

A bracket 475a is mounted underneath each of beams 418, and a pin 478 projects outwardly from each of the brackets. To mount the microfilm attachment on the machine, pins 478 are first inserted into the slots in brackets 138 on the machine. This can be done while the overall attachment is inclined with the projection lamp end of the attachment being lower than that end of the attachment which is actually placed on top of the machine. The end of the attachment which is placed on the machine is then pushed down while the two slide levers 471 are moved to the right in FIG. 25. After the attachment is firmly in place, the slide levers are moved to the left so that brackets 476 engage pins 131 as shown in FIG. 25. This locks the attachment to the machine.

The attachment includes a roller 439, journalled in the two sides of bridging section 496, which bears against roller 18 in the machine when the attachment is locked firmly in place. At one end of the roller there is attached a pinion gear 472. Two shafts are extended between and journalled in vertical brackets 453 and 473, both of which are mounted on the base 497 of the attachment. Shaft 457 carries three gears 454, 455, and 456. Gear 454 engages gear 472 and is thus driven as roller 18 causes roller 439 to turn with it. Shaft 462 is provided with a hub 461 to which one end of tape 420 is secured. Also mounted to the shaft is sector gear 458, which gear engages gear 456 as shown most clearly in FIG. 23. As input roller 18 moves in either direction, it is apparent that sector gear 458 moves in the opposite direction. Thus, when the original transport system of the machine moves in the forward direction, with roller 18 in FIG. 23 moving in the clockwise direction, tape 420 winds up on hub 461 and is thus pulled to the left. When roller 18 rotates in the counter-clockwise direction, shaft 462 rotates in the clockwise direction to feed out tape 420.

An additional shaft 459 extends across the machine and is journalled in brackets 401 and 473. Gear 460 is mounted on one end of the shaft to engage gear 455. Shaft 459 thus rotates as the rollers in the original transport system rotate. At the end of the shaft which is journalled in bracket 401, there are provided two cams 402 and 403, shown in detail in FIG. 27. Disposed around the two cams and mounted on bracket 401 are five microswitches shown in FIG. 27. (The switches are omitted from FIG. 26 for the sake of clarity.)

The fingers of switches S3B, S2B and S1C ride on cam 402, while the fingers of microswitches SD1 and SQ2 ride on cam 403. FIG. 27 shows the directions of rotation of the two cams when the original transport system moves in both directions in the machine. When the original transport system moves in the forward direction, the two cams rotate in the clockwise direction, and when it moves in the reverse direction the two cams rotate in the counter-clockwise direction. The microswitches as well as the projection lamp 405, blower 406, solenoid K–15 and other circuit elements (to be described below) are connected within the attachment to pins in connector 470, shown in FIG. 33. This connector, of course, engages connector 132 in the machine when the microfilm attachment is in place on top of the machine.

As seen most clearly on the left side of FIG. 23, extended between vertical plates 473 and 401 is a support 452 on which mirror 451 is mounted. Light transmitted toward the mirror from lens assembly 423 (when pivoting support 412 and mirror 413 are raised to the position shown in phantom in FIG. 23) is reflected from mirror 451 and directed to two Fresnel lenses 438, which lenses are situated directly on top of scanning window 137 in the machine, where an enlarged image of the microfilm original is formed. The combined focal length of the Fresnel lenses is such that the light rays from lens 423 are directed through lens 28 in the copying machine, which lens images the aerial image formed at scanning window 137 upon the copy paper at the exposure window. The function of the Fresnel lenses is to bend the diverging rays from lens 423 so that the light from lamp 405 is coned through lens 28 and thus made to fall upon the copy paper.

A cover plate 436 is also provided, hinged at both sides of the unit, as shown at 463. On the inside of the cover plate is a screen 435. Two braces 434 are hinged in the cover, as shown at 437. If the cover is raised, as shown in the drawing, and braces 434 on the two sides of the attachment are pivoted to the positions shown, the cover remains raised. If pivotal support 412 and mirror 413 are in the position shown in FIG. 23, light transmitted through objective lens assembly 423 is reflected from mirror 413, and then from mirror 409 to screen 435, and the operator can view a frame of the microfiche card. To lower cover 436, braces 434 are simply rotated in the clockwise direction of FIG. 23 and the cover is then lowered.

In the projection end of the microfilm attachment, there are provided two vertical brackets 488. Between the two brackets there are extended two shafts 424 and 428, shaft 428 being above shaft 424 as shown most clearly in FIGS. 23 and 29. Shaft 424 carries two idler rollers 427 at each of its ends and shaft 428 similarly carries two such rollers. In addition, at the center of shaft 424, there is provided an additional roller 426 around which tape 420 is passed. An end of the tape is attached to plate 430. This plate includes a central cut-out 430a. As will be described below, to the right of plate 430 in FIG. 23, there is provided a mechanism for placing a selected microfilm frame adjacent to projection window 430a. Once a frame is selected, plate 430 moves up, then down, and then up again during each copying cycle, all under control of tape 420.

As seen most clearly in FIG. 29, there are two vertical guides 429 mounted on that surface of plate 430 which bears against rollers 427. The two guides fit between the four rollers 427 to insure that plate 430 moves only in the vertical direction. Plate 430 is held against the four rollers 427 by two springs 479. A bracket 487 is attached to each side of plate 430 and each of springs 479 is connected between a respective one of the brackets and the rear of the respective one of plates 488. This arrangement insures that plate 430 moves only up and down, while at the same time always bearing against the four rollers 427.

On either side of plate 430 there is attached a vertical bracket 482. The two brackets, as will be described below, support the microfiche card carrying assembly. Brackets 482 slide up and down on plate 430 and thus permit a different microfilm frame to be placed adjacent to window 430a. Since the two brackets 482 support the entire microfiche card carrying assembly, and both of the brackets are slidable on plate 430, it must be insured that once a frame is selected the card carrying assembly, that is, brackets 482, do not fall under their own weight on plate 430. This is achieved by the use of two Negator springs 481a. A shaft 483 extends through plates 430. At each end of the shaft, a Negator spring 481a is wound. The free end of each Negator spring is attached to that one of brackets 482 on the same side of plate 430. This is shown most clearly in FIG. 25. While brackets 482 can slide up and down relative to plate 430, at all times springs 481a exert an upward force on the brackets (and therefore on the card carrying assembly) which does not change since the torques of the springs are constant. The spring torques are just sufficient to balance the weight of the card carrying assembly (brackets 482). Thus no matter what the position of the assembly on plate 430, it is always balanced; while it moves up and down with plate 430, the assembly does not move relative to plate 430 once the operator selects a frame for copying. The use of the Negator springs in this manner insures that once a frame is selected it remains within projection window 430a, without requiring such a tight fit between brackets 482 and plate 430 that it becomes difficult to move the card carrying assembly when it is desired to select a new frame.

Referring to FIG. 25, when the original transport system of the copying machine moves in the forward direction, tape 420 is pulled to the right. Since the tape is wrapped around roller 427 and attached to plate 430, at this time plate 430 moves down. When the original transport system of the copying machine moves in the reverse direction, tape 420 is fed out. At this time, plate 430 should move in the reverse (up) direction. This movement is controlled by two springs 480, one on each side of plate 430. Each spring is attached at one of its ends to the bottom of the attachment and at its other end to one of two lugs 481 included on plate 430. Each of the springs exerts an upward force sufficient to raise plate 430 to that point at which window 430a is above lens assembly 423. Thus as tape 420 is fed out, plate 430 rises, the pulling in of tape 420 controlling downward movement of plate 430 against the force of springs 480.

In the projection assembly there is included a cover 408 pivoted to rotate on plates 488, as shown at 421. As seen most clearly in FIG. 25, a clip 410 is provided an each of plates 488 for holding cover 408 in the raised position when it is first placed there. To lower the cover when the machine is not in use, all that is required is to exert a sufficient force on the cover in the downward direction. The cover carries a mirror 409 (see FIG. 23). Lens assembly 423 is mounted in bracket 419. With mirror support 412 in the position shown, light transmitted from projection lamp 405 through condenser lens assembly 407 (typically including two lens separated by a heat filter), a frame contained within window 430a, and objective lens assembly 423 is reflected from mirror 413 to mirror 409, and from mirror 409 to screen 435. As the operator moves the microfiche card, different frames are placed adjacent to window 430a. When the desired frame is selected, it can be viewed in its entirety on the screen. Thereafter, as will be described below, the copying sequence is started. Plate 430 first rises so that the frame can be moved in the reverse direction such that its leading edge is in front of the effective scanning window (the effective scanning window being a limited band across lens assembly 423). While the original is thus being reverse transported, the operator actually observes the moving originAl on screen 435.

Just before plate 430 starts to move in the downward direction, when the original transport system of the copying machine switches to the forward direction, solenoid K-15 is operated. At this time, the mirror support element 412, which is hinged at 411, rotates in the counter-clockwise direction as the solenoid shaft is pulled down, link 414 connected between the solenoid shaft and an edge of platform 412 moving down with the solenoid shaft and causing the platform to rotate to the position shown in phantom in FIG. 23. At this time, nothing is seen on screen 435 by the operator. Instead, light transmitted through the moving original is reflected from mirror 451 to Fresnel lenses 438 and the image is formed at scanning window 137.

At the end of the copying sequence, plate 430 moves once again in the upward direction until projection window 430a (and the selected frame) are in front of lens assembly 423. At the start of the upward movement, solenoid K-15 releases so that the operator observes the reverse moving frame once again on screen 435.

FIG. 24 shows the complete motion of a frame 464 situated adjacent to window 430a. (The horizontal "offsets" are not real but are depicted only so that the various positions of the frame can be distinctly visualized.) With the projection window 430a in the position shown in FIG. 23, and solenoid K-15 de-energized, the entire frame is illuminated by projection lamp 405 and the entire image is viewed on screen 435. When mirror 413 is in the raised position, however, the light which is transmitted through lens assembly 423 to the copying machine is not all gathered. Instead, only light through a limited band across lens assembly 423 strikes the scanning window of the machine. The effective scanning window is shown as 463 in FIG. 24. Since it is centered across window 430a when plate 430 is in its initial position, it is apparent that were scanning to commence with forward (downward) movement of the original, the bottom half of the frame would not be scanned at all since it starts off in a position past the effective scanning window. For this reason window 430a is first raised, as shown by arrow 465a, until frame 464 (shown by phantom lines 464a) is in a position at which the leading edge of the frame is just in front of the effective scanning window 463. During the actual scanning, the frame moves downward with plate 430, as shown by arrow 465b, the final position of the frame being shown by phantom lines 464b (with the trailing edge of the frame having just cleared the effective scanning window 463). Thereafter, plate 430 is returned in the reverse direction as shown by arrow 465c is returned in the reverse direction as shown by arrow 465c until the frame (shown by phantom lines 464c) is in the initial starting position.

There is one additional shaft 485 which is extended between plates 488. At an end of the shaft is a wheel 484 which is turned manually by the operator (the shaft can be extended outside the housing, the housing not being shown in the drawing). An eccentric cam 422 is mounted on shaft 485 and bears against plate 419. This is the plate which carries lens assembly 423. Thus as wheel 484 is turned, lens assembly 423 can be moved slightly in the direction of light transmission through it. The friction between shaft 485 and plates 488 is enough to keep the shaft positioned after it is turned as required. This fine focusing adjustment has been found advantageous in the attachment.

Thus far the attachment has been described as including a movable plate 430 on the two sides of which slidable brackets 482 are mounted. The card carrying assembly permits the operator to vary the microfilm frame placed adjacent to window 430a in the plate. The card carrying assembly is shown most clearly in FIG. 30. Across the top and bottom of the two slidable brackets 482 there are secured two horizontal brackets 431. These brackets move up and down with brackets 482. Contained within grooves in the two brackets 431 is a glass plate 489. This plate can be moved in a horizontal direction within brackets 431. At the two sides of glass plate 489 there are two fixed brackets 490. At the upper end of each bracket is a clip 494 and at the lower end of each bracket is a clip 495.

An additional glass plate 492 is mounted in two brackets 433, handles 491 extending outward from the two brackets 433. A microfiche card 493 is placed adjacent to glass plate 489 and handles 491 are then inserted into the two clips 494 and the two clips 495, as shown. Clips 495 are longer than clips 494 and have dimples 498. This permits handles 491 to be raised relative to plate 489 with the top portions of the handles clearing clips 494 to disassemble the two glass panels. Glass plate 492 bears against glass plates 489 and thus maintains the microfiche card secured in place between the two glass plates.

To remove the microfiche card, handles 491 are grasped and moved to the right or left. Since glass plate 492 is contained on top of glass plate 489 but is confined within brackets 490, glass plate 489 moves together with plate 492. Glass plate 489 simply slides out of brackets 431. When the two plates are removed, plate 492 (with brackets 433 and handles 491) is separated from plate 489 by forcing handles 491 in against the dimples in the lower clips. The microfiche card can then be changed if desired and the two plates attached to each other once again. Glass plate 489 is then pushed into the grooves of brackets 431.

FIG. 30 shows window 430a in plate 430. (The plate 430 is also shown in phantom to illustrate the fact that it is moved up and down as tape 420 is fed out and pulled in). To raise the microfiche card relative to plate 430, all that is required is for the operator to push the fixed assembly comprising the two brackets 482 and the two brackets 431 in the upward direction; conversely, to lower the microfiche card relative to window 430a the assembly is pushed down. To move the microfiche card to the left or right, the operator simply grips handles 491 and moves them in the desired direction. In this way, any frame on card 493 can be placed in front of projection window 430a. Since solenoid K-15 is initially released, as the operator moves the microfiche card different frames come into view on screen 435. When the desired frame is seen, the start button on the attachment can be operated to start the copying sequence, as will be described below.

FIGS. 31 and 32 show a microfilm reel assembly in the event it is desired to make a copy of a frame on a microfilm reel. The elements which are the same as those shown in FIGS. 29 and 30 bear the same reference numerals. (The fine focusing adjustment is not shown.) A different objective lens assembly 501, as well as a different condenser lens assembly 507, are provided instead of assemblies 423 and 407, the two lens assemblies being suitable for use with frames on a typical microfilm reel.

Attached to plate 430 is a casting 502, secured to plate 430 by screws 519. Directly in back of window 430a is a first glass plate 504. Microfilm 503 passes between this glass plate and another glass plate 505. The two glass plates are held against plate 430 by a metal plate 506, screws 519 also passing through this plate. A spacer (not shown) is included between the two glass plates to insure that they are separated sufficiently to allow the microfilm to pass between them.

The microfilm is wound between two reels 508, 509 each of which is mounted on a respective one of spindles 521 and 522. Two additional posts 517 are provided on the casting with nylon rollers 516 mounted on them. Microfilm 503 passes around rollers 516 on its path between the two reels through the two glass plates. As either microfilm reel is turned, different frames appear adjacent to window 430a. There is no need to move the assembly in the vertical direction relative to plate 430 since the microfilm frames are all contained on the same horizontal level.

Any of many well known mechanisms can be provided for turning one of the two reels. One such standard assembly is shown in FIGS. 31 and 32. Crank 510 is connected to shaft 513 which is journalled in both of housings 511 and 512, mounted on casting 502. A pin 515 extends radially from the center of shaft 513. A tube 514 is contained on shaft 513, the tube having a slot 518 through which pin 515 extends. Two clutches 525 and 526 are mounted on opposite ends of tube 514. Spindle 521 is connected to bevel gear 523, and bevel gear 524 is loosely mounted for rotation on shaft 513 and is held in place by stop collar 531. Similarly, bevel gear 528 is attached to spindle 522, and bevel gear 527 (with hub 529) is loosely mounted for rotation on shaft 513 and is held in place by stop collar 532.

Suppose that crank 510 is turned such that pin 515 moves downward in FIG. 32. As the pin moves downward it causes cylinder 514 to rotate with shaft 513. At the same time, however, due to the angle of slot 518, the pin also forces cylinder 514 to the right. Clutch 526 bears against hub 529 and gear 527 thus rotates with shaft 513. When gear 527 rotates, it transmits motion through gear 528 to spindle 522 and reel 508. On the other hand, if crank 510 is rotated such that pin 515 moves in the upward direction in FIG. 32, shaft 513 rotates in the opposite direction and pin 515 causes cylinder 514 ro rotate in the same direction. At the start of the motion, however, pin 515 forces cylinder 514 to the left. Clutch 526 is disengaged from hub 519 and gear 527 stops turning. Clutch 525 is now forced to the left and engages the face of gear 524. Gear 524 now rotates with shaft 513 and transmits motion through gear 523 to spindle 521. Reel 509 turns to wind up the microfilm. Thus, depending on the direction in which crank 510 is turned, a different one of the two reels rotates to wind up the film. The other reel simply turns freely since the non-clutched one of gears 524 and 527 is capable of rotating loosely on shaft 513 in a direction opposite to the direction in which the shaft is turned.

FIG. 28 shows the sequence of operations of the five microswitches of FIG. 27 for a complete cycle. When a waveform is "high" it indicates that the respective switch is closed, and when the waveform is "low" it indicates that the switch is open. Initially, only switches SD1 and SQ2 are open. It will be recalled that the original transport system of the machine first moves in the reverse direction in order to move the microfilm up past the microfilm effective scanning window. During the initial reverse movement, cams 402 and 403 rotate in the counter-clockwise direction (FIG. 27) approximately 154°. When the actual scanning cycle beings, both cams move in the clockwise direction. It will be observed that in the middle of the overall sequence, switch SD1 opens and closes soon thereafter. When switch SD1 closes, both cams have returned to their initial zero-degree positions. As the forward movement of the microfilm continues, both cams continue to move in the clockwise direction until switch S3B opens and then immediately closes. At this point, both cams have rotated in the clockwise direction from the initial zero-degree position approximately 164 degrees. At this time, the original transport system switches to the reverse direction and both cams rotate in the reverse direction until they return to the zero-degree position. Several angular positions are shown on FIG. 28; positive angles represent rotations of the cams in the clockwise direction from the zero-degree position shown in FIG. 27, while negative angles represent rotations of the cams in the counter-clockwise direction.

FIG. 28 also shows when switch SW–O (FIG. 4) in the copying machine opens and closes during each cycle since the function of this switch can be best understood by considering the time period during which it is closed with reference to the operations of the other switches depicted in FIG. 28.

FIG. 33 shows the electrical circuit of the microfilm attachment. It includes the projection lamp and blower, the five switches operated by cams 402 and 403, an additional relay K12, a mirror solenoid K–15, and a start button S1D. The start button is operated after the frame of interest has been selected and it is desired to actually start the copying sequence.

When the microfilm attachment is placed on the top of the copying machine, there results the overall machine circuit of FIG. 34. Before proceeding with a description of the circuit and the system operation in the microfilm mode, it should be noted that the circuit shown in FIG. 34 does not include the two exposure lamps, timing motor TM1 and the various contacts and switches which connect them to lines L1 and L2. (Compare FIG. 34 to FIGS. 14 aNd 22.) It will be recalled that when operating in the microfilm mode, the scanning light for exposing the copy sheet comes from the projection lamp in the attachment placed on top of the machine. This light is transmitted directly from the microfilm down through the scanning window on top of the copying machine. There is thus no reason to turn on the two exposure lamps in the copying machine. The two exposure lamps are turned on by switches SW–E and SW–F, which are closed with the turning of cam 95 by timing motor TM1 (see FIG 4). To prevent the energization of the two exposure lamps, all that is requires is to prevent the operation of timing motor TM1. Referring to FIG. 3 which shows the electrical circuit of the copying machine itself, it will be noted that one end of timing motor TM1 is connected to switch SW A and pin N. Since switch SW-A is normally open and closes only when timing motor TM1 starts operating, it is apparent that whether or not timing motor TM1 is energized during the microfilm mode depends on the connections to pin N. Referring to FIG. 33, it will be noted that no connection is made to pin N inside the microfilm attachment (as opposed to the other two attachments in which pin N is connected to pin P, the latter being connected through contacts K1–A to line L1, as shown in FIG. 3). Since timing motor TM1 does not operate in the microfilm mode and the two exposure lamps do not turn on, they are not shown in the microfilm mode circuit of FIG. 34.

The microfilm attachment controls the cycling of the copying machine in such a way that the machine always cycles as if it is making multiple copies; of course, if only a single copy is initially set on dial 102 (FIG. 5), the tail end of the single copy sequence is the same as the tail end of the last cycle in the multiple copy sequence (as opposed to all of the earlier cycles). For this reason, it is most convenient to consider the single and multiple copy operations together in the microfilm mode.

SINGLE AND MULTIPLE COPY OPERATIONS

Initially, the microfilm frame of interest is totally within the confines of projection window 430a, mirror 413 is lowered (see FIG. 23) and the entire frame is imaged on screen 435. As soon as the operator verifies that he has selected the proper frame, he presses start button SID (see FIG. 23). Unlike the letter copier and book copier modes, operation of the start button does not result in the energization of relay K1 and the start of the copy paper feed. InStead, operation of the start button causes the original transport system of the machine to move in the reverse direction in order to allow the microfilm to move up (in the reverse direction) past the microfilm effective scanning window. (The copy paper feed starts shortly thereafter, as will be described below; it is delayed slightly because it takes longer for the microfilm to be reverse transported from the starting position than it does for the copy sheet to reach the exposure window inside the machine.)

With closure of manual switch S1D, the winding of relay K12 is placed across conductors 115 and 116. Relay K12 energizes and contacts K12–A and K12–B close. (These contacts are not shown on FIGS. 14 anD 22 since in the letter copier and book copier modes there is no relay K12 to being with—contacts K12–A and K12–B included in the microfilm attachment, are connected in the circuit through the pin connectors on the machine and the microfilm attachment.) With the closing of both contacts K12–A and K12–B, the winding of relay K4 is connected between conductors 115 and 116.

Initially, both of relays K2 and K3 are energized because switches S2B and S3B are both closed (see FIGS. 27 and 28). Consequently, contacts K2–C as well as normally open contacts K3–A are closed. When relay K4 operates following the energization of relay K12, contacts K4–C close and relay K4 is held operated through contacts K12–A, K4–C, and the parallel connection of contacts K2–C and normally open (now closed) contacts K3–A.

At the same time that relay K4 energizes, so does relay K5, current flowing through contacts K3–B, the winding of relay K5, and contacts K12–A.

With the energization of relay K4, normally closed contacts K4–A open. Forward clutch K–9 as well as mirror solenoid K–15 remain de-energized even though contacts K5–D close when relay K5 operates. With the closing of normally open contacts K4–A, reverse clutch K–7 is energized and the original transport system moves in the reverse direction.

Switch SD1 closes after cams 402 and 403 have moved 10° in the counter-clockwise direction (see FIG. 28). When switch SD1 closes, it provides an alternate path for the current flowing through the windings of relays K4 and K5. Since switch SD1 is connected across contacts K12–A, the latter contacts are no longer required for holding relays K4 and K5 operated. Nor are contacts K12–B required to hold relay K4 energized since all of normally open contacts K3–A, K2–C and K4–C are now closed. Consequently, start button SID can be released by the operator (thereby releasing relay K12) as soon as cams 402 and 403 have rotates 10 degrees in the counter-clockwise direction of FIG. 27. The microfilm continues to be transported in the reverse (up) direction with relays K2, K3, K4 and K5 energized, but with relay K1 de-energized. With the latter relay being de-energized, there is no copy sheet feed.

The reverse movement of the microfilm original (even when a single copy is being made) at the beginning of a cycle corresponds to the reverse movement of an original document or the book platen in the two other modes. In all cases, the original is moved in the reverse direction until its leading edge clears the scanning window. Forward movement of the original then beings so that the scanning of the original can take place immediately after the reverse movement. But in order for the scanning to begin immediately after the reverse movement, it is necessary for the copy sheet to have reached the forward edge of the exposure window by that time. Thus, just as in the other modes of operation, in the microfilm mode it is necessary for the copy sheet feed to begin while the original is being transported in the reverse direction. (In the microfilm mode, this is necessary even when a single copy is being made; in the other modes there is no reverse movement of the original at the start of a single-copy cycle.)

In the letter copier mode, the early start of the copy sheet feed is controlled by switch SW–Q, while in the book copier mode it is controlled by switch SQ1. In the microfilm mode it is controlled by switch SQ2. When cam 403 has rotates 31 degrees in the reverse (counter-clockwise) direction, switch SQ2 is closed as shown in FIG. 28. With the closing of the switch, and since contacts K4–B are already closed (relay K4 is energized), relay K1 is connected through the contacts and the switch to conductors 115 and 116. Relay K1 energizes and contacts K1–D close. The relay is held energized through these contacts, diode CR16 and switch S1C which is initially closed at the beginning of the copying cycle (see FIG. 28). As cam 403 continues to rotate in the counter-clockwise direction, switch SQ2 opens as shown in FIG. 28. However, by this time contacts K1-3 have closed to hold relay K1 operated.

With the operation of relay K1, normally open contacts K1–B close and timer clutch K–11 and paper clutch K–12 are energized. The copy sheet feed begins and cam 96 (FIG. 4) starts to rotate. At the same time, relay K6 energizes through contacts K1–D, diode CR12 and switch SW–X. Contacts K6–A close to hold relay K6 operated independent of contacts K1–D, and contacts K6–B close to allow the subsequent operation of knife solenoid K–10 when relay K1 releases and normally closed contacts K1-B close. The closing of contacts K1–C result in the energization of the corona power supply 89.

As the microfilm original to be copied is further moved in the reverse direction, switch S3B which rides on cam 402 opens after a rotation of 117°. Relay K3 releases. With the opening of contacts K3–B, relay K5 releases. (Normally closed contacts K2–D, which would otherwise provide an alternate holding path for relay K5, do not do so at this time since switch S2B is still closed, relay K2 is operated and contacts K2–D are open.) Relay K4 does not release, however, even though normally open contacts K3–A now open since these contacts are bridged by now closed contacts K2–C, relay K4 being held through contacts K2–C and K4–C, and switch SD1. Since relay K4 is still energized, the original transport system continues to move in the reverse direction.

When switch S3B opens and relay K3 releases, contacts K3–D close. Since relay K4 is operated at this time, contacts K4–D are also closed. Thus with the opening of switch S3B, timing motor TM2 is energized. It is at this time that cam 107 is decremented if more than one copy is to be made. As soon as the timing motor starts to operate, switch SW–C closes as it does when multiple copies are made in the other two modes. Although relay K4 releases as soon as switch S2B opens (as will be described below), the timing motor continues to operate to decrement cam 107. It takes longer for timing motor TM2 to complete one cycle of operation than it does for switch S2B to open after relay K3 first releases. This insures that the opening of switch SW–C terminates the operation of the timing motor after cam 107 has been decremented only once. In the event that only a single copy must be made, timing motor TM2 simply runs from the time that switch S3B opens until the time that switch S2B opens. Cam 107 is not decremented because it cannot be turned in the counter-clockwise direction of FIG. 5 past the position shown. As described above, the timing motor is coupled to the cam through a conventional slip clutch which allows operation of the motor even though the dial does not turn with it.

It should be noted that when multiple copies of an original are being made, cam 107 is actually decremented before each copy is made (during the initial reverse movement). This, of course, does not affect the system operation since after the copy is made the dial is in the correct position.

Eventually, switch S2B is opened (after 154° of cam rotation in the reverse direction). At this time, relay K2 releases, as does relay K4 since contacts K2–C open. When this happens, the bottom of the microfilm frame to be copied is just above the microfilm effective scanning window, and the system is ready to begin the scanning process. The microfilm original always stops at the same point. It stops there shortly before the original transport system actually starts to move in the forward direction. The forward movement of the original transport system is controlled by cam 96 (FIG. 4) just as it is when the system is operated in the book copying mode. The lobe on cam 96 reaches the finger on switch SW–O just after the original to be copied has been moved up sufficiently to clear the effective scanning window. This is shown on FIG. 28 with switch SW–O closing immediately (approximately one-quarter second) after switch S2B opens and the original transport system comes to a halt. With the closing of switch SW–O, the sequence which follows is similar to the sequence which follows when the same switch closes in the book copier mode.

Forward clutch K–9 is energized through switch SW–O and normally closed contacts K4–A, since relay K4 is now de-energized. As soon as forward clutch K–9 engages, not only is the original moved down past the effective scanning window in front of the projection lamp, but cams 402 and 403 also now move in the clockwise direction. Switch S2B which opened to release relay K4 and thus prepare the original transport system for forward movement, closes immediately after the cam starts to rotate in the forward direction. Relay K2 re-operates. Relay K4 does not re-energize, however, even though contacts K2–C close, because contacts K4–C are now open; the original transport system continues to move in the forward direction. Thus at the start of the forward movement, relay K2 energizes once again while relay K3 is still de-energized since switch S3B is still open. Relay K4 is de-energized as well. Relay K5, which de-energized with the release of K3, is still de-energized since contacts K2–D, K5–A and K3–B are all open. As for relay K1, it is still operated, copy paper is still being fed from the roll, and knife solenoid K–10 has not yet operated.

During reverse movement of the original, mirror solenoid K–15 is de-energized since contacts K4–A are open. The operator thus observes a moving image on the screen. However, at the end of the reverse movement when relay K4 releases, normally closed contacts K4–A close. As soon as switch SW–O closes, mirror solenoid K–15, which is in parallel with forward clutch K–9, operates. When the mirror solenoid operates, mirror 413 is moved up in FIG. 23. This results in light transmitted through the microfilm (which now begins to move in the forward direction) to be directed to the scanning window on top of the copy machine. Forward clutch K–9 and mirror solenoid K–15 continue to be energized through switch SW–O.

As cams 402 and 403 move in the forward direction, the next thing that happens is that switch S3B closes (at −117°). Relay K3 energizes and contacts K3–B close. Relay K5 operates through these contacts and switch SD1 which is still closed. With the closing of contacts K5–D, an alternate path is provided around switch SW–O to keep the forward clutch and mirror solenoid energized. (Switch SW–O is still kept closed, however, because as will be described below, contacts K5–D open later for a short time and switch SW–O is necessary at this time to keep the forward clutch and mirror solenoid energized.)

As cams 402 and 403 continue to move in the forward direction, and approach the zero-degree position, switch SQ2 closes (at −41°). Originally, this switch controlled the energization of relay K1. However, the closing of the switch does not affect relay K1 since the relay is now already operated through switch S1C which has not yet opened, diode CR16 and and contacts K1–D. Switch SQ2 then opens again as cam 403 continues to turn but this too has no affect on the system operation.

As cams 402 and 403 approach the zero-degree position, switch SD1 opens. It will be recalled that thiS switch closed immediately after the microfilm started to be transported in the reverse direction and provided a holding path for relays K4 and K5 around contacts K12–A (which contacts opened with the release of relay K12 when the operator let go of start button S1D). Although relay K4 is de-energized at this time, relay K5 is operated. In fact, contacts K5–D are closed and hold forward clutch K–9 and mirror solenoid K–15 energized. When relay K5 releases at this time with the opening of switch KD1, the forward clutch and mirror solenoid are no longer held by contacts K5–D. Their de-energization must be prevented since the scanning is not yet completed. It should be noted that switch SW–D is in parallel with switch SD1. While it is true that switch SW–D is closed when multiple copies are being made, when a single copy is being made (or when the last copy of multiple copies are being made) switch SW–D is open. It is in such a case that the opening of switch SD1 releases relay K5.

It is for this reason that switch SW–O is held closed by cam 96 until after switch SD1 closes once again as cam 403 continues to move in the forward direction. Referring to FIG. 7, the lobe on cam 96 extends through angle d1. this angle is large enough to keep switch SW–O closed in the microfilm mode until after switch SD1 closes at the initial (zero-degree) position of cams 402 and 403. When "centering" switch SD1 closes, cams 402 and 403 have returned to their initial positions and are now continuing to move in the clockwise direction. The system is in the middle of the scanning process. With the closing of switch SD1 once again, relay K5 re-energizes since contacts K3–B are still closed. Contacts K5–D now keep clutch K–9 and solenoid K–15 energized even after switch SW–O opens.

When operating in the microfilm mode, the length of each cut copy sheet is the same, since the length of each microfilm image to be copied is the same. The knife-cutting operation is controlled with the release of relay K1. This is accomplished as cam 402 moves in the clockwise direction past its initial position and opens switch S1C. Relay K1 releases, normally closed contacts K1–B close, and knife solenoid K–10 is operated. At the same time, normally open contacts K1–B open and paper clutch K–12 de-energizes. Also, timer clutch K–11 de-energizes and cam 96 returns under the control of spring 100 to the initial position shown in FIG. 4. Switch SW–O opens, but this is no problem since at this time contacts K5–D are closed to provide a holding path for forward clutch K–9 and mirror solenoid K–15.

At the end of the knife stroke, switch SW–X opens, relay K6 releases, and knife solenoid K–10 de-energizes just as they do in the letter copier and book copier modes. Also, just as in the two other modes, although contacts K1–C open, the corona is still energized through normally closed contacts K4–D and contacts K2–B.

As the two cams on the microfilm attachment continue to rotate in the forward direction, switch S1C remains open. Eventually, however, it closes. The closing of switch S1C at this time has no effect on relay K1 since contacts K1–D are now open. Following the closing of switch S1C, switch S2B opens. It is at this time that relay K2 releases and contacts K2–B open. Since the trailing edge of the copy sheet is now past the corona, there is no reason to keep the corona energized.

By the time the trailing edge of the microfilm original has passed the effective scanning window in front of the projection lamp, switch S3B is opened (at 164°). With the release of relay K3, contacts K3–B open. However, relay K5 is still energized through contacts K5–A and K2–D, the latter contacts having closed when relay K2 released. It is at this time that relay K4 energizes and the original transport system moves in the reverse direction. With the release of relay K3, normally closed contacts K3–A close. Since contacts K5–B are also closed at this time, current flows through the normally closed K3–A contacts, contacts K5–B, the winding of relay K4, and switch SD1 (and switch SW–D if multiple copies are being made). With the operation of relay K4, the normally closed K4–A contacts open. Forward clutch K–9 and mirror solenoid K–15 are de-energized. Normally open contacts K4–A close and reverse clutch K–7 is operated. Thus while the microfilm original is being returned in the reverse direction to the initial position, since the mirror solenoid is released the operator sees the moving image on the screen.

As cam 402 starts to move in the reverse direction, switch S3B immediately recloses. Relay K3 energizes and normally closed contacts K3–A open. However, normally open contacts K3–A now close, and relay K4 is held operated through these contacts, now closed contacts K4–C and switch SD1. Capacitor C4 holds relay K4 energized through contacts K5–B while the K3–A contacts transfer. Contacts K3–B also close to provide an alternate holding path for relay K5 when relay K2 operates once again and contacts K2–D open.

As the microfilm original is transported in the reverse direction and cams 402 and 403 similarly rotate in the reverse direction, the next switch whose state is chanGed is switch S2B which now closes. Relay K2 operates and contacts K2–D open, but relay K5 is held operated through now closed contacts K3–B.

Switch S1C then opens but this has no effect on the system operation since relay K1 is not operated to begin with. As the two cams continue to rotate, switch S1C closes once again but this, too, has no effect upon the system operation since contacts K1–D are open.

Eventually, cams 402 and 403 return to the zero-degree position, at which time the microfilm image is centered on the screen. Centering switch SD1 opens. It is at this time that switch SW–D comes into play depending on whether more than one copy is to be made. If only a single copy is to be made, or the last copy of several copies has just been made, switch SW–D is open. With the opening of switch SD1, relays K4 and K5 release. Normally open contacts K4–A now open and reverse clutch K–7 is de-energized. Normally closed contacts K4–A now close. But since contacts K5–D are open (relay K5 releases with the opening of centering switch SD1), forward clutch K–9 and mirror solenoid K–15 are de-energized. The system comes to a halt.

On the other hand, if switch SW–D is closed, when centering switch SD1 opens switch SW–D still provides a holding path for relays K4 and K5. It will be recalled that the first sequence began when manual switch S1D was operated, relay K12 was energized, and contacts K12–A and K12–B closed to energize relay K4. Although start button S1D is not operated at this time, there is no need for contacts K12–A to close since they are bridged by closed switch SW–D. As for contacts K12–B, there is no need for them to close either since contacts K5–B and the normally closed K3–A contacts are closed. The microfilm simply continues to move in the reverse direction; a new cycle is begun. It is only at the end of a single copy operation, or at the end of the last sequence in a multiple copy operation, that switch SW–D is open and the release of switch SD1 results in the de-energization of relays K4 and K5.

It should also be noted that both contacts K12–A and K12–B are provided for initially energizing relay K4 when start button S1D is manually operated. Contacts K12–A are necessary when a single copy is to be made since at this time switch SW–D is open. Contacts K12–B are required for another reason. When multiple copies are to be made, the operator generally sets dial 102 at the appropriate number; he then centers the selected frame on the screen after which start button S1D is operated. But the initial setting of dial 102 causes switch SW–D to close. Were only contacts K12–A somehow provided to initially energize relay K4, then switch SW–D, in parallel with these contacts, would also cause the relay to operate. To allow the relay to initially operate only when start button S1D is operated, additional contacts K12–B are provided.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A microfilm attachment for a copying machine; said copying machine having a scanning window and motion-imparting means at an exposed surface thereof, an exposure window, means for transporting copy paper past said exposure window, first optical means for scanning an original effectively moved past said scanning window and exposing copy paper moved past said exposure window, first control circuit means for selectively controlling movement of said motion-imparting means and said copy paper transporting means, and copying machine connector means at the exterior of said copying machine having a plurality of connections to said first control circuit means; said microfilm attachment comprising means for holding a microfilm original, a projection lamp for transmitting light through said microfilm original, second optical means for directing light transmitted through said microfilm original to said scanning window, attachment connector means connectable to said copying machine connector means, means engageable with said motion-imparting means for moving said microfilm original responsive to movement of said motion-imparting means, and second control circuit means connectable through said attachment connector means and said copying machine connector means to said first control circuit means for controlling the sequencing of said first control circuit means to move said microfilm original in synchronism with said copy paper.

2. A microfilm attachment for a copying machine in accordance with claim 1 further including a screen for viewing said microfilm original, and wherein said second optical means further includes means operative to selectively direct light transmitted through said microfilm original to said screen and said first control circuit means includes sequencing means for operating said second optical means during a copying cycle to direct light transmitted through said microfilm original to said scanning window.

3. A microfilm attachment for a copying machine in accordance with claim 1 further including a screen for viewing said microfilm original, and wherein said second optical means further includes means operative to selectively direct light transmitted through said microfilm original to said screen such that when a microfilm original is imaged on said screen it is centrally disposed relative to said scanning window, and said first control circuit means includes sequencing means for moving said microfilm original in a first direction, then in a second direction opposite to said first direction and finally in said first direction again to said centrally disposed position during each copying cycle.

4. A microfilm attachment for a copying machine in accordance with claim 3 wherein said microfilm original moving means includes a hub engageable with said motion-imparting means and capable of rotational movement, and a flexible tape secured at one end to said hub and at the other end to said microfilm original holding means.

5. A microfilm attachment for a copying machine in accordance with claim 4 further including means for biasing said microfilm original holding means in said first direction, the rotation of said hub in said second direction causing said flexible tape to wind thereon and said microfilm original holding means to be moved in said second direction against the force of said biasing means.

6. A microfilm attachment for a copying machine in accordance with claim 5 wherein said second control circuit means includes cam means for rotating with said motion-imparting means and a plurality of switches operated by said cam means and coupled to said attachment connector means, said plurality of switches being connected through said attachment and copying machine connector means to said first control circuit means for controlling the sequencing of said first control circuit means in accordance with the position of said cam means.

7. A microfilm attachment for a copying machine in accordance with claim 2 wherein said said control circuit means includes cam means for rotating with said motion-imparting means and a plurality of switches operated by said cam means and coupled to said attachment connector means, said plurality of switches being connected through said attachment and copying machine connector means to said first control circuit means for controlling the sequencing of said first control circuit means in accordance with the position of said cam means.

8. A microfilm attachment for a copying machine in accordance with claim 1 wherein said second control circuit means includes cam means for rotating with said motion-imparting means and a plurality of switches operated by said cam means and coupled to said attachment connector means, said plurality of switches being connected through said attachment and copying machine connector means to said first control circuit means for controlling the sequencing of said first control circuit means in accordance with the position of said cam means.

9. A microfilm attachment for a copying machine in accordance with claim 8 wherein said copying machine includes means for controlling the making of multiple copies of an original, said microfilm attachment further including starting means connectable through said attachment and said copying machine connector means to said first control circuit means for initiating the operation thereof, said first control circuit means being responsive to the operation of said multiple copy controlling means for restarting said first control circuit means following each copying cycle without the operation of said starting means until the required number of copies of a microfilm original have been made.

10. A microfilm attachment for a copying machine in accordance with claim 1 wherein said microfilm original moving means includes a hub engageable with said motion-imparting meanS and capable of rotational movement, and a flexible tape secured at one end to said hub and at the other end to said microfilm original holding means.

11. A microfilm attachment for a copying machine in accordance with claim 10 further including means for biasing said microfilm original hOlding means in a first direction, the rotation of said hub in a second direction opposite to said first direction causing said flexible tape to wind thereon and said microfilm original holding means to be moved in said second direction against the force of said biasing means.

12. A microfilm attachment for a copying machine in accordance with claim 1 wherein said copying machine includes means for controlling the making of multiple copies of an original, said microfilm attachment further including starting means connectable through said attachment and said copying machine connector means to said control circuit means for initiating the operation thereof, said first control circuit means being responsive to the operation of said multiple copy controlling means for restarting said first control circuit means following each copying cycle without the operation of said starting means until the required number of copies of a microfilm original have been made.

13. A microfilm attachment for a copying machine in accordance with claim 1 wherein said first control circuit means includes sequencing means for moving said microfilm original in a first direction, then in a second direction opposite to said first direction and finally in said first direction again, and means for controlling the initiation of the operation of said copy paper transporting means while said microfilm original is first moved in said first direction.

14. A microfilm attachment for a copying machine in accordance with claim 13 wherein said second control circuit means includes a plurality of signal generating means operated in accordance with the position of said microfilm original holding means, said plurality of signal generating means being connected through said attachment and copying machine connector means to said first control circuit means for controlling the sequencing of said first control circuit means in accordance with the position of said microfilm original holding means.

15. A microfilm attachment for a copying machine in accordance with claim 14 wherein said copying machine includes means for controlling the making of multiple copies of an original, said microfilm attachment further including starting means connectable through said attachment and said copying machine connector means to said first control circuit means for initiating the operation thereof, said first control circuit means being responsive to the operation of said multiple copy controlling means for restarting said first control circuit means following each copying cycle without the operation of said starting means until the required number of copies of a microfilm original have been made.

16. A microfilm attachment for a copying machine in accordance with claim 14 further including a screen for viewing said microfilm original and a start button for initiating a copying cycle, said second optical means normally being in a position to image said microfilm original on said screen, said first control circuit means includes sequencing means to control movement of said second optical means prior to movement of said microfilm original holding means in said second direction to image said microfilm original on said scanning window.

17. A microfilm attachment for a copying machine in accordance with claim 16 wherein said microfilm original holding means includes a plate having a projection window therein, means containing thereon a plurality of microfilm frames, and means for moving said means containing thereon a plurality of microfilm frames relative to said projection window such that a selected frame is disposed adjacent to said projection window.

18. A microfilm attachment for a copying machine in accordance with claim 14 wherein said microfilm original holding means includes a plate having a projection window therein, means containing thereon a plurality of microfilm frames, and means for moving said means containing thereon a plurality of microfilm frames relative to said projection window such that a selected frame is disposed adjacent to said projection window.

19. A microfilm attachment for a copying machine in accordance with claim 18 further including Fresnel lens means positionable adjacent to said scanning window.

20. A microfilm attachment for a copying machine in accordance with claim 19 wherein said motion-imparting means and said attachment engageable means are rollers.

21. A microfilm attachment for a copying machine in accordance with claim 13 wherein said motion-imparting means and said attachment engageable means are rollers.

22. A microfilm attachment for a copying machine in accordance with claim 21 further including Fresnel lens means positionable adjacent to said scanning window.

23. A microfilm attachment for a copying machine in accordance with claim 1 wherein said motion-imparting means and said attachment engageable means are rollers.

24. A microfilm attachment for a copying machine in accordance with claim 23 wherein said microfilm original holding means includes a plate having a projection window therein, means containing thereon a plurality of microfilm frames, and means for moving said means containing thereon a plurality of microfilm frames relative to said projection window such that a selected frame is disposed adjacent to said projection window.

25. A microfilm attachment for a copying machine in accordance with claim 1 wherein said microfilm original holding means includes a plate having a projection window therein, means containing thereon a plurality of microfilm frames, and means for moving said means containing thereon a plurality of microfilm frames relative to said projection window such that a selected frame is disposed adjacent to said projection window.

26. A microfilm attachment for a copying machine in accordance with claim 25 further including Fresnel lens means positionable adjacent to said scanning window.

27. A microfilm attachment for a copying machine in accordance with claim 1 further including Fresnel lens means positionable adjacent to said scanning window.

28. A microfilm copying machine comprising an exposure window, means for transporting copy paper past said exposure window, means for holding a microfilm original, a projection lamp for transmitting light through said microfilm original, a screen for viewing said microfilm original, optical means for selectively directing light transmitted through said microfilm original to said screen and to said exposure window, a scanning window, means for moving said microfilm original in a scanning direction in synchronism with said copy paper, means for controlling said optical means during a copying cycle to direct light transmitted through said microfilm original to said scanning window, said optical means defining an effective scanning window smaller than said microfilm original in said scanning direction, said microfilm original moving means including sequencing means for moving said microfilm original in a first direction, then in a second direction opposite to said first direction and finally in said first direction again, and means for controlling the initiation of the operation of said copy paper transporting means while said microfilm original is first moved in said first direction.

29. A microfilm copying machine in accordance with claim 28 wherein said optical means includes means for directing light transmitted through said microfilm original to said screen such that when a microfilm original is imaged on said screen it is centrally disposed relative to said exposure window.

30. A microfilm copying machine in accordance with claim 29 wherein said microfilm original moving means further includes a hub mounted for rotational movement, and a flexible tape secured at one end to said hub and at the other end to said microfilm original holding means.

31. A microfilm copying machine in accordance with claim 30 further including means for biasing said microfilm original holding means in said first direction, the rotation of said hub in said second direction causing said flexible tape to wind thereon and said microfilm original holding means to be moved in said second direction against the force of said biasing means.

32. A microfilm copying machine in accordance with claim 31 further including means for controlling the making of multiple copies of an original, starting means for initiating a copying operation, and means responsive to the operation of said multiple copy controlling means for initiating a new copying cycle following each copying cycle without the operation of said starting means until the required number of copies of a microfilm original have been made.

33. A microfilm copying machine in accordance with claim 28 wherein said microfilm original moving means further includes a hub mounted for rotational movement, and a flexible tape secured at one end to said hub and at the other end to said microfilm original holding means.

34. A microfilm copying machine in accordance with claim 33 further including means for biasing said microfilm original holding means in said first direction, the rotation of said hub in said second direction causing said flexible tape to wind thereon and said microfilm original holding means to be moved in said second direction against the force of said biasing means.

35. A microfilm copying machine in accordance with claim 28 further including means for controlling the making of multiple copies of an original, starting means for initiating a copying operation, and means responsive to the operation of said multiple copy controlling means for initiating a new copying cycle following each copying cycle without the operation of said starting means until the required number of copies of a microfilm original have been made.

36. A microfilm attachment for a copying machine in accordance with claim 28 wherein said microfilm original holding means includes a plate having a projection window therein, means containing thereon a plurality of microfilm frames, and means for moving said means containing thereon a plurality of microfilm frames relative to said projection window such that a selected frame is disposed adjacent to said projection window.

* * * * *